United States Patent
Iuoras et al.

(10) Patent No.: US 6,445,707 B1
(45) Date of Patent: Sep. 3, 2002

(54) BROADCAST RATE CONTROL ALLOCATION (BRCA) FOR CONGESTION AVOIDANCE IN SATELLITE ATM NETWORKS

(75) Inventors: Augustin Iuoras, Pierrefonds; Peter Takats, Ile Perrot; Rocco Di Girolamo, Montreal; Eko A. Wibowo, Ottawa, all of (CA)

(73) Assignee: EMS Technologies Canada, Limited, Quebec (CA)

( * ) Notice: Subject to any disclaimer, the term of this patent is extended or adjusted under 35 U.S.C. 154(b) by 0 days.

(21) Appl. No.: 09/295,377

(22) Filed: Apr. 21, 1999

(51) Int. Cl.[7] .............................................. H04L 12/56
(52) U.S. Cl. .................................. 370/395.43; 370/232
(58) Field of Search ................................ 370/237, 321, 370/347, 395, 442, 477, 229, 230, 231, 232, 235, 234, 395.43; 342/352, 353, 456

(56) References Cited

U.S. PATENT DOCUMENTS

| | | | |
|---|---|---|---|
| 4,004,098 A | * 1/1977 | Shimasaki | |
| 4,736,371 A | * 4/1988 | Tejima et al. | |
| 5,805,577 A | 9/1998 | Jain et al. | |
| 5,991,279 A | * 11/1999 | Haugli et al. | 370/311 |
| 6,157,621 A | * 11/2000 | Brown et al. | 370/310 |
| 6,189,044 B1 | * 2/2001 | Thompson et al. | 709/242 |

* cited by examiner

Primary Examiner—Douglas Olms
Assistant Examiner—Ken Vanderpuye
(74) Attorney, Agent, or Firm—Birch, Stewart, Kolasch & Birch, LLP

(57) ABSTRACT

A congestion avoidance scheme for ABR services in an ATM satellite system is described. The scheme relies on the broadcast nature of a satellite system to control the rates at which user terminals can send their requests for capacity. The scheme is integrated with the uplink scheduler mechanisms and therefore it is capable of achieving high bandwidth efficiency. It also achieves fairness in satellite resource utilization, while guaranteeing low cell loss ratio with rather modest buffer size.

22 Claims, 36 Drawing Sheets

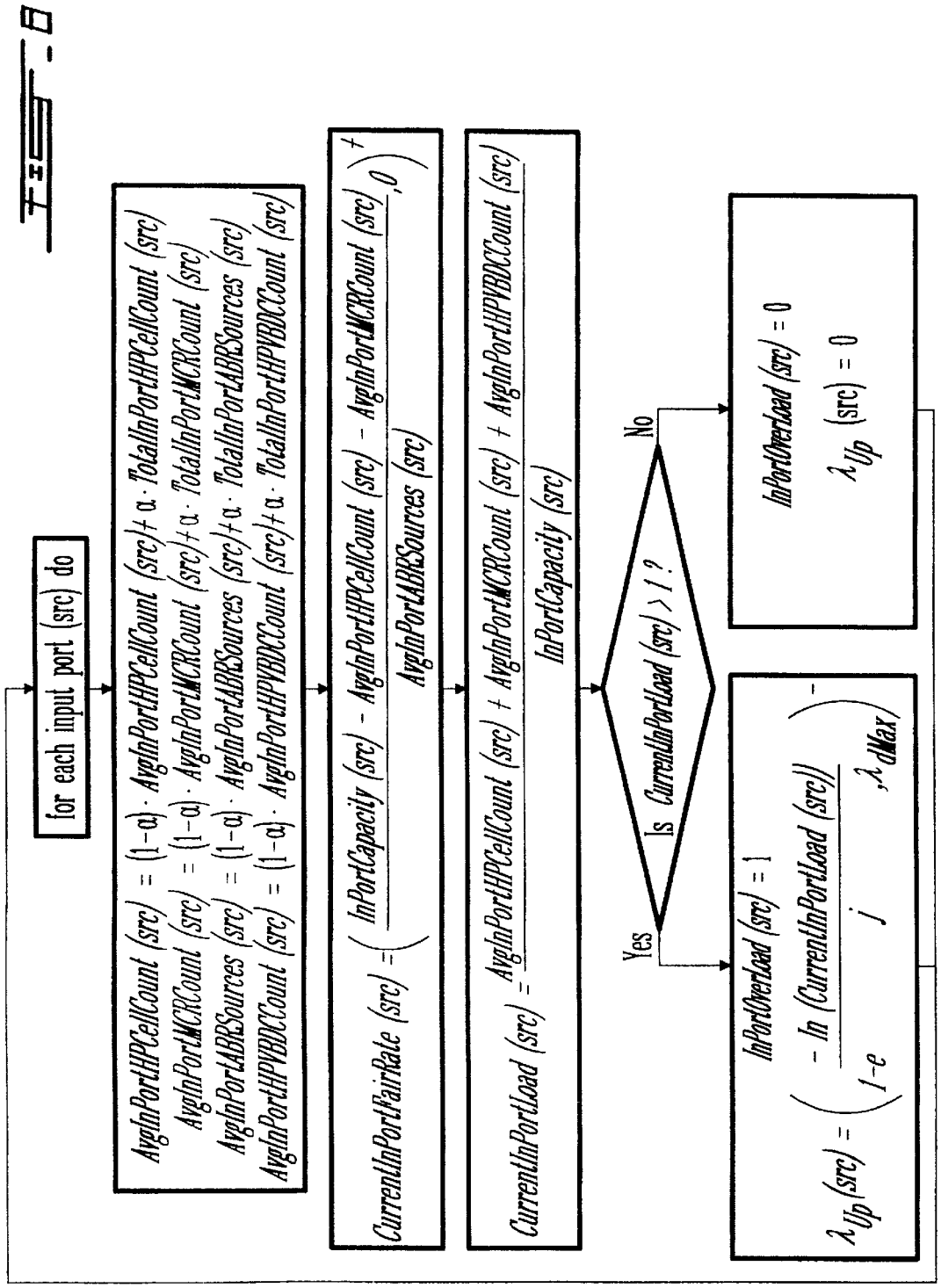

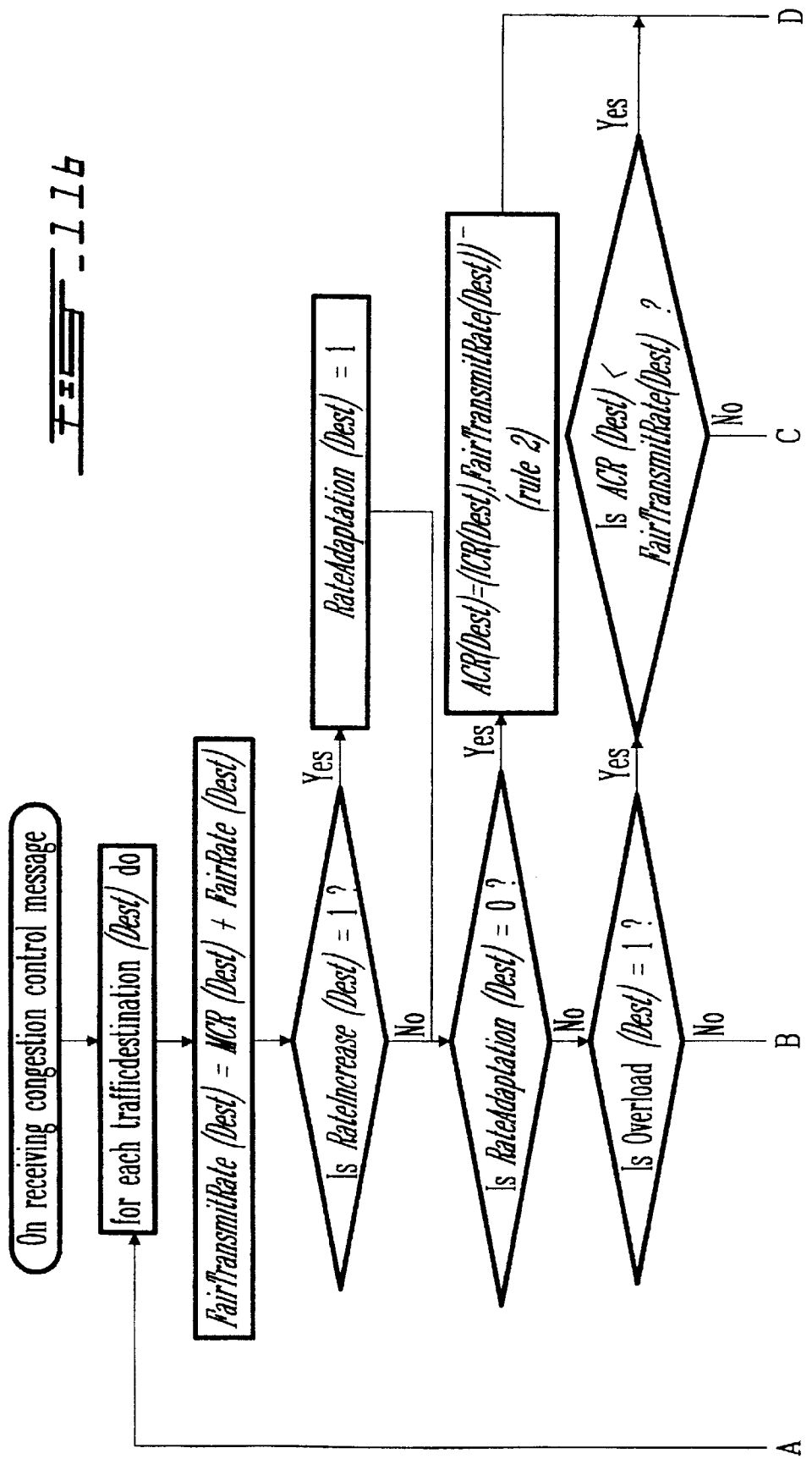

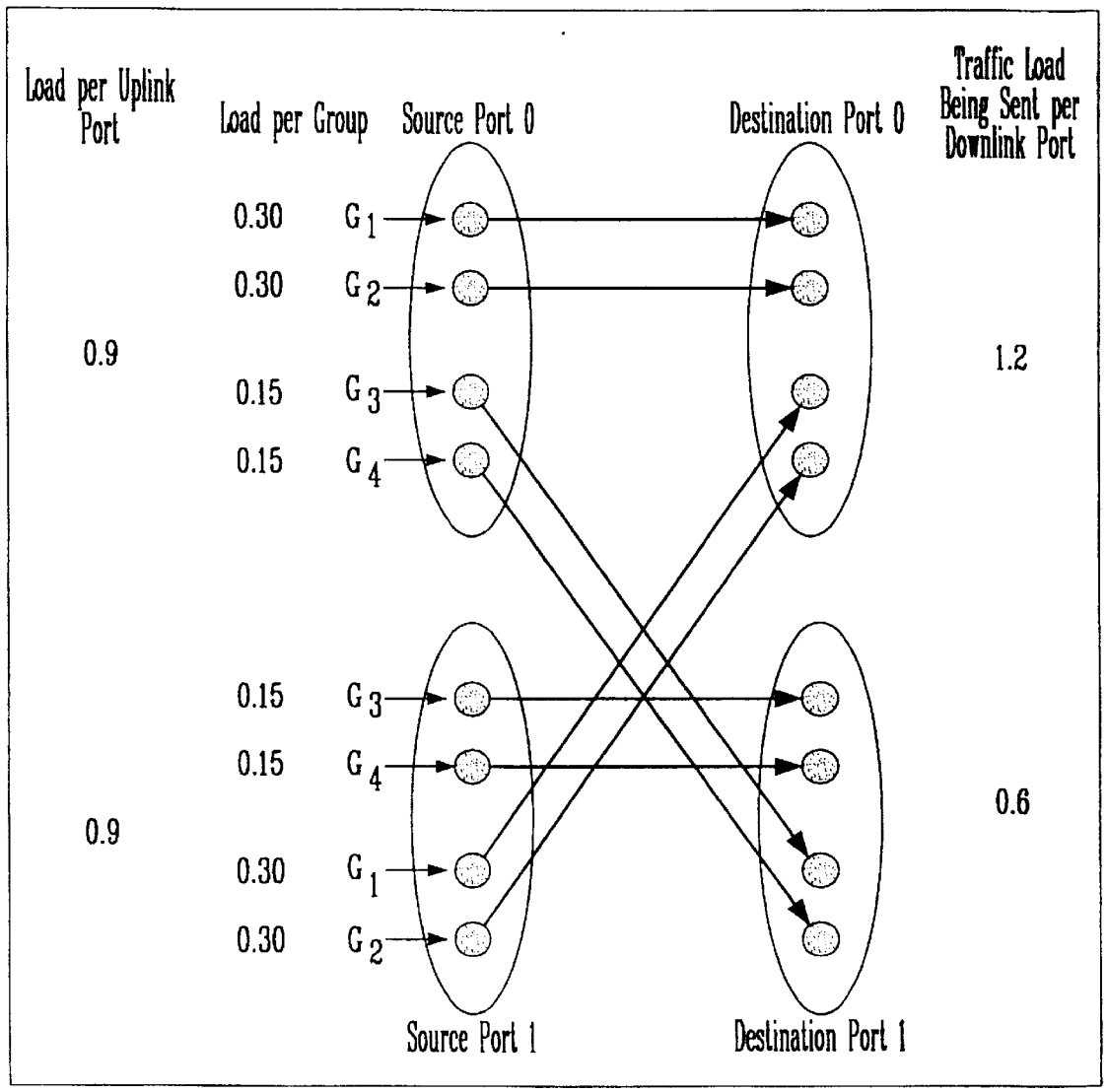

FIG_35

BROADCAST RATE CONTROL ALLOCATION (BRCA) FOR CONGESTION AVOIDANCE IN SATELLITE ATM NETWORKS

FIELD OF THE INVENTION

This invention relates to a method and scheme for congestion management in two-way data satellite communications with residential and business terminals—hereinafter referred to as Broadcast Rate Control Allocation (BRCA). More particularly, the invention is directed to a method for supporting efficient transport for Available Bit Rate (ABR) services over a satellite, wherein the satellite switch provides feedback (which is broadcast to all terminals), in order to control the rate at which terminals can send their data to satellite.

While the particular embodiment in this invention is directed to Geostationary Earth Orbit (GEO) satellites supporting Asynchronous Transport Mode (ATM) services, it should be appreciated that the invention is applicable to the transport of data in other (than ATM) packet formats over satellites in other (than GEO) orbits, provided that a grade of service for data is specified, similar to that specified for ABR services.

BACKGROUND OF THE INVENTION

Broadband satellite networks are becoming an important segment of the global communication infrastructure. They are required to provide seamless integration of applications and services that have traditionally been available via terrestrial networks. In order to ensure inter-operability between terrestrial and satellite networks, efforts have been made to expand/adapt the existing protocols for terrestrial networks to satellite environment. These efforts have not always led to full utilization of satellite resources, as these protocols have been optimized for terrestrial applications. New protocols, specifically tailored to satellite environment are therefore required.

In a typical satellite network the satellite bandwidth, buffer and computational resources are shared by a relatively large population of terminals, connected to end-users and sending traffic corresponding to various applications (voice, video, data). The traffic associated with data applications exhibits high variability and unpredictability. Each connection requires certain satellite bandwidth, in order to guarantee the Quality of Service (QoS) expected by the end user. Given the diversity of traffic characteristics and of bandwidth and QoS requirements associated with different applications, future satellite networks will use on- board fast packet switching, in order to ensure efficient use of satellite resources while guaranteeing QoS for all connections. ATM establishes itself as the preferred transport mode in today's Broadband Integrated Services Digital Networks (B-ISDN), including the satellite networks. It is therefore considered in this invention that the traffic will be transported over the satellite in ATM-like packets, i.e. packets which preserve the structure of standard ATM cells, while adding a satellite-specific header to support satellite-specific functions, such as uplink scheduling and on-board routing. A standard ATM cell is fifty three-byte long, consisting of a five-byte header and a forty eight-byte information field, also referred to as payload. Depending on the particular implementation, the On-Bard Processor (OBP) may use some information from the ATM header, in addition to the information contained in the satellite-specific header. After being processed, the ATM packets are stripped of the satellite- specific header before being sent to their downlink destinations. The information in the ATM header may be preserved in order to allow for easy integration of the satellite into a broader ATM network.

The use of on-board switching (of ATM-like packets) allows for statisical multiplexing of the traffic corresponding to various connections, thus improving satellite resources utilization. The most valuable resource is the bandwidth (capacity) of the air interface between terminals and satellite, on both uplink (UL) and downlink (DL). In contrast to the wired networks, in a satellite network the physical medium (link) is shared by all active terminals logged onto the system. Advanced multiple access or Medium Access Control (MAC) protocols are therefore required to provide efficient, dynamic and fair sharing of satellite bandwidth among these terminals, while supporting various levels of QoS guarantees (depending on application), given to sources as part of the traffic contract. A system for efficient transport of multimedia traffic over a satellite network is described in U.S. patent application Ser. No. 08/669,609, submitted by EMS Aerospace Limited (C. Black et al.) on Jun. 24 1998 and entitled "Data Communication Satellite System and Method of Carrying Multi-Media Traffic". In this system a key element in achieving efficient resource utilization is a novel Dynamic Uplink Access Protocol (DUAP).

The DUAP proposed by EMS is from the Combined Free and Demand Assignment Multiple Access (CFDAMA) family of protocols, which are based on Multiple Frequency-Time Division Multiple Access (MF-TDMA) transmission frame, capable of providing efficient and flexible bandwidth utilization. Protocols from this family distribute transmission bandwidth (capacity) based mainly on demands (or requests) from terminals, following a fairness algorithm. The bandwidth left after all requests have been satisfied is distributed a freely across terminal population.

EMS's implementation of CF-DAMA protocol is based on four capacity request/assignment mechanisms (or strategies), each receiving a different priority from the UL scheduler, an entity responsible for capacity allocation to terminals which can be located on board the satellite or on ground. The request strategies lead to four types of capacity (or channels), tailored to match the needs and priorities of various ATM service classes: Reserved Capacity (RC), Rate-Based Dynamic Capacity (RBDC), Volume-Based Dynamic Capacity (VBDC) and Free Capacity (FC). The capacity types are essential for the invention described in the application, therefore they are briefly reviewed in the following paragraphs.

In the RC assignment strategy a terminal states its need for UL and DL capacity at connection set-up time, in terms of a fixed number of payload slots per frame. If the connection is admitted by the network controller, the terminal will have the requested number of time slots assigned to it every frame (reserved) for the duration of the connection, so that the traffic is not subjected to any delay except for the propagation delay (no scheduling and queuing involved). The network controller must ensure (at connection set-up time) that the total RC for all connections does not exceed the total system capacity. This strategy is aimed toward real-time (RT) connections, such as Constant Bit Rate (CBR) and real time-Variable Bit Rate (rt-VBR), which cannot tolerate or have strict constraints on delay and delay variation (e.g. voice connections), and is especially suitable for applications with smooth traffic characteristics.

In the RBDC assignment strategy, a terminal explicitly requests a number of UL payload slots in each frame. A request remains effective for a number of frames (until it is updated by the terminal or as long as it has not timed out), so that the request is also implicit. In one implementation option of the RBDC strategy, the UL capacity is guaranteed by the scheduler up to the maxRBDC value negotiated at connection set-up time. In contrast to the RC strategy, the RBDC strategy allows for statistical multiplexing among terminals, thus resulting in a more efficient use of satellite bandwidth. Nevertheless, the network controller must also ensure that total RC and maxRBDC of all terminals do not exceed the total available UL and DL capacity. The RBDC strategy can be used for non-real-time connections, such as non real time Variable Bit Rate (nrt-VBR) connections, if scheduling delay is tolerated, and ABR connections.

In the VBDC assignment strategy, a terminal signals its request in terms of total number of UL payload slots required to empty its queue. The network, however, does not provide any guarantee on capacity availability. The UL scheduler will do its best to satisfy a request of this type. The request remains effective as long as not all requested time slots have been granted. This strategy is directed toward Jitter Tolerant (JT) connections and is especially suited for bursty traffic. It allows for a great deal of statistical multiplexing and thus may contribute to a very efficient use of network resources. VBDC strategy may be implemented with two priorities: the high priority strategy (HP-VBDC) and the low priority strategy (LP-VBDC). LP-VBDC is used for UBR services, while HP-VBDC can be used for ABR services, perhaps in combination with one of the first two request strategies (i.e. RC or RBDC).

Finally, in the Free Capacity Allocation (FCA) strategy the uplink scheduler attempts to maximize UL capacity utilization by distributing the unrequested UL capacity across all terminals. This strategy ranks the lowest among all four, i.e. the scheduler will satisfy all RC, RBDC and VBDC requests before assigning free capacity. Unlike the previous assignment strategies, ground terminals have no control in obtaining free capacity.

The order in which terminals are granted access to VBDC and FCA capacity is carried in a systematic fashion (round robin scheduling), in order to ensure fairness. This is based on a terminal table maintained in the uplink scheduler, which is a database of ground terminals currently registered in the network. The table is arranged in a circular linked-list fashion, and each entry in the table contains information related to a specific ground terminal, such as its configured RC, its maximum and currently requested RBDC and two pointers to terminal's HP-VBDC and LP-VBDC request queues. The scheduler guarantees capacity assignment for each terminal's RC and RBDC requests. Hence, access fairness is not relevant for the first two scheduling strategies, but only for VBDC and FCA. The process of distributing uplink capacity to ground terminals, called the assignment process, involves a few passes through the terminal table. In the first pass, the scheduler counts the uplink capacity requested with each of the request strategies (other than FCA). In the second pass, the scheduler inspects each terminal entry in the table starting from the head entry of the linked list. During each inspection, the scheduler will satisfy the entry's RC and RBDC requests. It also attempts to satisfy each entry's HP-VBDC and LP-VBDC requests in full, as long as uplink capacity is still available. An entry that is fully serviced it moved to the end of the linked list. During this second pass, the scheduler may place a tag on one entry for each of the non-guaranteed bandwidth request strategies, i.e. the low and high priority VBDC and the FCA strategies. A tagged entry corresponding to one of these request strategies is the last entry receiving capacity assignment through that particular request strategy. Then, at the end of the pass, the next entry after the highest-priority tagged entry will be made the head of the linked list. Hence, the two-pass assignment process ensures that, at the end of the process, the entry with the highest priority ungranted request is made the head of the terminal table linked list, so it will be the first to be inspected in the next assignment process (next frame).

The assignments are signaled to terminals every MF-TDMA frame, by using Burst Time Plans (BTPs). A BTP specifies for each frame the number and position (within frame) of the slots assigned to every terminal, regardless of the type of traffic for which assignments have been made. The UL scheduler keeps in its data base copies of BTPs for the last scheduling delay (one round-trip delay if the UL scheduler is located on-board the satellite).

During its lifetime, a connect may utilize more than one request strategy. Since each request strategy is aimed to providing a different level of QoS guarantee, the UL access protocol has the capability to support flexible QoS, matched to user's needs. As the request strategies are quite different from each other, they can provide, as a whole, integrated support for both circuit-switched and packet-switched services (both connection-oriented and connectionless) and for a variety of multimedia applications.

Due to the statistical multiplexing of data traffic, congestion can occur on-board the satellite, leading to performance degradation (cell loss or excessive delay). Congestion is a dynamic problem arising from changing network loading conditions. It is defined as the state in which the network is not able to meet the required QoS for already admitted connections. The congestion-related effects are aggravated by the large bandwidth-delay product specific to GEO satellites. Effective congestion avoidance/control schemes are needed to ensure stable operation of the satellite network, fairness and efficiency in the utilization of satellite bandwidth.

The effectiveness of congestion control/avoidance schemes is measured by their ability to achieve a number of objectives, as discussed below.

Efficiency/Delay

Efficiency is measured by the ability of a scheme to ensure high utilization of link capacity, while providing the level of QoS guarantee negotiated for the connection. QoS is specified in terms of performance metrics such as Cell Loss Ratio (CLR) and traffic delay induced by the scheme. The CLR is determined by the queuing performance of the servers at the multiplexing points (e.g. in the switch on-board the satellite) under the loading condition with given data traffic. The traffic associated with today's data applications is characterized by high variability and unpredictability. The ratio between peak and average cell rate can be very large, and periods of high intensity can randomly alternate with periods of inactivity or low activity. During high intensity periods the traffic will be queued in the switch buffers. It is the instantaneous size of the queue relative to the size of the buffer which will ultimately determine the CLR. The queue size will also determine the amount of delay induced by the scheme. The queue size depends on system loading and traffic statistical properties. Loading on both uplink and downlink channels should be taken into consideration. An efficient scheme should ensure high utilization of both uplink and downlink capacity, while not exceeding the specified CLR and/or queuing delay. The efficiency and CLR/delay requirements are contradictory, therefore a trade-off is normally made. The delay increases almost linearly with the load, until the maximum downlink capacity is reached. Any further increase in load would result in packet loss or excessive delay, as a result of queue build-up in the switch. In a GEO satellite environment the end-to-end delay is dominated by the propagation delay and uplink scheduling delay, so that the queuing delay might be less relevant if properly controlled. Both CLR and queuing delay are associated with the queue management function aimed at achieving stable queues, as discussed below.

Fairness

In general fairness is understood as giving the same chances to all contending sources in the use of common resources, such as bandwidth. In a satellite system it is desirable to reinforce fairness in both uplink and downlink channels (understood in this context as RF channels characterized by well defined bandwidth or capacity), so fair rates are separately calculated for each uplink channel and each downlink channel. For a given connection the fair rate will be taken as the minimum between the uplink and downlink fair rates. Each terminal should be allowed to adjust its rate (increase or decrease) function of the network loading conditions.

Stable Queue Size

Stable queue size is maintained by queue size management, in order to avoid that the instantaneous queue size exceeds the switch buffer size (which is key to meeting the CLR requirements). Due to physical and cost limitations associated with the on-board hardware, the size of the switch buffers should be maintained at a minimum. The minimum buffer size depends on traffic characteristics (variability) at buffer's input and on the desired responsiveness of the congestion control scheme. It is upper-bounded by the need to store data corresponding to one round trip delay, which is the minimum response time in a feedback scheme. As for a GEO satellite this upper bound can be quite high, well designed rules should govern the behavior of various network elements (e.g. rate increases/decreases in terminals).

Good Steady State and Transient Behavior

Steady state is encountered when ground terminals have always traffic to send (i.e. their buffers are never empty). As a result the system is consistently overloaded or underloaded, and little oscillation is expected in scheme's behavior (e.g. rate, queue size). This is a rare situation, as the traffic normally exhibits high variability. The congestion control scheme cannot and is not required to respond to these very rapid instantaneous variations (happening over time scales well below the control loop response time). Some of these variations are "smoothed-out" in the process of uplink scheduling (especially at high loads). Additional smoothing is intentionally introduced by the rules defined for rate increase/decrease in terminals, consistent with the queue management strategy. By contrast, at low loading condition the entire variability of the offered traffic can be seen at the input of the switch buffers. The congestion control scheme should therefore respond differently in different loading conditions, but always trying to maintain stable queue size and to ensure optimum use of satellite resources. The transient behavior can be tested with ON/OFF sources or with sources which are activated at predefined times.

Robustness

A congestion control scheme is required to remain effective when the ABR traffic is mixed with other traffic classes, such as rt-VBR and UBR (case in which the capacity available for ABR services is no longer fixed), or when high variability in network loading is encountered. The scheme should also be insensitive to slight miss-tuning of parameters (due to errors in measurements and/or calculations) and should remain stable in the case of loss of control messages.

Minimal On-board Complexity

Due to physical and cost limitations of on-board hardware/software, the on-board monitoring and computing functions of a congested control scheme should be reduced to a minimum, by proper selection of the number of parameters to be monitored and of the calculations to be performed on-board. Any effort should be made to transfer to ground terminals some of the calculation tasks. The computing functions should not be sensitive to network loading condition (such as the number of ABR sources).

From all ATM service classes, the ABR class is designed to efficiently support data traffic. The ABR class is characterized by specified Peak Cell Rate (PCR) and Minimum Cell Rate (MCR) as traffic descriptors. The peak-to-peak Cell Delay Variation (CDV) and max Cell Transfer Delay (CTD) are not specified as QoS measures. The Cell Loss Ratio (CLR) can be specified at system level (it is system-specific). The efficiency of a congestion control scheme will be judged by its ability to support ABR services with given CLR tolerance. CLR dependence on buffer size is the main tool used in the dimensioning of the on-board buffers.

Efficiency in supporting d traffic is ensured by subjecting the ABR traffic to congestion/flow control. ATM Forum has adopted rate-based schemes as standard for congestion control for ABR services. In a rate-based scheme the sources are provided with feedback information from the switches (reflecting their loading conditions), specifying the rates at which they can send their traffic. The ATM Traffic Management Specification V4.0 (TM4.0) defines strict rules concerning source and destination behavior, while for the switch behavior a few options are recommended and only coarsely specified. One of these options, namely the Explicit Rate Indication for Congestion Avoidance (ERICA) algorithm, has gained popularity in the past years, especially for terrestrial networks [see U.S. Pat. No. 5,805,577 entitled "ERICA: Explicit Rate Indication for Congestion Avoidance in ATM Networks", by Jain et al.].

ERICA algorithm is concerned with fair and efficient allocation of network resources to all contending sources, while preventing buffer overflow and excessive loss (or delay) of packets. This is basically achieved by controlling the transmission rates in order to reduce the flow of traffic entering the network. ERICA relies on monitoring of the cell arrival rates (as a primary metric) for ABR and higher priority traffic and of the available capacity for ABR traffic, which are then used to periodically calculate (every averaging interval) the fair share and the Explicit Rate (ER) at which each terminal is allowed to send its traffic. The ERs (one for each ABR virtual connection) are signaled to the sources by using Resource Management (RM) cells. An improved version of ERICA, called ERICA+, also monitors the queue length as a secondary metric, to detect congestion situations and control the queue size. The use of queue size, in conjunction with some threshold value, allows for more efficient capacity utilization (by dynamically modifying the link target rate), while attempting to maintain stable queue size.

The ERICA algorithm is an end-to-end (source-destination) congestion control scheme. Each source generates an RM cell after a given number of traffic cells or after a pre-set time interval has expired. The RM cells carry congestion/flow control information, the key parameters being the Current Cell Rate (CCR) and the ER. Other parameters include RM cell direction (DIR), backward notification (BN), congestion indication (CI) and no increase (NI), which are set or used by various components of the virtual connection (source, switches, destination), in agreement with the behavioral conformity rules defined in TM4.0.

The RM cells travel along the network and the destination returns them to the source. Each switch sets the ER to the maximum value it can support, if this is smaller than the current rate (set by other switches). In the scheme called Virtual Source Virtual Destination (VSVD), derived from ERICA, the end-to-end link is split in segments and the flow of traffic is controlled independently within each segment. Consequently the elements of the network (particularly the buffers) will be dimensioned based on the delay-bandwidth product for the segment which contains the network element under consideration and not by the delay-bandwidth product of the whole network. At the splitting points the network will have to behave as virtual source and virtual destination.

ERICA/ERICA+ algorithms have also been adapted to satellite environment and its performance evaluated based on simulation models [see A. Iuoras et al., "Quality of Service-Oriented Protocols for Resource Management in Packet-Switched Satellites", Fourth KaBand Utilization Conference, Venice, Nov. 2–4, 1998]. ERICA algorithm was implemented in all uplinks (in order to ensure fairness), while ERICA+ was implemented in all downlinks (in order to ensure fairness and stable downlink queues). For both uplinks and downlinks the queuing was performed per downlink destination, while the calculations were performed for each virtual connection (per-VC accounting). The terminal processing required by the algorithm was integrated with the request mechanisms of the UL scheduler. The simulations have shown that ERICA/ERICA+ algorithms can ensure stable network operation, while offering high bandwidth utilization. The required on-board buffer size, however, can be rather large, and the overall throughput can suffer (at high network loads) due to the high overhead introduced by the RM cells.

Consequently, there is a need to provide a more efficient method for ABR traffic management in satellite networks. This method should take advantage of the broadcast nature of the satellite and should take into account the access schemes and switching techniques specific to satellite networks, in order to optimize the utilization of satellite resources while guaranteeing QoS for ABR services.

OBJECTS OF THE INVENTION

It is therefore an object of the present invention to provide an efficient method for congestion avoidance on-board the satellite in order to support ABR services with given cell loss tolerance.

It is a further object of the present invention is to exploit the broadcast nature of the satellites in order to provide ground terminals with feedback information required to control their transmission rates.

It is still a further object of the present invention to ensure fair and efficient allocation of satellite resources to all contending sources.

Another object of the present invention is to integrate the congestion avoidance scheme with the multiple access scheme and switching techniques specific to satellite networks, in order to achieve efficiency in satellite resource utilization.

Yet another object of the present invention is to reduce the on-board computational requirements of the congestion avoidance scheme, by transferring some of the calculations to the ground terminals.

A final object of the present invention is to define the rules for terminal behavior in agreement with the switch algorithm. According to these rules the control should be exercised on the requests (of rates at which terminals are allowed to send their traffic) and not on the transmission rates, in order to avoid any waste of capacity.

SUMMARY OF THE INVENTION

According to one aspect of the present invention, a method is proposed to efficiently support ABR services over packet-switched satellite networks. Supporting ABR services means providing minimum capacity guarantee and flow control for ABR sources, in order to prevent excessive cell loss or delay for ABR traffic, resulting from congestion of on-board satellite resources. The proposed method for congestion avoidance relies on dynamic close-loop reactive flow control to respond to changes in network loading conditions. It requires continuous monitoring of cell arrival rates (for ABR and higher priority traffic), ABR capacity requests, downlink buffer occupancy and number of ABR sources, in order to calculate the fair rate and the amount of rate adaptation in each uplink channel and each downlink channel. It then determines the final fair rate and rate adaptation (increase, decrease or no change) for each UL-DL combination.

The proposed switch algorithm, which is responsible for the calculation of fair rate and rate adaptation, is a rate-based flow control algorithm like the ERICA/ERICA+ algorithm developed for ATM networks, but unlike ERICA/ERICA+ it does not rely on the flow control—related functionality of an ATM switch and does not use RM cells to carry congestion-related information to terminals. It uses instead regular data cells to broadcast to all terminals, as per another object of this invention, the information that controls the allocation of transmission rates of ABR terminals. The new method and algorithm are therefore called Broadcast Rate Control Allocation (BRCA). The terminals use the appropriate information from the control messages (which are periodically updated, every averaging interval) to determine the amount of uplink capacity they are allowed to request in each frame. The requests for capacity are handled by the uplink scheduler, which implements the functionality of the uplink access protocol. The rate-based flow control in terminals is thus fully integrated with the request mechanisms of the uplink access protocol, according to another object of the present invention. By exercising the rate control on the request rates (and not on the transmission rates), the waste of uplink capacity is minimized. Once the requests are granted (by the UL scheduler), the terminals are responsible for distributing the assigned capacity to various traffic classes and for transmitting the traffic packets.

The UL access protocol considered in the preferred embodiment of the present invention, referred to as DUAP, is EMS's version of CFDAMA protocol, which was briefly introduced in the background section. Due to its request/assignment mechanisms DUAP is capable of providing flexible and efficient utilization of uplink capacity while supporting a diversity of services, including ABR services. The present invention can be used with any other uplink access protocol capable of supporting ABR services, which means providing capacity guarantee up to MCR and capacity on demand subjected to flow control for rates in excess of MCR.

BRCA scheme is based on the view of the satellite system as a tandem of two-server queuing system. The first server is the uplink scheduler, with queuing performed in ground terminals, while the second server is the downlink scheduler, with queuing performed on-board the satellite. BRCA algorithm is implemented in each uplink channel and each downlink channel. In the uplink channels it is concerned with reaching fairness among all contending sources, while in the downlink channels it is concerned with reaching fairness and optimum loading conditions. In order to reach fairness the algorithm calculates the fair rate and the required amount of rate adaptation for each uplink channel and each downlink channel, based on measurement results from previous averaging interval. In order to achieve optimum loading in the downlink channels the algorithm attempts to keep the load close to a target value and the queue size below a threshold value.

In BRCA algorithm the final rate and the amount of rate adaptation are determined for each uplink-downlink combination and not for each virtual connection (VC), as in the case of ATM-compatible schemes, which results in reduced on-board computational requirements, as per another object of this invention. The signaling needs will be significantly reduced as well, with positive impact on algorithm's overall bandwidth efficiency. By contrast, the terminals are required to calculate for themselves, from the set of control messages, the Allowed Cell Rates (ACR) at which the requests for ABR capacity can be made.

The full scope of applicability of the present invention will become more apparent from the detailed description and the examples provided below. It should be understood that the detailed description and the specific examples, while indicating preferred embodiments of the invention, are given for illustration only, since various changes and modifications within the spirit of the invention can be imagined.

BRIEF DESCRIPTION OF THE DRAWINGS

The present invention exists in the construction, arrangements and combinations of various parts of the method herein. The invention and its stated objects will be better understood by an examination of the following descriptions, together with the accompanying drawings, in which:

FIG. 5-$b$ is a graphic representation of the delay versus load in a general network.

FIG. 6-$b$ illustrates in flow chart form the actions in the port algorithm which take place on receiving a traffic cell.

FIG. 6-$c$ illustrates in flow-chart form the actions in the port algorithm which take place on receiving a request for capacity.

FIG. 9-$b$ illustrates in flow-chart form the part of the OBNC algorithm for the output ports dealing with the queue control and adaptation of downlink target capacity.

FIG. 11-$b$ illustrates in flow-chart form the terminal algorithm for the adjustment of the allowable cell rate for ABR traffic.

FIG. 15 defines the loading scenario 1 (LS1), for an unbalanced network configuration with two types of terminals.

FIG. 16 defines the loading scenario 2 (LS2), for an unbalanced network configuration with four types of terminals.

DETAILED DESCRIPTION OF THE PREFERRED EMBODIMENTS

Reference will now be made in detail to the preferred embodiments of the invention, an example of which is illustrated in the accompanying drawings. It should be appreciated that the method described in this invention may be implemented in any satellite system with on-board switching, through hardware and/or software configuration. The following acronyms will be used in the description of drawings:

| | |
|---|---|
| ABR | Available Bit Rate |
| ACR | Allowable Cell Rate |
| ATM | Asynchronous Transfer Mode |
| BN | Backward Notification |
| BRCA | Broadcast Rate Control Allocation |
| CBR | Constant Bit Rate |
| CCR | Current Cell Rate |
| CF-DAMA | Combined Free-Demand Assignment Multiple Access |
| CDV | Cell Delay Variation |
| CI | Congestion Indication |
| CLR | Cell Loss Ratio |
| CTD | Cell Transfer Delay |
| CSC | Common Signaling Channel |
| DIR | Direction |
| DL | Down Link |
| DUAP | Dynamic Uplink Assignment Protocol |
| ER | Explicit Rate |
| ERICA | Explicit Rate Indication for Congestion Avoidance |
| FCA | Free Capacity Assignment |
| GEO | Geostationary Earth Orbit |
| HP-VBDC | High Priority VBDC |
| IBR | In-Band Request |
| ICR | Initial Cell Rate |
| JT | Jitter Tolerant |
| LP-VBDC | Low Priority VBDC |
| MAC | Medium Access Control |
| MCR | Minimum Cell Rate |
| MF-TDMA | Multi Frequency Time Division Multiple Access |
| NC | Network Controller |
| NOC | Network Operation Center |
| NI | No Increase |
| NRM | maximum Number of RM cells a source may send for each forward RM cell |
| NRT-VBR | Non-Real Time Variable Bit rate |
| OBNC | On-Board Network Controller |
| OBR | Out-of-Band Request |
| OPNET | OPtimized Network Engineering Tool |
| PCR | Peak Cell Rate |
| QoS | Quality of Service |
| RBDC | Rate-Based Dynamic Capacity |
| RC | Reserved Capacity |
| RF | Radio Frequency |
| RIF | Rate Increase Factor |
| RM | Resource Management |
| RT | Real Time |
| RT-VBR | Real-Time Variable Bit Rate |
| S-Aloha | Slotted Aloha |
| SCR | Sustainable Cell Ratio |
| TDM | Time Division Multiplexing |
| TRM | maximum Time between RM cells |
| UBR | Unspecified Bit Rate |
| UCG | Uplink Carrier Group |
| UL | Uplink |
| UT | User Terminal |
| VBDC | Volume-Based Dynamic Capacity |
| VC | Virtual Channel |
| VCI | Virtual Channel Identifier |
| VSVD | Virtual Source - Virtual Destination |

Figure 1:
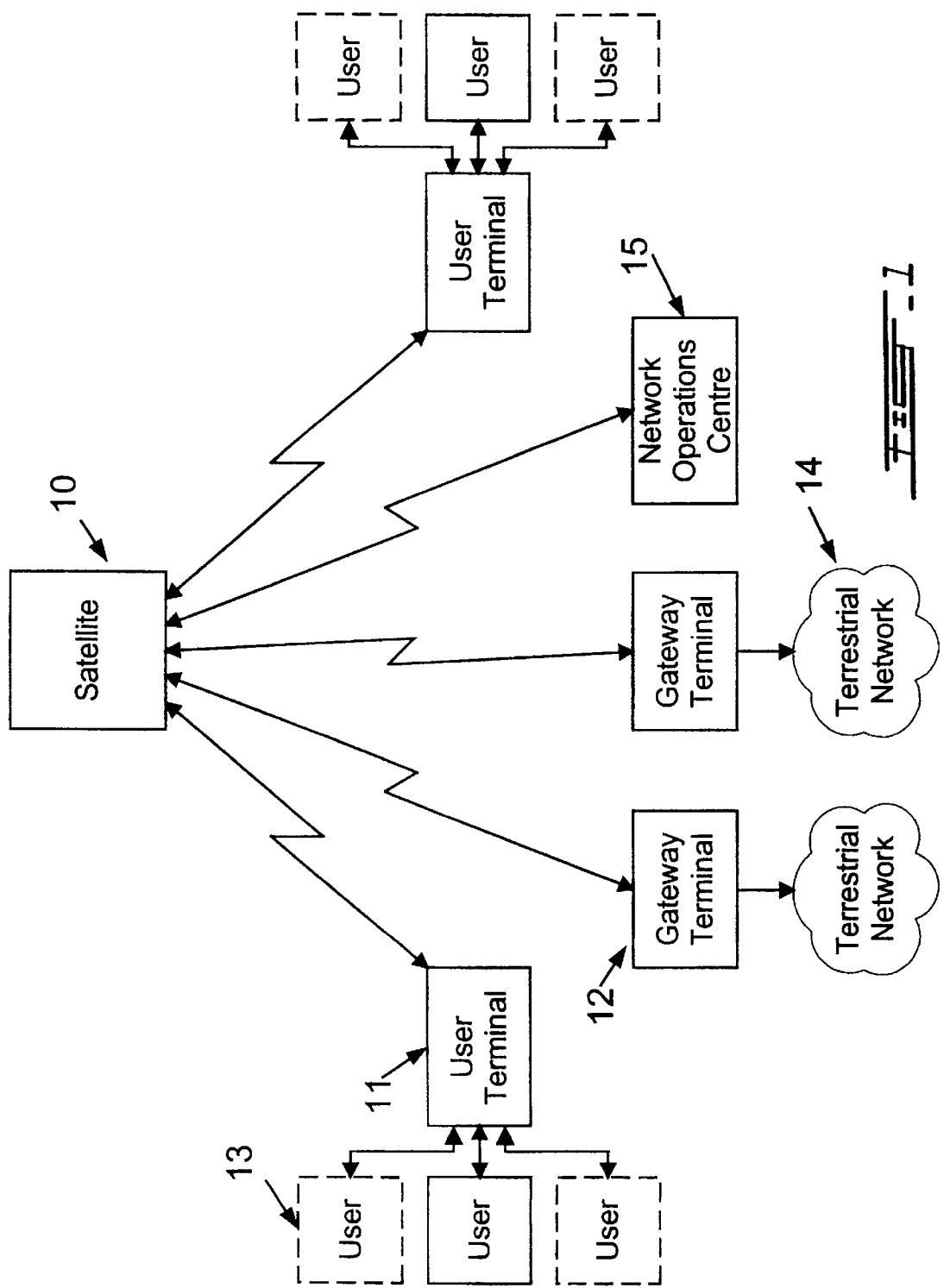
FIG. 1 is an illustration of a general overview of a typical satellite system with on-board packet switching, capable of supporting ATM services.

Referring now to FIG. 1, it illustrates a typical satellite system (network) of the type described by C. Black e.a. The system is capable of supporting a multi-beam antenna system, in conjunction with a frequency reuse scheme. It includes a satellite 10, a large population of residential or business User Terminals (UTs) 11, a number of Gateway Terminals (GTs) 12 and a Network Operations Center (NOC) 15.

A typical user terminal supports multiple end users 13—a situation which is common for multimedia applications. The traffic from such terminals can be a combination of voice, video and data traffic. Data traffic may be carried by using ABR services or UBR services, but only ABR services can provide some level of QoS guarantee. The gateway terminals make possible the interfacing of the satellite network with terrestrial networks 14.

The satellite comprises a payload, which handles the communication functions, and a bus, which provides essential services to the payload (power, telecommand and telemetry, station keeping, structural support and thermal management). The payload itself can be divided between the On-Board Processor (OBP) and the RF communication section, which handles the interface between the OBP and the RF links to/from the terrestrial elements of the system. The OBP is capable of providing packet switching/routing and to operate with uplink and downlink schedulers.

The UT to satellite uplink uses a Multi-Frequency Time Division Multiple Access (MF-TDMA) frame structure, consisting of a number of carriers organized into Uplink Carrier Groups (UCGs). Each UCG services a set of UTs which are located in a common antenna beam coverage region. Each UT is assigned to a single UCG at log-on time, but a given antenna beam coverage region may be serviced by more than one UCG. An uplink channel is associated with one UCG. One uplink scheduler can handle more than one uplink channel.

Figure 2:
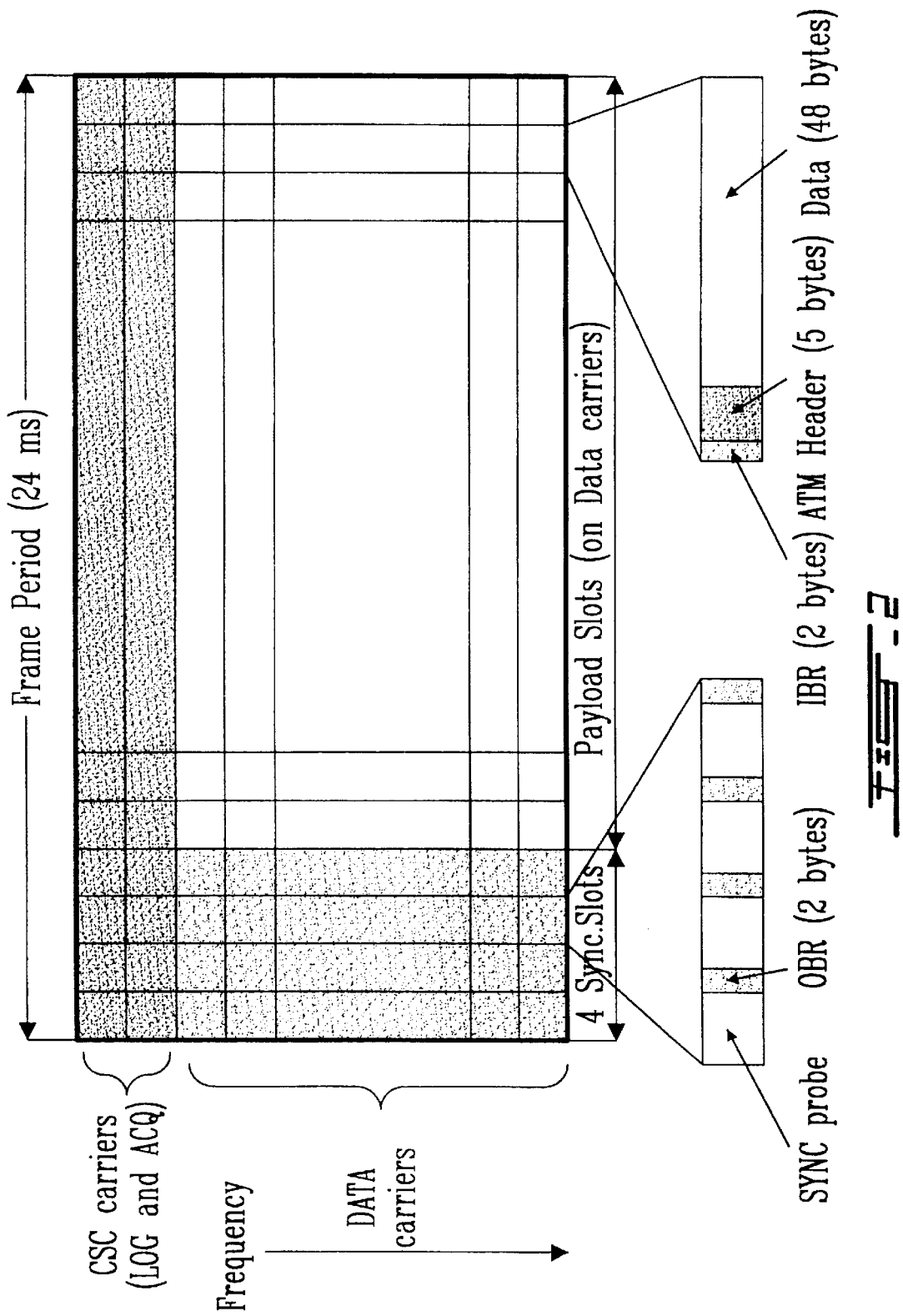
FIG. 2 gives a typical MF-TDMA frame structure used for the satellite uplink channel

The sharing of uplink channel capacity by terminals is governed by the uplink access protocol. The DUAP, which is EMS's version of CFDAMA uplink access protocol, is considered in the preferred embodiment of this invention. It is capable of providing bandwidth guarantee for real-time applications and bandwidth on demand for jitter-tolerant applications (including ABR data), based on four capacity assignment strategies, as described in the background section. The DUAP is based on a MF-TDMA frame structure, capable of providing efficient and flexible bandwidth utilization. A typical illustration of the frame structure is given in FIG. 2. Each frame, of duration T (24 msec. assumed in the illustration), consists typically of a number of Common Signaling Channel (CSC) carriers, for initial log-on requests (using S-Aloha) and satellite acquisition, and a number of DATA carriers. Each carrier supports a number of synchronization (SYNC) slots (four in the illustrated case), composed of SYNC probes for synchronization maintenance, shared on a multiframe interval basis (typically 384 msec–1 sec) and Out-of-Band Request (OBR) minislots, used for initial capacity request. Data is transmitted in payload slots in ATM-like cell format, which includes, as a minimum, an additional 2-byte header to support In-Band Requests (IBR) for UL capacity. Two bits in the IBR field (and similarly in the OBR field) are used to identify the type of capacity requested (i.e. RC, RBDC, HP-VBDC, LP-VBDC), while the other bits are used for the number of slots requested. The satellite-specific header may include other information (such as cell type and cell destination), depending on the specific design of the on-board switch. Each payload slot can be used by any type of connection, be it real-time or non-real-time. A terminal can transmit data on any data carrier but is not allowed to use more than one carrier at a time, in order to minimize output power requirement and reduce hardware complexity in terminals.

Uplink access protocol functions are implemented by the uplink scheduler, located on-board the satellite in the present embodiment of the invention. The scheduler supports several request/assignment strategies, as indicated in the background section, so a number of options are available for ABR traffic, depending on whether MCR is zero or not. If MCR=0, all requests for capacity will be made using HP-VBDC strategy. ABR traffic with non-zero MCR (which implies the need for capacity guarantee) will be mapped into a combination of RBDC (or RC) and HP-VBDC scheduling strategies. For the MCR component, capacity will be either guaranteed (RBDC strategy) or reserved (RC strategy) up to R=$\lceil$MCR·T$\rceil$ slots per frame, where T is the duration of a frame and $\lceil x \rceil$ is the integer ceiling of x. Any other request for capacity above the source's MCR will be signaled using HP-VBDC strategy. Notice that the requests based on HP-VBDC strategy are subject to the control exercised by the congestion control scheme, so that they look more like rate-based requests (in cells/frame, as the requests will be updated every frame). In all explanations that follow, even if the word 'reserved' is used, it is understood that R corresponds to either reserved or guaranteed capacity, function of the scheduling strategy. With RC strategy no request is involved for the MCR component, while with RBDC strategy requests need to be made and they are guaranteed (in compliance with MCR definition) up to the value of R. It is expected that RC strategy will give marginally better performance than RBDC strategy (in terms of delay), though it can introduce (depending on loading conditions) some inefficiency in UL capacity utilisation.

Notice that in the present embodiment of the invention the FCA strategy will not be used for ABR traffic, as it might lead to potential uplink capacity wasting. FCA was designed to improve performance for JT applications. In the present invention the performance for ABR services is guaranteed by the combined action of uplink scheduling and congestion control, without counting on free slots.

The corresponding satellite to UT downlink uses a single Time Division Multiplexing (TDM) carrier to service the same set of terminals as the UCG. A downlink channel is associated to one TDM carrier. For the typical system considered in this invention it is assumed that there is a one to one correspondence between any UCG and the associated downlink in both the terminals covered and the beam coverage patterns. The sharing of downlink channel capacity by terminals is governed by the downlink scheduler, which builds TDM frames for each link, based on traffic priorities.

The present invention is based on an architecture where the traffic is transported over the satellite system in ATM-like packets, but the on-board switch does not need to fully support the functionality of the ATM standard, including the functionality related to flow/congestion control. The switch needs instead to be customized in order to perform functions specific to the method and algorithm described in the present invention. These functions are not part of any standard packet structure. The compliance of the proposed scheme to the ATM standard should therefore be seen in light of its ability to guarantee the level of support provided by an ATM network for ABR services. From this prospective the BRCA scheme is implemented at the link layer (ATM layer). Nevertheless, it may be desirable to preserve the functionality associated with the ATM standard, in order to facilitate the integration of the satellite system into a broader ATM network. The information contained in the ATM header will be used/modified function of the level of compatibility of the on-board switch to the ATM standard.

It is an object of the present invention to provide an efficient method for congestion control/avoidance in a satellite system, in order to support ABR services with given cell loss tolerance. It is a further object to exploit the broadcast nature of the satellites in order to provide ground terminals with feedback information required to control their transmission rates. The proposed method and scheme are therefore based on close-loop reactive control, capable of responding to changing loading conditions. Due to the long propagation delay encountered particularly in GEO satellites, no feedback scheme can respond fast enough to rapid changes in traffic. Sufficient buffer memory in the switch should therefore be provided in order to prevent excessive packet loss or total collapse of the network under congestion conditions. The present method tries to minimize the buffer memory required to maintain the cell loss ratio below a specified limit. In achieving this goal it relies on the broadcast nature of the satellite and on the use of a flexible and efficient uplink access protocol.

Figure 3:
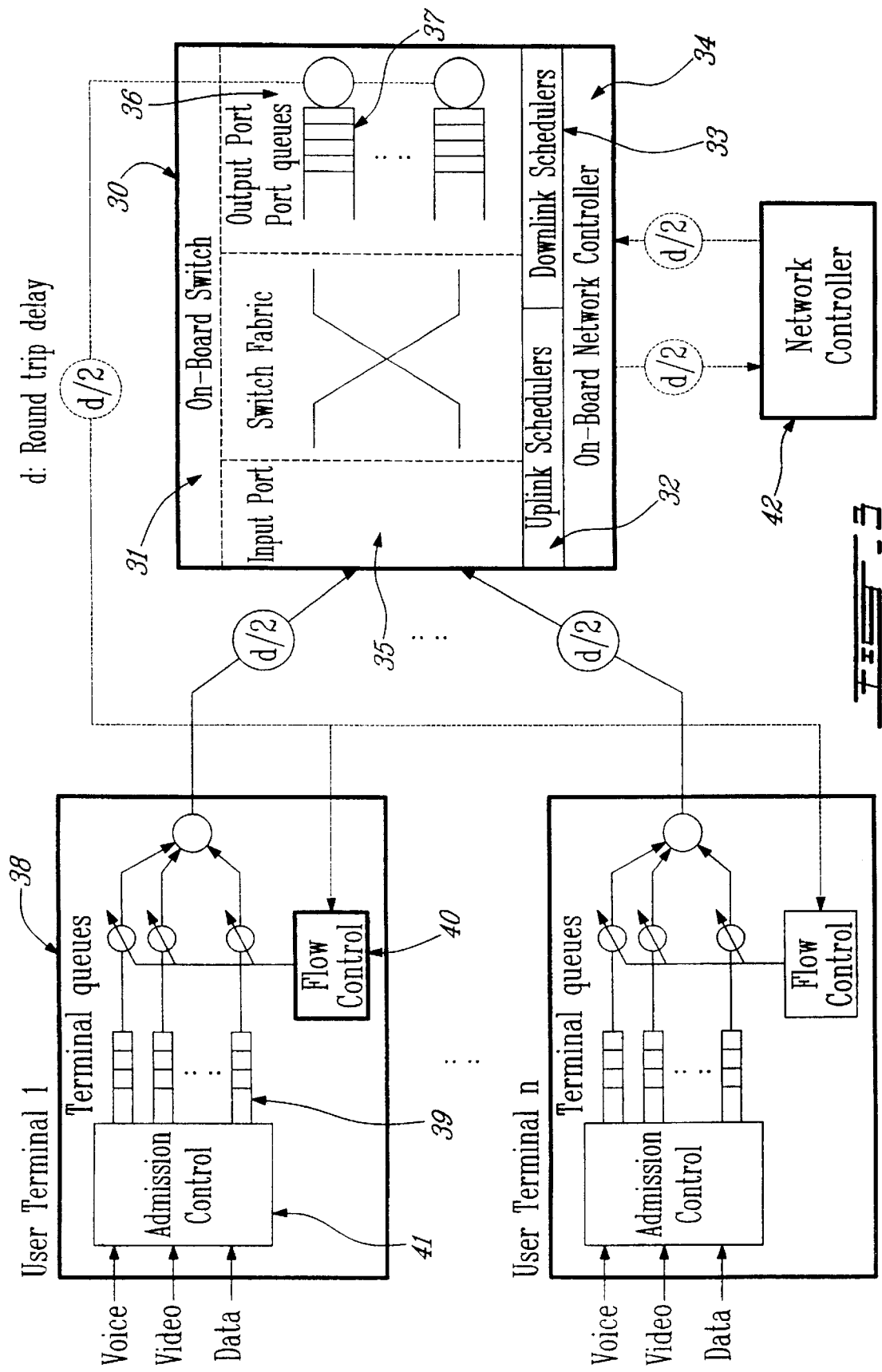
FIG. 3 is an illustration of a block diagram of a reactive congestion control scheme for a satellite with on-board switching.

A block diagram of a reactive congestion control scheme is shown in FIG. 3. The on-board processor 30 includes the on-board switch 31, the uplink scheduler 32, the downlink scheduler 33 and the On-Board Network Controller (OBNC) 34. The on-board switch is made of the input ports 35, the output ports 36 (where the queuing is performed, in the buffers 37) and the switch fabric itself. The user terminal 38 includes the queues 39 and the flow control 40. The admission control 41 is actually implemented by the Network Controller (NC) 42, which is part of the network operations center. The control signals generated on-board the satellite reach the terminals after d/2 seconds, where d is the round trip delay (typ. 0.25 seconds for a GEO satellite).

Even if the BRCA scheme is implemented at link layer, as indicated before, it is not and end-to-end (source-destination) flow control scheme, as recommended for ABR services. It is rather a source-to-node (terminal-satellite) control scheme. In order to allow end-to-end flow control when the satellite is integrated into a broader ATM network, the network could be segmented and VSVD concept implemented at satellite system boundaries.

For the explanations that follow assumption is made that only one uplink channel is associated with each input port in the OBP, and only one downlink channel is associated with each output port in the OBP (in general one port can support more than one channel). Consequently, input port and output port will alternatively be used for uplink channel and downlink channel, respectively.

From the point of view of the congestion scheme the satellite network is seen as a tandem of two-server queuing system. The first server is the uplink scheduler, with service rate equal to the uplink channel capacity and queuing performed on ground (in terminals). The second serve is the downlink scheduler with service rate equal to the downlink channel capacity and queuing performed in the output port of the switch.

The on-board switch is considered a contention-free output-buffered switch, i.e. it always has enough resources to transfer the traffic from an input port to an output port and congestion can only occur in the output port. Hence, congestion control only needs to be enforced in the downlink channels, in order to maintain a reasonable cell loss ratio in the conditions of a rather limited switch buffer size, due to cost, mass and power constraints associated with the on-board implementation. Additional control will be applied in both uplink and downlink channels in order to enforce fairness in resource allocation. The queue size in terminal could also be managed by a congestion control scheme involving the end users and the terminals, but this is outside of the object of the current invention. When performance of the scheme proposed in this invention is evaluated, assumption is made that ABR buffer size in terminals is infinite.

Figure 4:
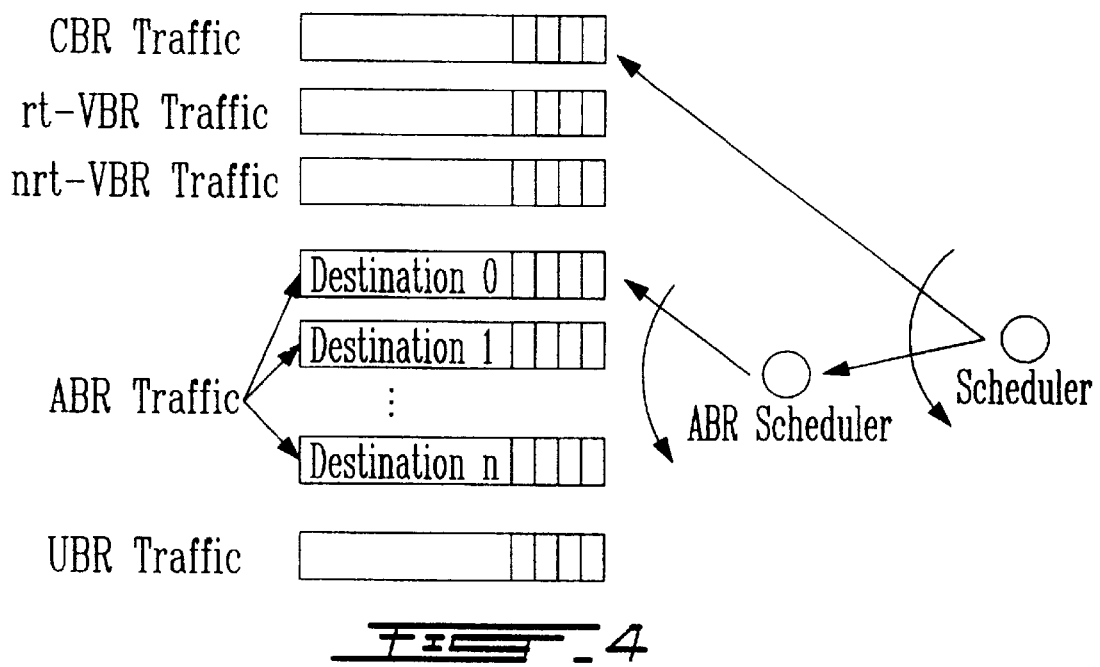
FIG. 4 is an illustration of the queuing structure implemented in the user terminals, with ABR queues for each downlink destination.

The downlink scheduler places a higher priority on satellite's control messages and high priority traffic, which includes CBR, rt-VBR and nrt-VBR traffic. Hence, lower priority traffic, such as ABR and UBR, needs to be queued until the DL scheduler has finished servicing the high priority traffic and control messages. Ideally, ABR traffic should be queued separately for each virtual connection (VC), and correspondingly downlink transmission should also be scheduled per-VC. However, per-VC queuing requires complex on-board hardware and/or software, especially when one takes into account the large number of VCs encountered in the satellite networks (hundreds of thousands or millions). This will have negative impact on payload power and mass budgets. It is therefore considered that on-board per-VC queuing is not the best option with today's technology. A more reasonable approach is therefore to consider that on-board queuing of ABR traffic is performed per downlink destination. In this context per-VC queuing in ground terminals (although feasible) may not bring much benefit. The ABR traffic will therefore be queued per downlink destination in terminals as well (i.e. the traffic corresponding to various VCs going to the same destination will be queued in the same buffer). The terminal queuing structure is shown in FIG. 4. One ABR queue is indicated for each destination, while only one queue is used for each of the other traffic classes (regardless of traffic destination), namely CBR queue, rt-VBR queue, nrt-VBR queue and UBR queue.

Figure 5A:
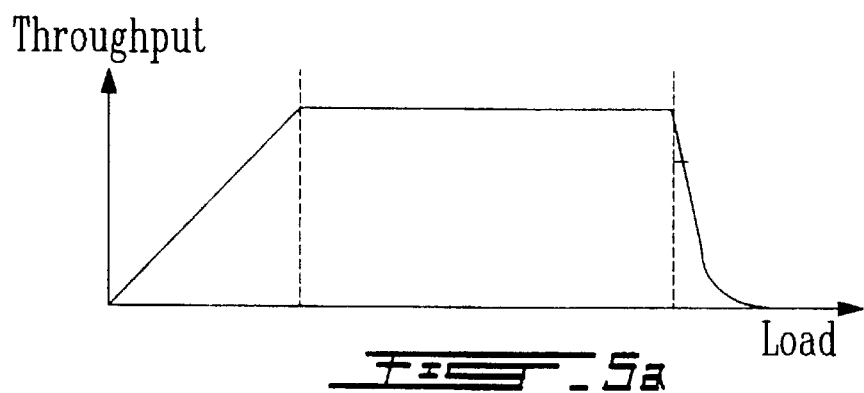
FIG. 5-$a$ is a graphic representation of the throughput versus load in a general network.
Figure 5B:
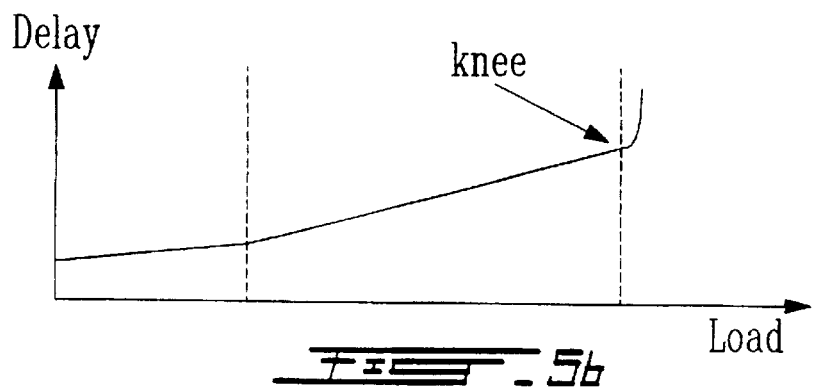

Based on the block diagram in FIG. 3 and the congestion model adopted for the satellite, the Broadcast Rate Control Allocation (BRCA) method is proposed, in order to meet the objects defined for the current invention. BRCA is concerned with reaching fairness situation in the uplink channels, and fairness and optimum loading situation in the downlink channels. The optimum loading situation, given by the "knee" in the throughput-delay curve FIG. 5, is the point where the queuing delay starts to increase rapidly as the load approaches 100%.

In the BRCA scheme the satellite broadcasts the fair rates at which the user terminals can request capacity (and eventually transmit traffic) for each of their downlink destinations. In addition, the satellite also broadcasts the amount of rate adaptation (rate increase, decrease or no change), depending on the loading conditions in the input and output ports, so that each terminal can adjust its allowed cell rate accordingly. These control messages (i.e. fair rates and rate adaptation) are periodically updated, every measurement (or averaging) interval. An averaging interval corresponds to a fixed integer number of MF-TDMA frames.

The calculation of fair rates and rate adaptation is the responsibility of BRCA switch algorithm. It is based on monitoring of cell arrival rates (for ABR and higher priority traffic), ABR capacity requests, downlink buffer occupancy and number of active ABR sources in each measurement interval. The number of active ABR sources is readily available from network management data base or can be determined from the header of each cell. Cell arrival rates for high priority traffic (control messages, CBR, rt-VBR, nrt-VBR traffic) and capacity requests for ABR traffic are used to detect congestion in the uplink channels (input ports). Cell arrival rates for both high priority and ABR traffic are also used to detect congestion situations in the downlink channels (output ports). The algorithm sets a target load for both uplink and downlink channels. It then controls cell arrival rates of ABR traffic, so that the target load in the input channels is not exceeded, and the target load (or optimum load) in the downlink channels is achieved. In order to reach the optimum load in the downlink channels while avoiding congestion, BRCA algorithm monitors (like ERICA+) the downlink queue size as an additional metric. Unlike ERICA+, however, BRCA algorithm does not attempt to maintain a stable downlink queue size (target value), as this could introduce unfairness during the assignment process. It only attempts to maintain the queue size below a certain maximum value.

The calculation of the fair rate and rate adaptation is performed at the end of every averaging interval for each uplink and each downlink channel. The algorithm then determines the final fair rate and the amount of rate adaptation (increase, decrease or no change) for each uplink-downlink combination, and prepares a set of control messages for broadcasting to every active terminal. Upon receiving of control messages the terminals extract the relevant information in order to make their requests for capacity. By exercising the rate control on the request rates (and not on the transmission rates), the algorithm attempt to avoid any waste of capacity. Once the requests are granted (by the UL scheduler), the terminals are responsible for distributing the assigned capacity to various traffic classes and for transmitting the traffic packets.

One should observe that BRCA algorithm does not calculate VC shares and explicit rates for each connection (as in the case of ERICA), to be signaled to ground terminals. It only calculates the fair rates, loading conditions and rate adaptation in the input and output channels. Consequently, the on-board processing requirements are significantly reduced compared to those of ERICA algorithm, as per one object of this invention, and so are the signaling requirements (as there is no per-VC information to be downlinked). More processing is instead required in the ground terminals, in order to calculate/adjust the allowed cell rates for each destination. For signaling of congestion-related information the BRCA algorithm does not rely on RM cells, but on regular data cells, which are broadcast to all terminals at regular intervals (e.g. every averaging interval, which can be as small as the duration of a MF-TDMA frame). It is therefore expected that BRCA algorithm provides a more efficient control than ERICA algorithm, as it reacts faster to congestion situations.

The complete BRCA algorithm can be divided into three sub-algorithms, namely the port algorithm, the OBNC algorithm and the terminal algorithm. The port algorithm is mainly composed of various congestion control—related measurements performed by the input and/or output ports. The OBNC algorithm involves calculations of fair rates and rate adaptation, based on port measured parameters. Finally, the terminal algorithm controls how terminals react to fair rates and other control messages broadcast by the satellite. Each of these algorithms will be explained in details in the following sections.

In the current embodiment of the invention the part of the BRCA switch algorithm involving the calculation of fair rates and rate adaptation is implemented on-board the satellite (in the OBNC). No modification would be required if the switch algorithm were implemented on ground (in the network controller 24 in FIG. 3). Performing the above operations on ground only affects the signaling and system's response time, since one round-trip delay is needed for port information to arrive at the network controller and the corresponding control messages to arrive at the satellite's output ports (in order to be broadcast).

The Port Algorithm

The port, as a whole, is responsible for measuring capacity requests for ABR traffic, cell arrival rates for ABR and higher priority traffic and the number of ABR sources, and for monitoring downlink queue size and the amount of capacity guaranteed for ABR traffic. The high priority traffic includes control messages, CBR, rt-VBR and nrt-VBR traffic. At the end of each averaging interval the port sends its measurement results to the OBNC.

The arrival rates and capacity requests can be measured in either the input ports or the output ports. In the present embodiment of the invention the measurement tasks are handled by the input ports, since performing the tasks in the output ports would require more intensive hardware/software processing, due to greater aggregation of traffic in the output ports. Nevertheless, the downlink queue sizes can only be monitored in the output ports. In the input port the measurements are performed per uplink carrier group (or uplink channel), while in the output ports they are performed per downlink carrier (or downlink channel or destination). Each user terminal belongs to one UCG and may transmit traffic on any of its UCG's carriers. More than one UCG may be supported by each input port and more than one downlink carrier may be supported by each output port. For the sake of simplicity of algorithm description, it is assumed that each input port handles only one UCG and each output port handles only one downlink carrier, so that any reference to an input port or an output port can be substituted by a reference to an uplink channel or a downlink channel, respectively, and vice-versa.

In each frame, the input port measures the ABR and higher priority cell arrival rates and the total capacity requested for ABR traffic, for each of the satellite's output ports. In addition, in order to handle ABR sources with non-zero MCR, the input port also monitors the total amount of guaranteed (reserved) capacity for each output port. It also measures the total number of ABR sources (or terminal weights) sending traffic to each of the output ports. Each terminal is given a weight for each of its ABR traffic destinations, which relates to the number of VCs established in the terminal for that particular destination (e.g. the weight is 1 for one VC, 2 for two VCs etc). In counting the number of active ABR sources, the input port also takes into account the sources which have not sent any traffic but have sent requests for capacity, through either OBR or IBR fields. This approach will give a better estimate of the number of active sources sharing an uplink channel, since it counts the contribution of terminals which use free capacity assignments or OBR fields to send their requests. The tasks of an output port are much simpler than those of an input port, as the output port is only responsible for monitoring its queue size.

Figure 6B:
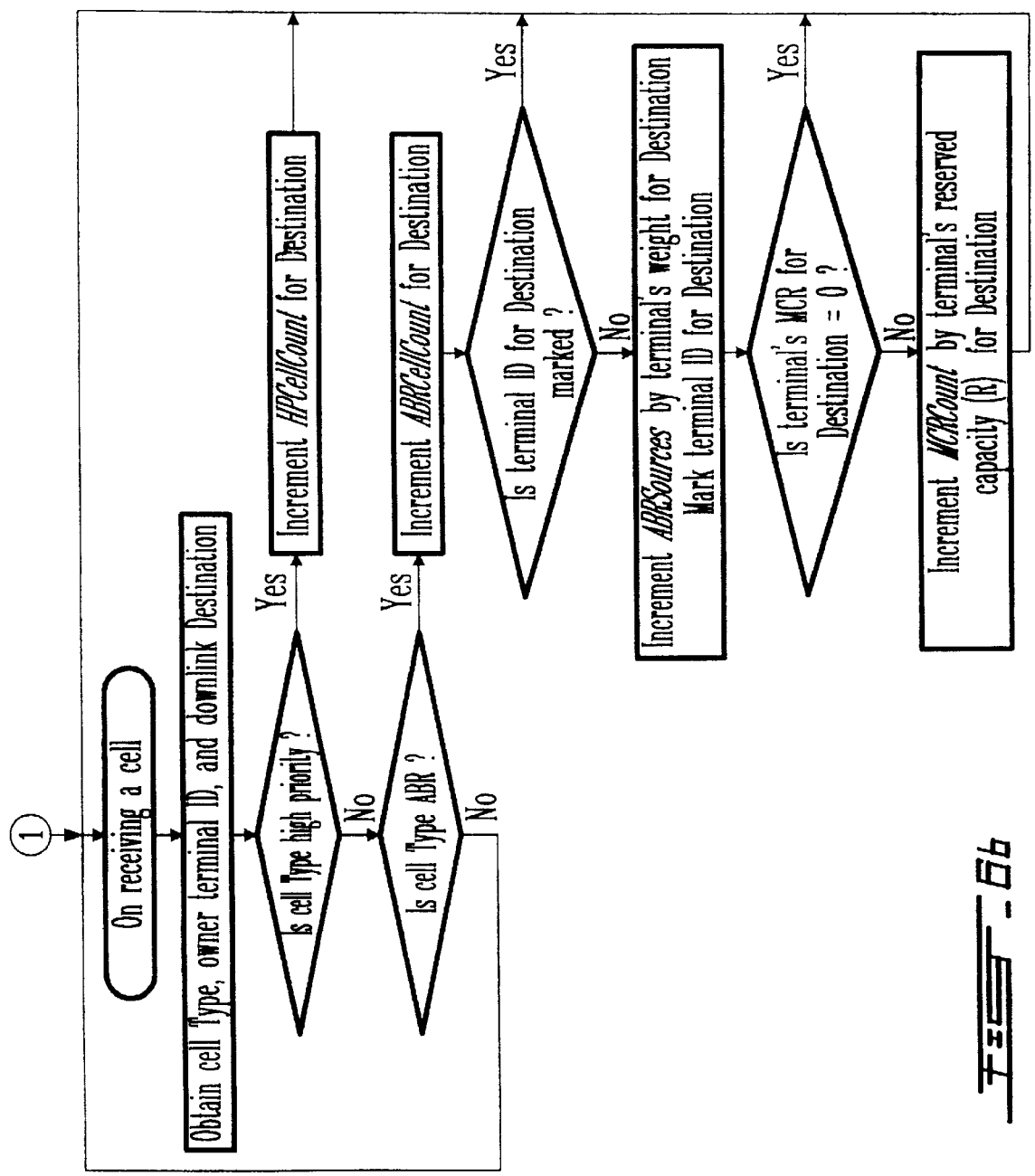
FIG. 6-$a$ illustrates in flow-chart form the overall port algorithm.
Figure 6C:
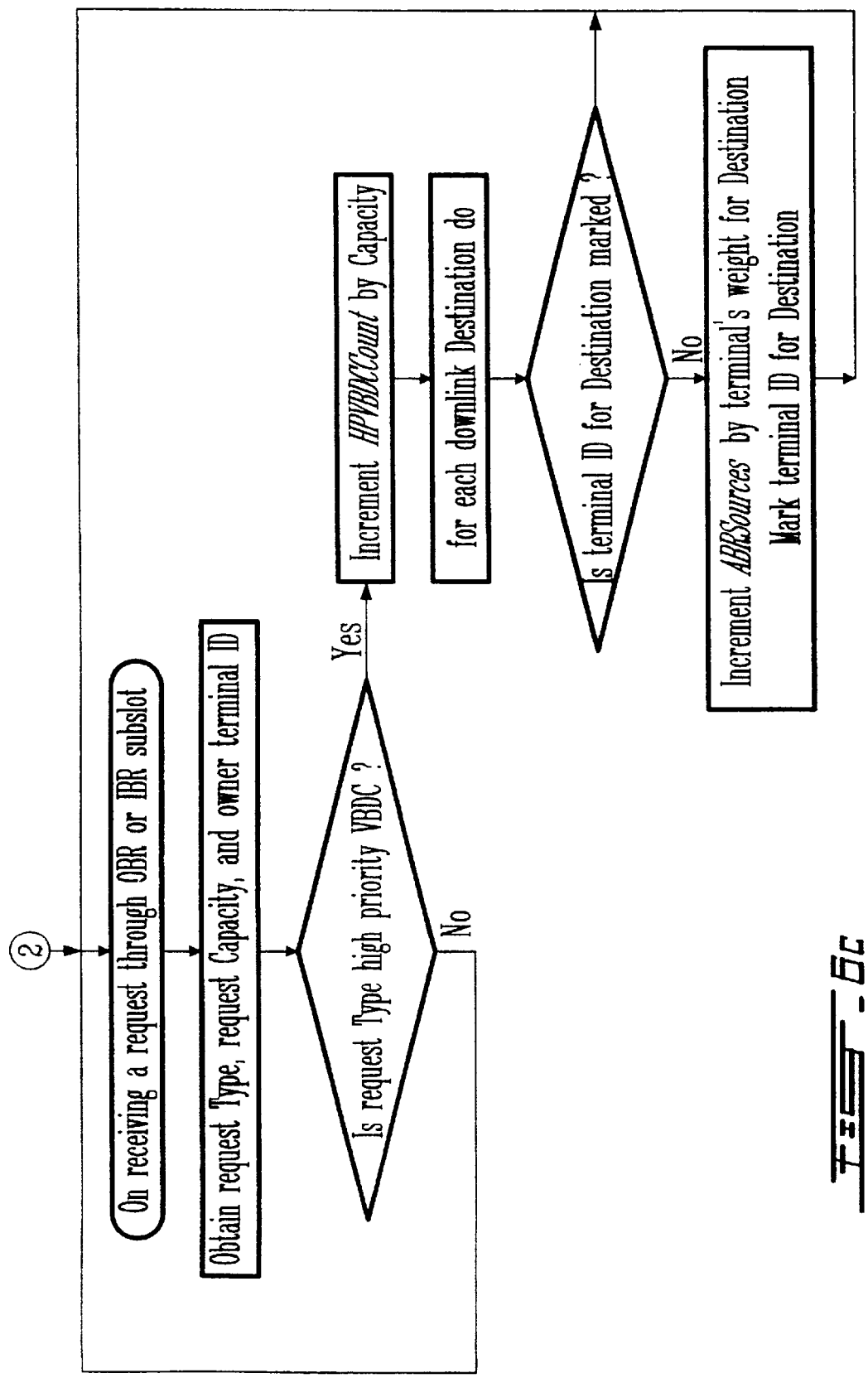

The complete port algorithm is described in flowchart form in FIG. 6-*a*, FIG. 6-*b* and FIG. 6-*c*. The algorithm is made-up of a number of segments including actions which take place at initialization, on the receiving of a cell, on the receiving of a request and at the end of each averaging interval. The functions performed in each segment can be easily understood from the flowchart. It should be noted that two sets of variables (counters) are used: one set to record events which take place in the current frame (i.e. MF-TDMA frame) and another set to record events which take place in the current averaging interval. They are initialized according to their scope (see FIG. 6-*a*). Cell counts (both per frame or totals) are kept in separate variable for each downlink destination. At the beginning of each averaging interval the measurement results from the previous averaging interval are sent to the OBNC for processing. At the end of each frame the averaging interval counters are incremented with the corresponding values recorded in the frame counters.

During each frame the cell counting process follows the steps in FIG. 6-*b*. At the receiving of a cell, its type and downlink destination are extracted from the header, while the owner terminal ID is obtained by cross-referencing slot position in the frame with the burst time plan for the frame (kept in OBP data base). Cell counting is performed separately for each downlink destination. A terminal sending ABR traffic to a given destination is marked as active for that destination. In order to avoid capacity waste, in the calculation of capacity set aside (guaranteed or reserved) to account for non-zero MCR, only the terminals actively sending ABR traffic are taken into consideration.

During each frame the request counting process follows the steps in FIG. 6-*c*. Only the requests for ABR traffic in excess of MCR are counted, as up to MCR the capacity is guaranteed by the UL scheduler. The requests can be made using either IBR or OBR mechanisms, the type of request and the requested capacity being extracted from the relevant bits in the OBR or IBR fields. When IBR field in the cell header is used, the request is automatically made on behalf of the terminal which owns the cell, so the terminal is already marked as active. When OBR field in the SYNC slot is used, the request is made on behalf of a terminal whose ID is associated (as part of network synchronization process) with that particular SYNC slot of the given frame. As the terminal might not send any ABR data in that frame, the terminal will be marked as active (based on the presence of a request for capacity) for the DL destination associated to it at connection set-up time. At the end of each frame the active terminals are unmarked in preparation for the next frame.

The On-Board Network Controller Algorithm

Figure 7:
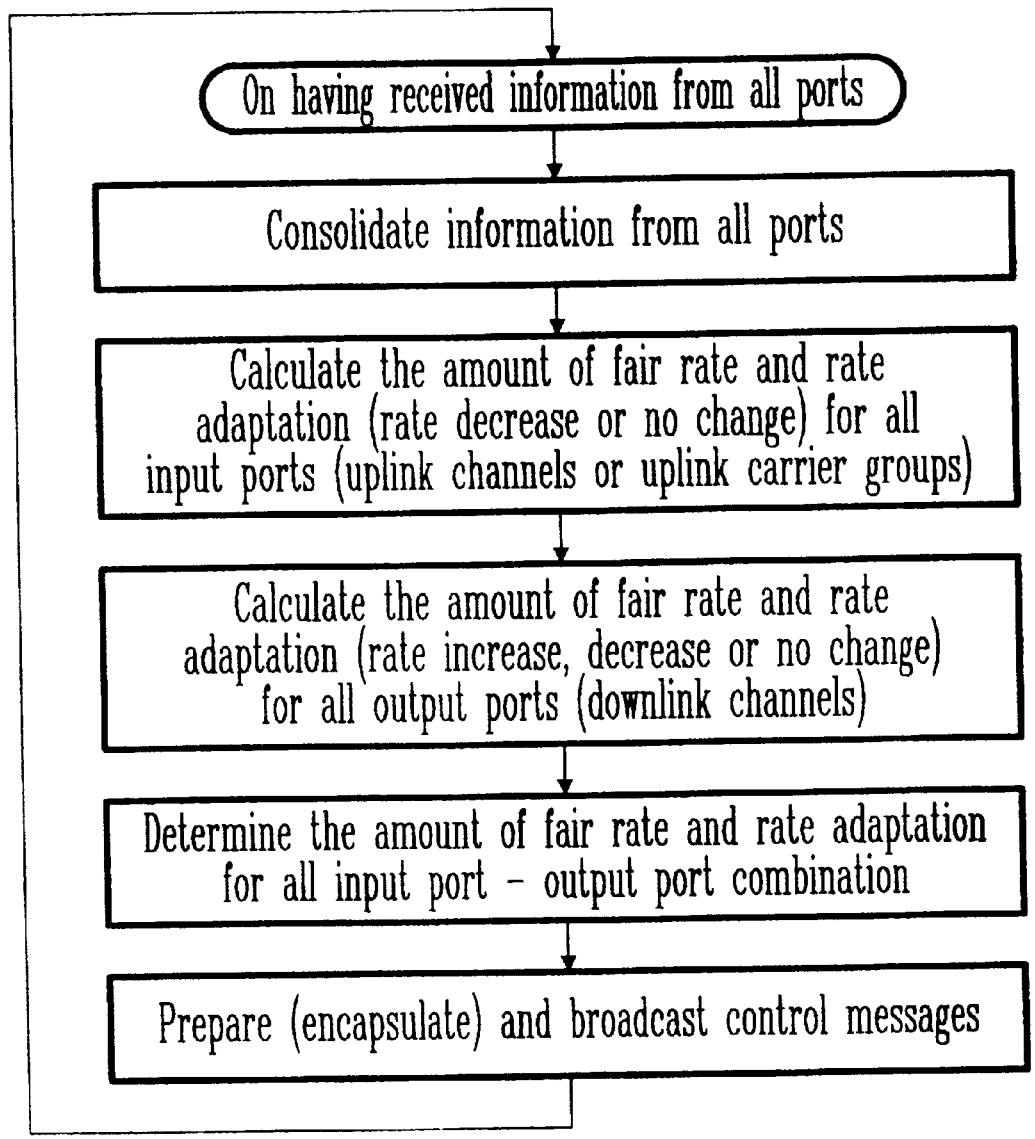
FIG. 7 gives the summary of the main part of BRCA switch algorithm, as implemented in the on-board network controller.

At the beginning of each averaging interval the OBNC receives from all switch ports the congestion-relevant information acquired in the previous averaging interval. Once information from all ports has been received, the OBNC starts processing this information and finally prepares congestion control messages for broadcasting to user terminals. A set of congestion control messages will be sent for each UCG in every measurement interval. A set of congestion control messages for one UCG group contains the fair rates and the amount of rate adaptation (increase, decrease or no modification, according to port loading conditions) for all downlink destinations to which connections have been established from all terminals within that UCG. The subset of control messages for one uplink-downlink combination (or input port—output port pair) is determined after the fair rate and rate adaptation have been individually calculated for each input port and each output port. This requires to first consolidate (sort out) the monitored information received from all input ports. A top-level flow diagram of OBNC algorithm is depicted in FIG. 7.

The complete OBNC congestion control algorithm (switch algorithm) can be summarized as follows. The algorithm is invoked once information from all ports is received, which means that it is executed once every measurement interval. The monitored information from all input ports is first consolidated, both per source (input port) and per destination (output port). Then the OBNC calculates the fair rates and the required amount of rate adaptation in each input port (rate decrease or no change) and each output port (rate increase, decrease or no change). This means that the switch algorithm is executed for each input port and each output port. As the tasks performed for the two ports are not exactly the same, there will be one OBNC algorithm for the input ports and another one for the output ports. The OBNC determines next the final fair rate and the amount of rate adaptation for each input port—output port combination. The OBNC will then prepare for broadcasting a set of control messages for each UCG, to be used by terminals in that UCG.

The user terminals listen to their downlink channels, extract the relevant control messages as they arrive and act accordingly, i.e. by increasing their allowed cell rates under underload condition and by decreasing tow allowed cell rate under overload co on (with respect to the fair rate). The response of user terminals to the control messages will be described in the terminal part of the BRCA algorithm.

The Consolidation Process

The consolidation sub-algorithm is the first segment of the OBNC algorithm. The information sent by all ports every averaging interval needs to be consolidated (sorted out) in order to obtain the total number of high priority and ABR cells, the total number of slots guaranteed for ABR sources with non-zero MCR and the total number of ABR sources in each input and output ports. The pseudocode for the consolidation process algorithm is described below. The indices src and dest are used in the pseudocode to organise the monitored information by source (input port or uplink channel) and by destination (output port or downlink channel), respectively.

The Pseudocode for the Consolidation Process
For each input port (src) do
    Initialize TotalInPortHPCellCount (src)
    Initialize TotalInPortMCRCount (src)
    Initialize TotalInPortABRSources (src)
End For
For each output port (dest) do
    Initialize TotalOutPortHPCellCount (dest)
    Initialize TotalOutPortABRCellCount (dest)
    Initialize TotalOutPortMCRCount (dest)
    Initialize TotalOutPortABRSources (dest)
End For
For each input port (src) do
    For each output port (dest) do
        TotalInPortHPCellCount (src) = TotalInPortHPCellCount (src)+TotalHPCellCount (src,dest)
        TotalInPortMCRCount (src)=TotalInPortMCRCount (src)+TotalMCRCount (src,dest)
        TotalInPortABRSources (src) = TotalInPortABRSources (src)+TotalABRSources (src, dest)
        TotalOutPortHPCellCount (dest) = TotalOutPortHPCellCount (dest)+ TotalHPCellCount (src, dest)
        TotalOutPortABRCellCount (dest) = TotalOutPortABRCellCount (dest)+ TotalABRCellCount (src, dest)
        TotalOutPortMCRCount (dest) = TotalOutPortMCRCount (dest)+TotalMCRCount (src, dest)
        TotalOutPortABRSources (dest) = TotalOutPortABRSources (dest)+TotalABRSources (src, dest)
    End For
End For The requests for ABR capacity need not be consolidated, as they are used only in the OBNC algorithm for the input ports and they are measured in each input port. The same is true for the size of the queues in the output ports of the switch, as they are monitored in the output ports and only used for calculations relevant to the output ports.

The OBNC Congestion Control Algorithm for the Input Ports

The OBNC algorithm for the input ports is concerned with reaching fairness in all uplink channels (input ports). In order to reach fairness the algorithm calculates the fair rate and the required amount of rate adaptation for each input port (rate decrease or no change), based on consolidated results from the previous measurement interval.

The rates are normally expressed in cell/sec. As the present invention applies to satellite communications, for which frames of known duration (T) are used for the transmission on both uplink and downlink channels, it is convenient to express the rates in cell/frame, as it is done in this embodiment of the present invention. This not only simplifies some calculations, but—even more important—is consistent with the fact that for all scheduling strategies the assignments are made in cell/frame.

The resulting totals from the consolidation process may have high variances from one measurement interval to another, which might lead to underestimation of some measured parameters, with direct impact on the accuracy of the calculated control parameters. This can translate into a departure from optimum operation conditions or instability of the algorithm (excessive oscillations). In order to reduce the impact of high variances, the resulting totals are averaged using the exponential averaging formula:

$$\bar{X}_{new}=(1-\alpha)\cdot\bar{X}_{old}+\alpha\cdot X$$

where $\bar{X}_{old}$ and $\bar{X}_{new}$ are the old and new averages, respectively, X is the current value and α determines the contribution of the current value to the average value, while (1−α) indicates the decaying of the contribution from the old average to the new average. The smaller the value of α, the larger the contribution from past averaging intervals and the less sensitive the algorithm is to measurement errors. In the same time, however, the algorithm becomes less responsive to real changes in network conditions. The value of α should therefore be carefully selected as a result of a trade-off between the tolerated measurement errors and the desired responsivness of the algorithm.

A typical example of underestimation of a measured parameter is offerred by the number of active ABR sources. Due to the burstiness of data traffic, a source might be inactive in the current measurement interval, even if it was active in recent intervals. Not counting the source as active would lead to a higher fair rate (as will be shown shortly), which can bring the input port to congestion. Averaging the number of active ABR sources would reduce the amount of underestimation. To the same effect, a source sending in a given frame a request for capacity but no traffic (using free slots or an OBR field) is also considered active, as it was already suggested. The exponential averaging of the number of active ABR sources is performed in the preferred embodiment of the currrent invention for each input port, according to the relation:

AvgInPort*ABR*Sources(*src*)=(1−α)·Avg*n*InPort*ABR*Source(*src*)+ α·TotalInPort*ABR*Sources(*src*)

For the same rational the exponential averaging will also be applied for the count of cells guaranteed/reserved for the active ABR sources with non-zero MCR, according to the relation:

AvgInPort*MCR*Count(*src*)=(1−α)·AvgInPort*MCR*Count(*src*)+α·TotalInPort*MCR*Count(*src*)

The averaging is also beneficial in the case of cell counts. When the capacity available for ABR traffic changes as a result of changes in instantaneous higher priority traffic (for which capacity was reserved), the fair rates and load measured in successive intervals may be considerably different. The exponential averaging for the number of high priority (HP) cells will be performed based on the relation:

AvgInPort*HP*CellCount(*src*)=(1−α)·AvgInPort*HP*CellCount(*src*)+ α·TotalInPort*HP*CellCount(*src*)

Finally, in order to reduce the impact on load calculation of the variance of ABR capacity requests (see below), exponential averaging will be performed based on the relation:

AvgInPort*HPVBDC*Count(*src*)=(1−α)·AvgInPort*HPVBDC*Count(*src*)+α·TotalInPort*HPVBDC*Count(*src*)

It should be noticed that all the above exponential averages are calculated every measurement interval, which may include an integer number of frames. In order to obtain average values per frame (i.e. rates), the average number of counts over the measurement interval should be divided by the measurement interval.

As stated previously, the BRCA algorithm sets a target load $\rho_u$ on each input port, so that input port target capacity can be expressed as:

InPortCapacity=$\rho_u$·*m*·UplinkCapacity where m is the duration of the measurement interval (in number of frames) and UplinkCapacity is the capacity of the uplink channel (UCG capacity). The target load is typically set to 0.9 or 0.95. Notice that actually InPortCapacity is the uplink target capacity corresponding to m frames, so it can be directly combined in the calculations that follow with results from measurements averaged over the measurement interval (and not over the frame duration). The final fair rates will still be obtained in cell/frame, as needed. The advantage of this approach is to reduce the computing requirements of the algorithm, which is important for an on-board implementation.

The current fair rate (for requests, in cell/frame) for each input port can then be calculated with the relation:

$$CurrentInPortFairRate = \left( \frac{InPortCapacity - AvgInPortHPCellCount - AvgInPortMCRCount}{AvgInPortABRSources}, 0 \right)^+$$

where $(a,b)^+$ means the maximum of a and b. The numerator in the above relation represents the uplink capacity which is available for ABR traffic in excess of MCR (and, with lower priority, for UBR traffic, if any). The more capacity is reserved for high priority traffic, the smaller will be the capacity available for ABR traffic and consequqently the smaller will be the fair rate. The inclusion in the calculation of AvgInPortMCRCount—the average number of guaranteed/reserved slots for ABR traffic, suggests that the broadcast fair rate is the rate at which a terminal may request capacity using the HP-VBDC strategy, on top of the capacity already guaranteed for its MCR component (based on the RBDC strategy or RC strategy). The actual fair rate at which a terminal may send its requests for capacity (and eventually its traffic) is the sum of terminal's MCR and the broadcast fair rate. If the estimated number of active ABR sources is less than one, AvgInPortABRSources in the above relation will be set to one (as a boundaruy condition).

The current load in each input port can be calculated with the relation:

$$CurrentInPortLoad = \frac{AvgInPortHPCellCount - AvgInPortMCRCount + AvgInPortHPVBDCCount}{InPortCapacity}$$

The current load is an indication of the congestion level in the input port (uplink channel). An input port is overloaded if CurrentInPortLoad>1 and underloaded if CurrentInPortLoad<1. High overload values should be avoided as they indicate excessive congestion. Low underload values are also undesirable, as they indicate underutilization of the uplink channel. The goal of the OBNC algorithm for the input ports is to prevent uplink channel overloading while maintaining fairness between all contending terminals.

Note that in the above relation AvgInPortHPVBDCCount–the average number of slots requested for ABR traffic using the HP-VBDC strategy, and AvgInPortMCRCount are used instead of AvgInPortABRCellCount–the average number of ABR cells arriving in a measurement interval. This is done for two reasons. First, if AvgInPortABRCellCount were used, the resultant CurrentInPortLoad would always be less than 1, since the maximum number of ABR cells that can arrive in each input port can never exceed the InputPortCapacity. Second, by using AvgInPortHPVBDCCount, overload and unfairness in the uplink can be detected earlier and more accurately.

When the load of an input port exceeds its target load, the algorithm recognizes this condition as leading to a potential unfairness. situation and instructs the user terminals to decrease their rates. The amount of decrease requested by the network controller depends on the method of rate decrease employed in user terminals. In the BRCA algorithm exponential rate decrease is used, since such decrease will bring the system closer to fairness condition in every step, as suggested by Jain e.a. Therefore, the amount of rate decrease (with respect to the fair rate) is calculated such that $$\text{CurrentInPortLoad} \cdot (1-\lambda_{Up})^j = 1$$

where $\lambda_{Up}$ is the amount of rate decrease requested in the input port, and j is $\lceil r/m \rceil$, with r the round trip propagation delay expressed as an integer number of frames, m the number of frames in the averaging interval and $\lceil x \rceil$ an integer ceiling of x. The amount of decrease is bounded by a maximum rate decrease, $\lambda_{dMax}$, so that the system does not become very sensitive to variation in traffic. Rate decrease $\lambda_{Up}$ can therefore be calculated with the relation:

$$\lambda_{Up} = \left(1 - e^{\frac{-\ln(\text{CurrentInPortLoad})}{j}}, \lambda_{dMax}\right)^{-}$$

where $(a,b)^+$ means the minimum of a and b. According to this relation, the amount of rate decrease is set such that the load in the input port reaches the input port target load after one round trip delay, which is when the effect of the current decrease message will be experienced in the satellite's input port (it takes one one-way propagation delay for the message to reach the user terminals, and another one one-way propagation delay for their corresponding requests to arrive at the satellite).

Since the OBNC algorithm is only concerned with fairness situation in the uplink channels, the algorithm does not instruct the user terminals to increase their allowable cell rates (ACR) when the current load of an input port is below its target load (underload condition). The decision to increase the ACRs of user terminals is based instead on the current load in the output ports, where the BRCA algorithm is also concerned with reaching the optimum loading situation, as it will be explained when the OBNC algorithm for the output ports is described.

Figure 8A:
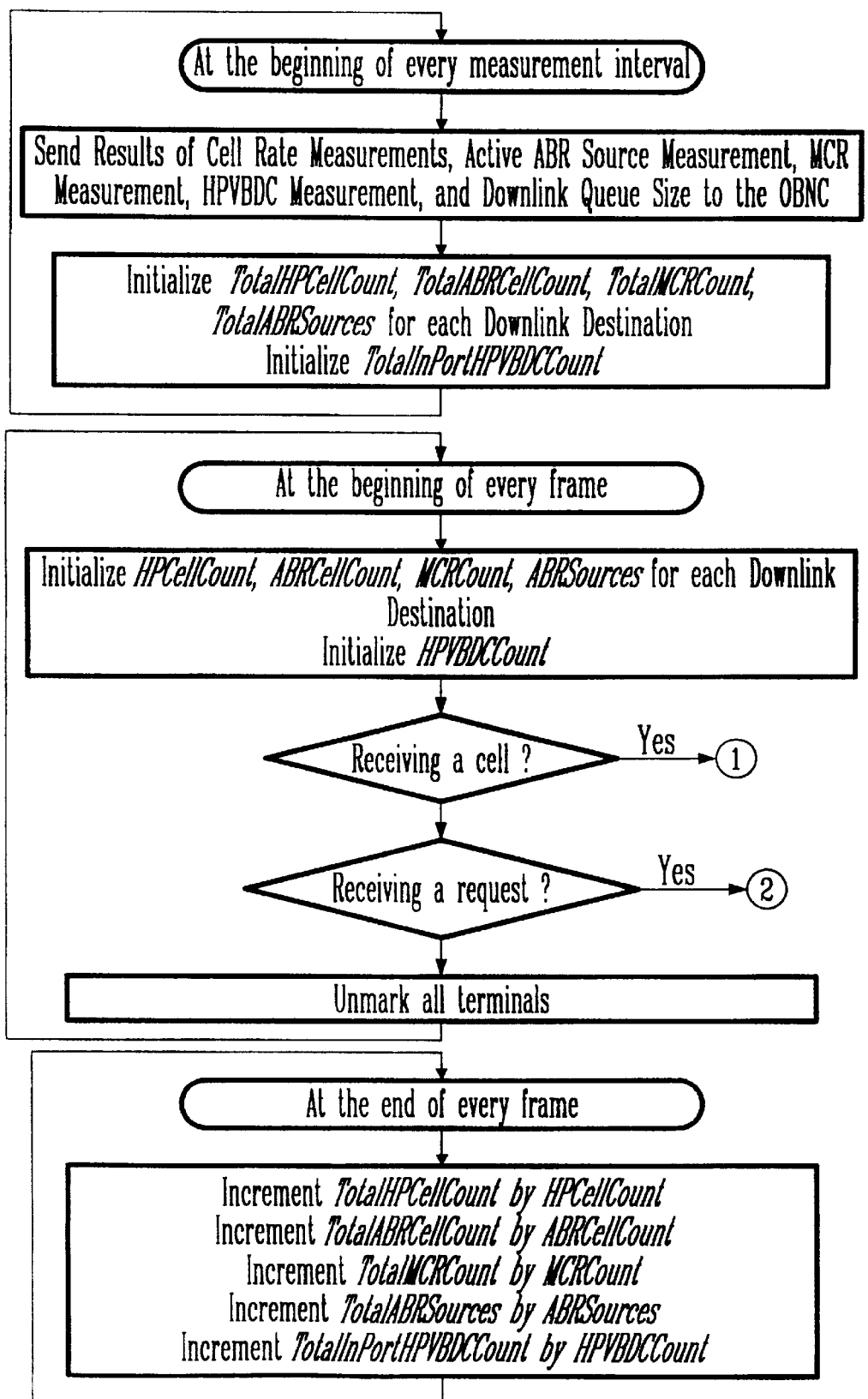
FIG. 8 illustrates in flow-chart form the OBNC algorithm for the input ports.

FIG. 8 summarizes the OBNC congestion control algorithm for the input ports. The algorithm is executed for each output port once every measurement interval.

One should note that if the capacity request for ABR traffic were not monitored (i.e. AvgInPortHPVBDCCount were not available), one could still calculate CurrentInPortLoad in the input ports based on AvgInPortABRCellCount (as for the output ports, see the OBNC congestion control algorithm for the output ports), with the observation that the fairness in the uplink port might not be achieved. As the CurrentInPortLoad is always smaller than one, the terminals might never be instructed to reduce their rates due to an overload condition in the input ports, so that rate increase/decrease will be dictated by the output port. This is equivalent to not implementing the BRCA algorithm in the input ports.

As far as AvgInPortMCRCount is concerned, if it is not monitored, one can use, for both input and output ports, the MCR values stored in the network controller data base for each connection. This would be a more conservative approach (from ABR traffic point of view), as the current average reserved/guaranteed capacity corresponding to MCR can be smaller than the sum of all MCR values configured in the network controller. This might translate into a potential waste of capacity in certain loading conditions.

The OBNC Congestion Control Algorithm for the Output Ports

The OBNC algorithm for the output ports is concerned with reaching fairness and optimum loading situation in all downlink channels (output ports). In order to reach fairness the algorithm calculates the fair rate (in cell/frame) and the required amount of rate adaptation (rate decrease, increase or no change) for each output port, based on consolidated results from the previous measurement interval. In order to achieve optimum loading the algorithm attempts to keep, in all output ports, the load close to the target value (the "knee" in FIG. 5) and the queue size below a threshold value.

Similar to the input ports, in the current embodiment of the present invention, exponential averaging is applied to all measured parameters relevant to the calculations concerning the output ports, namely the arrival rates (cell counts) for ABR and higher priority traffic, the number of active ABk sources and the guaranteed capacity for ABR traffic (corresponding to MCR count). The following exponential averaging relations will be used for each output port:

AvgOutPort*HP*CellCount(dest)=(1−α)·AvgOutPort*HP*CellCount(d-est)+α·TotalOutPort*HP*CellCount(dest)

AvgOutPort*MCR*Count(dest)=(1−α))·AvgOutPort*MCR*Count(dest)+α·TotalOutPort*MCR*Count(dest)

AvgOutPort*ABR*CellCount(dest)=(1−α)·AvgOutPort*ABR*CellCount-(dest)+α·TotalOutPort*ABR*Count(dest)

AvgOutPort*ABR*Sources(dest)=(1−α)·AvgOutPort*ABR*Sources(d-est)+α·TotalOutPort*ABR*Sources(dest)

As for the input ports, the OBNC algorithm also sets a target load $\rho_d$ on each output port or downlink channel, so that the target output capacity can be expressed as $$\text{OutPortCapacity} = \rho_d \cdot m \cdot \text{DownlinkCapacity}$$

where m is as previously defined and DownlinkCapacity is the capacity of the downlink channel. As in the case of input ports, the OutPortCapacity is actually the capacity corresponding to m frames.

The current load in each output port can be calculated with the relation:

$$CurrentOutPortLoad = \frac{AvgOutPortHPCellCount + AvgOutPortABRCellCount}{OutPortCapacity}$$

Notice that, in contrast to the calculations for the input ports, for the output ports the AvgOutPortABRCellCount is used. Due to traffic multiplexing in the on-board switch, the total load on a downlink channel can exceed channel capacity, so that CurrentOutPortLoad can be used as an indication of congestion level in the output port. If CurrentOutPortLoad>1 the output port is overloaded (congested), while when CurrentOutPortLoad<1 the output port is underutilized. The goal of the OBNC algorithm for the output ports is to maintain the current load close to one, while providing fairness between all connections.

With respect to the calculation of the fair rate, the OBNC algorithm for the output ports is substantially more complex than the OBNC algorithm for the input ports, due to the use of queue size, in addition to the other monitored parameters (cell counts for ABR and higher priority traffic, number of ABK sources, number of cells guaranteed for ABR sources with non-zero MCR). Similar to ERICA+ algorithm, BRCA algorithm also uses downlink ABR queue control as one of its mechanisms to avoid congestion. But unlike ERICA+ algorithm, which sets a target delay (or target queue size) and attempts to bring the system at target, BRCA algorithm sets a maximum delay, $D_{Max}$, for the output ports to empty their ABR queues. The rate at which an ABR queue can be drained, ABRDrainCapacity, is a fraction of the OutPortCapacity, as given by the relation:

ABRDrainCapacity=OutPortCapacity−AvgOutPort*HP*CellCount

Hence, the time required to empty a downlink ABR queue is $$D = \frac{ABRQueueSize}{ABRDrainCapacity}$$

When D is larger than the maximum delay $D_{Max}$, a larger portion of the output port capacity is set aside to allow the queue to be drained and D to be reduced below $D_{Max}$. Consequently the output port capacity (available for the current traffic) will be reduced. BRCA uses a negative exponential function for this intentional modification of draining capacity. The steps taken to calculate the capacity set aside to drain the ABR queues are described in the following paragraphs.

First, the offset of the current downlink queuing delay relative to the maximum delay is simply taken as $$offset = \frac{D - D_{Max}}{D_{Max}}$$

Next, the fraction of the output port capacity set aside for draining is calculated with the relation DrainFrac=$\beta \cdot (1-e^{-v \cdot offset})$ where $\beta$ is the maximum portion of the output port capacity that can be used to drain the queue and v is the rate parameter of the negative exponential function, which determines how fast DrainFrac reaches its maximum value when the delay offset is positive. Hence, the fraction of the output port capacity that is left for ABR and other classes of traffic is given by:

OutPortFrac=1.0−DrainFrac

The final output port capacity for the calculation of the fair rate is then:

$$OutPortCapacity = \begin{cases} OutPortCapacity, & D \leq D_{Max} \\ OutPortFrac \cdot OutPortCapacity, & D > D_{Max} \end{cases}$$

Based on the output port capacity calculated above and on results from consolidated/averaged measurements, the current value of the fair rate in an output port can be calculated with a relation similar to that used for the input ports:

$$CurrentOutPortFairRate = \left( \frac{OutPortCapacity - AvgOutPortHPCellCount - AvgOutPortMCRCount}{AvgOutPortABRSources}, 0 \right)^+$$

The only difference is that for the output ports the OutPortCapacity is not fixed anymore, but is dynamically adjusted, function of the queue size (used as an additional indication of congestion situations). Again, the actual fair rate at which a terminal can request capacity for its ABR sources is the sum of sources' MCR and the broadcast fair rate. If the estimated number of active ABR sources is less than one, AvgOutPortABRSources in the above relation will be set to one (as a boundary condition).

Using the queuing delay instead of the queue size in the above relations make the queue control function scalable with respect to various service rates (transmission rates on the downlink channels). The queue size, however, is the only measurable quantity at the switch. The queue delay will be obtained by dividing the queue size to the average ABRDrainCapacity. In order to reduce the variance of the queue size, an average value (over the measurement interval) could be used instead of the instantaneous value, as in the case of all other measured parameters.

As in the case of the input ports, the OBNC algorithm for the output ports determines whether the allowable cell rates of user terminals need to be adapted in response to the current load and downlink queue size of the output ports. In the case where the downlink queue size of an output port is large and capacity needs to be set aside for draining, the OBNC will instruct the terminals to decrease their ACRs. The amount of decrease is calculated such that the output port load reaches the value corresponding to OutPortFrac within two round-trip propagation delays, which is when the effect of the current control message will be experienced in the satellite's output ports (it takes one one-way delay for the control message to reach the terminals, one round-trip delay for requests to be granted by the scheduler, and another one-way delay for the traffic corresponding to those requests to arrive in the output ports). Hence, when CurrentOutPortLoad is larger than OutPortFrac, TargetRateDecrease (the amount of rate decrease in two round-trip propagation delays) is set $$\frac{CurrentOutPortLoad - OutPortFrac}{CurrentOutPortLoad}.$$

Otherwise, TargetRateDecrease is set to DrainFrac. The network controller then calculates the immediate amount of rate decrease required in the user terminals such that $(1-\lambda_{Dn})^k = 1 - $TargetRateDecrease where $\lambda_{Dn}$ is the amount of rate change (in this case rate decrease) requested in the downlink and k is $\lceil 2r/m \rceil$, with r and m as previously defined. As for the input ports, the amount of rate decrease is bounded by $\lambda_{dMax}$, to prevent that the system becomes overly sensitive to variations in traffic. The rate decrease is therefore given by the relation:

$$\lambda_{Dn} = \left(1 - e^{\frac{\ln(1-TargetRateDecrease)}{k}}, \lambda_{dMax}\right)^-$$

In the case where capacity does not need to be set aside for draining the queues, the network controller may request the user terminals to increase or decrease their ACRs, depending on the current load in the output ports. When an output port is overloaded, that is its current load is larger than 1, the controller instructs the earth terminals to decrease their ACRs. The amount of rate decrease XDn is calculated (as for the input ports) such that CurrentOutPortLoad$\cdot(1-\lambda_{Dn})^k = 1$ with k as previously defined. The amount of rate decrease is again bounded by $\lambda_{dMax}$, so that $$\lambda_{Dn} = \left(1 - e^{\frac{-\ln(CurrentOutPortLoad)}{j}}, \lambda_{dMax}\right)^{-}$$

When an output port is underloaded, the controller will instruct the user terminals to increase their ACRs. An output port is considered to be underloaded when its current load is slightly below 1, i.e., CurrentOutPortLoad<1−ε, where ε is the minimum load offset (a parameter of the algorithm). Following the recommendation of ATM forum for rate-based algorithms, the increase in a terminal's ACR will be linear. However, instead of using the terminal's negotiated PCR as the basis of increase, BRCA uses the broadcast fair rate as the basis of increase. The amount of rate increase is therefore calculated such that CurrentOutPortLoad·(1+$\lambda_{Dn}$·k)=1 where $\lambda_{Dn}$ is the amount of rate change (in this case rate increase) requested in the downlink and k as previously defined. The amount of rate increase is then bounded by a maximum value, $\lambda_{iMax}$, for the same reason for which the rate decrease was bounding, i.e. to prevent that the system becomes overly sensitive to variation in traffic. The rate increase can then be calculated with the relation:

$$\lambda_{Dn} = \left(\frac{1 - CurrentOutPortLoad}{k \cdot CurrentOutPortLoad}, \lambda_{iMax}\right)^{-}$$

An exception to the above described rate increase is made when an output port is intentionally brought into an underload situation. As described earlier, an output port needs to be intentionally put in an underload situation to allow the draining of its ABR queue. In this case the network controller will not request the user terminals to increase their ACRs, even though the port is underloaded. The OBNC algorithm will prevent rate increase in an output port for two round-trip delays after the last rate decrease message was issued to intentionally set aside capacity for draining the ABR queue.

Figure 9A:
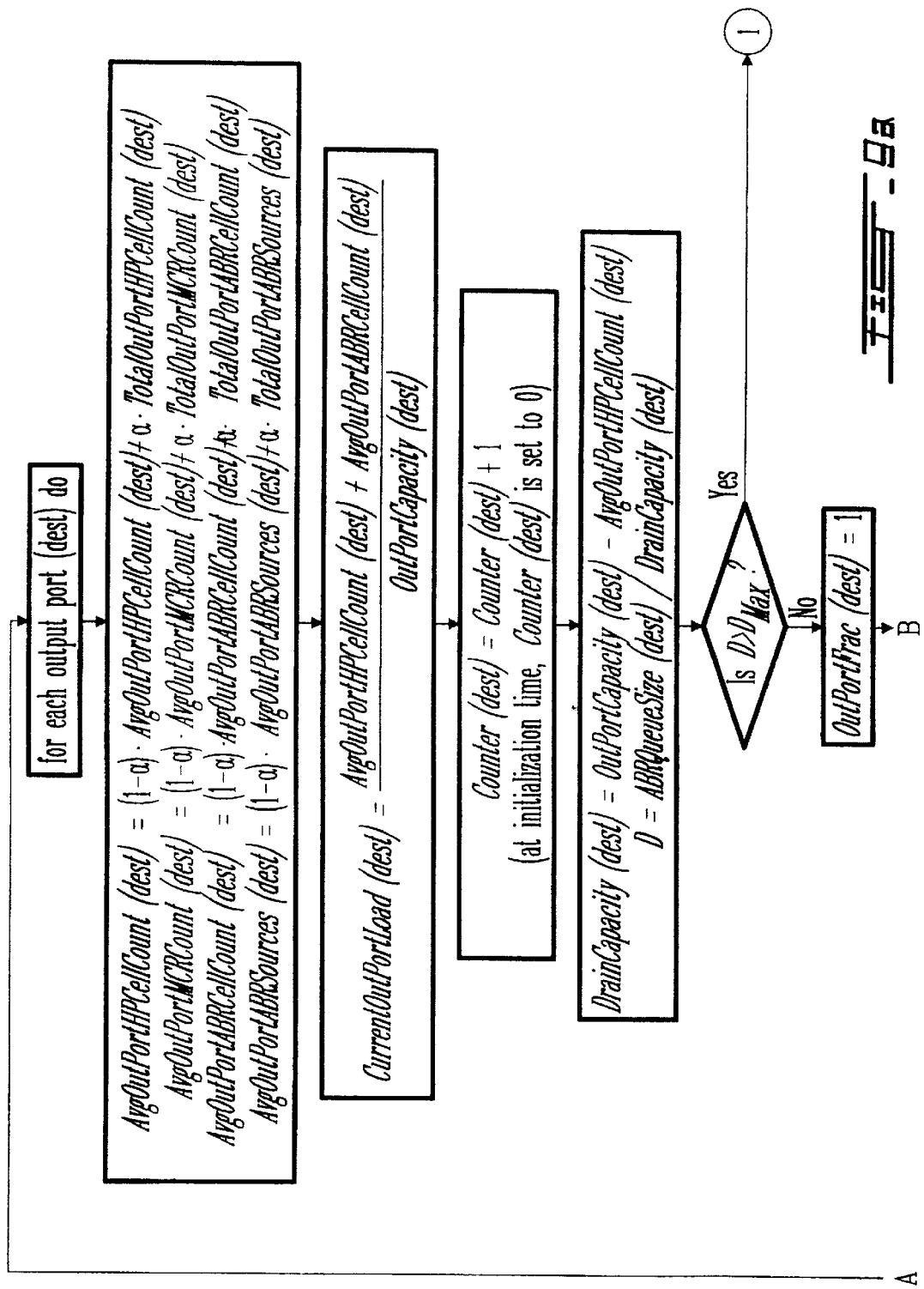
FIG. 9-$a$ illustrates in flow-chart form the main part of the OBNC algorithm for the output ports.
Figure 9B:
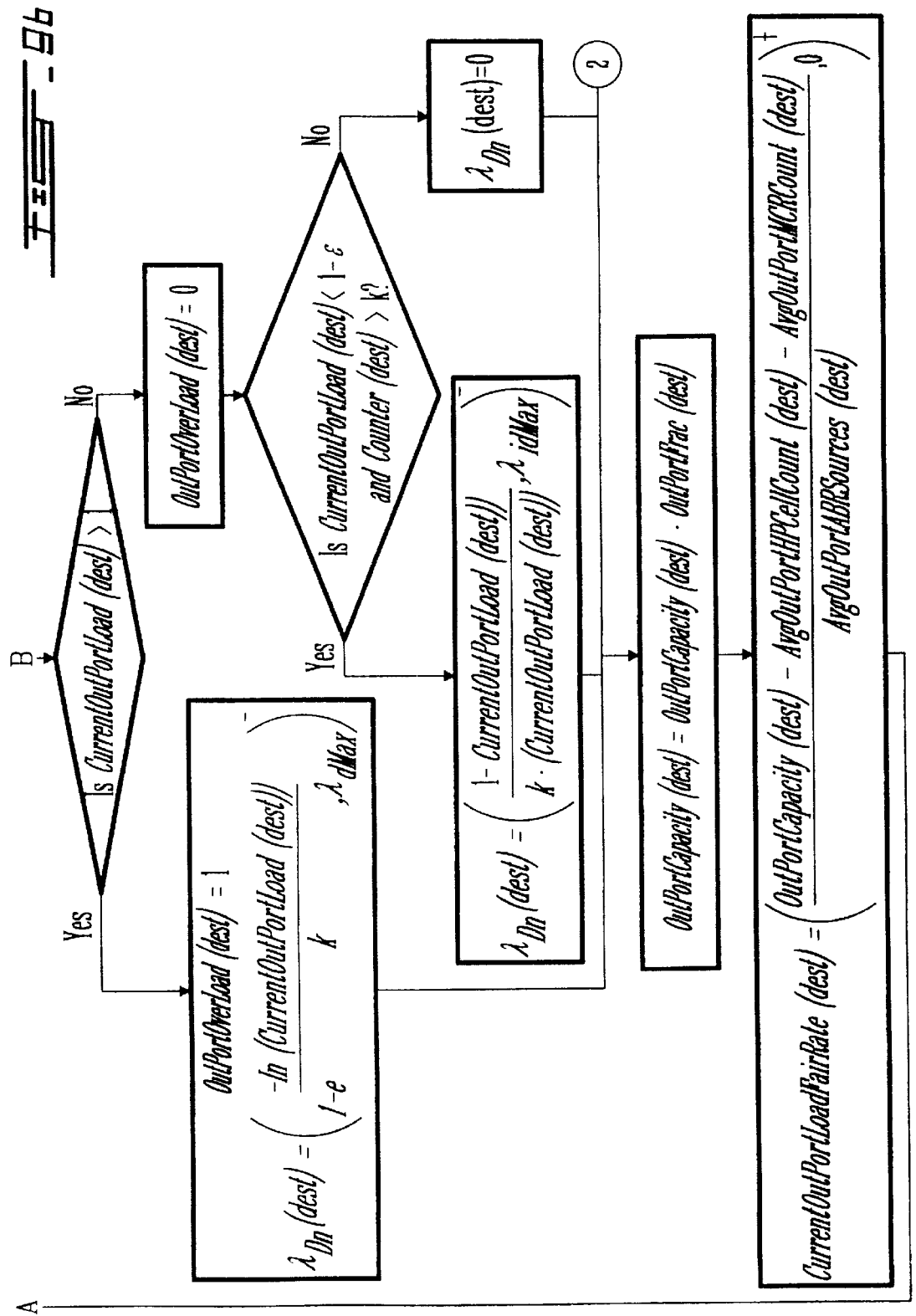
Figure 9C:
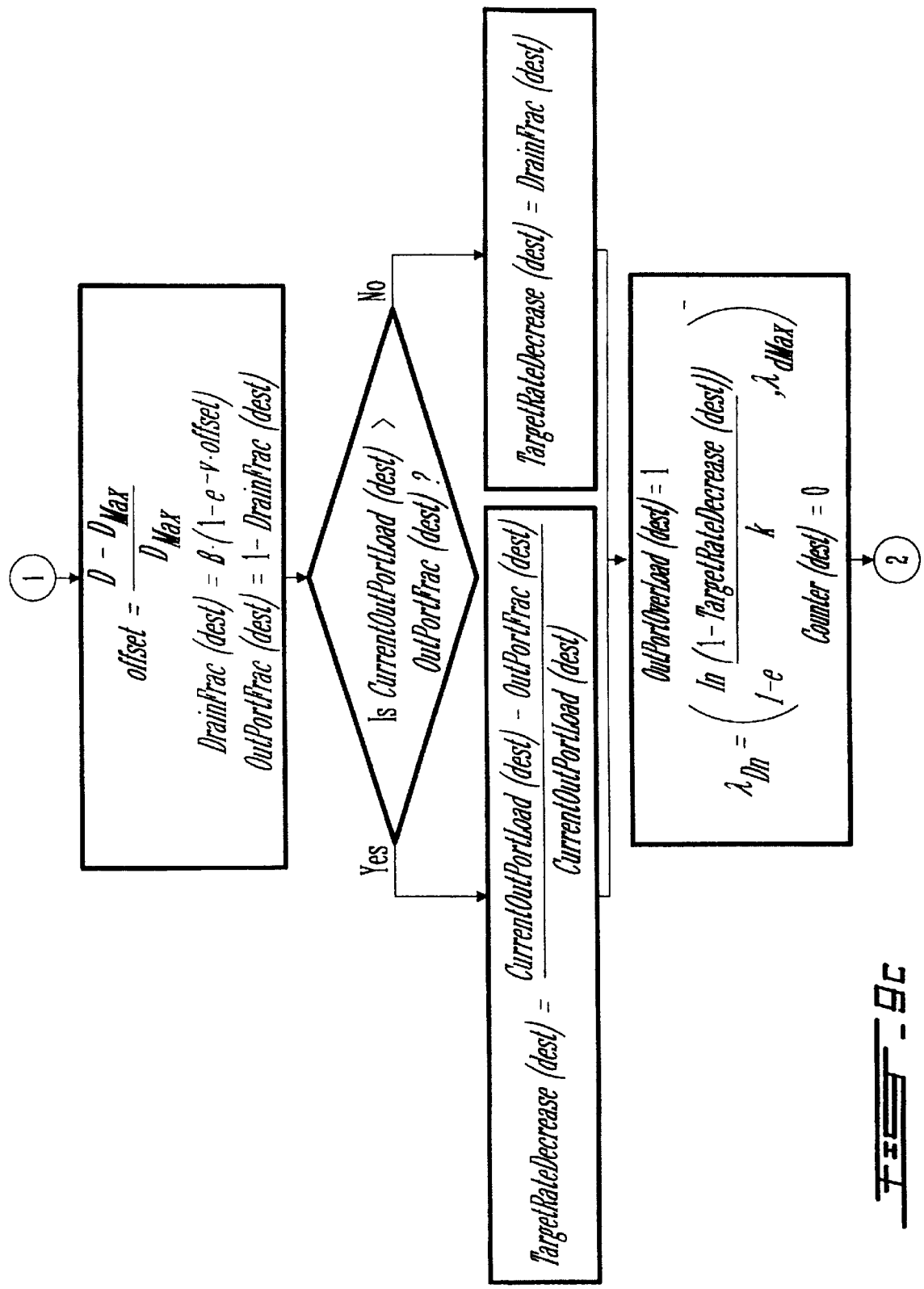

FIG. 9-a and FIG. 9-b summarize the OBNC congestion control algorithm for the output ports. The algorithm is executed for each output port once every measurement interval. It can be seen that the rate decrease triggered by large queue size (exceeding the threshold) takes precedence over the rate decrease triggered by the overload condition. The amount of rate decrease depends on the level of congestion. Rate increase is triggered by the underload condition, provided that this condition was not intentionally produced to drain the queues (Counter(dest) in FIG. 9-a is used to prevent rate increase in this case for two round-trip delays). Finally, when the queue size is below the threshold and the load is close to one (i.e. between 1−ε and 1) there will be no rate change.

The Final Rate Adaptation Algorithm

Figure 10:
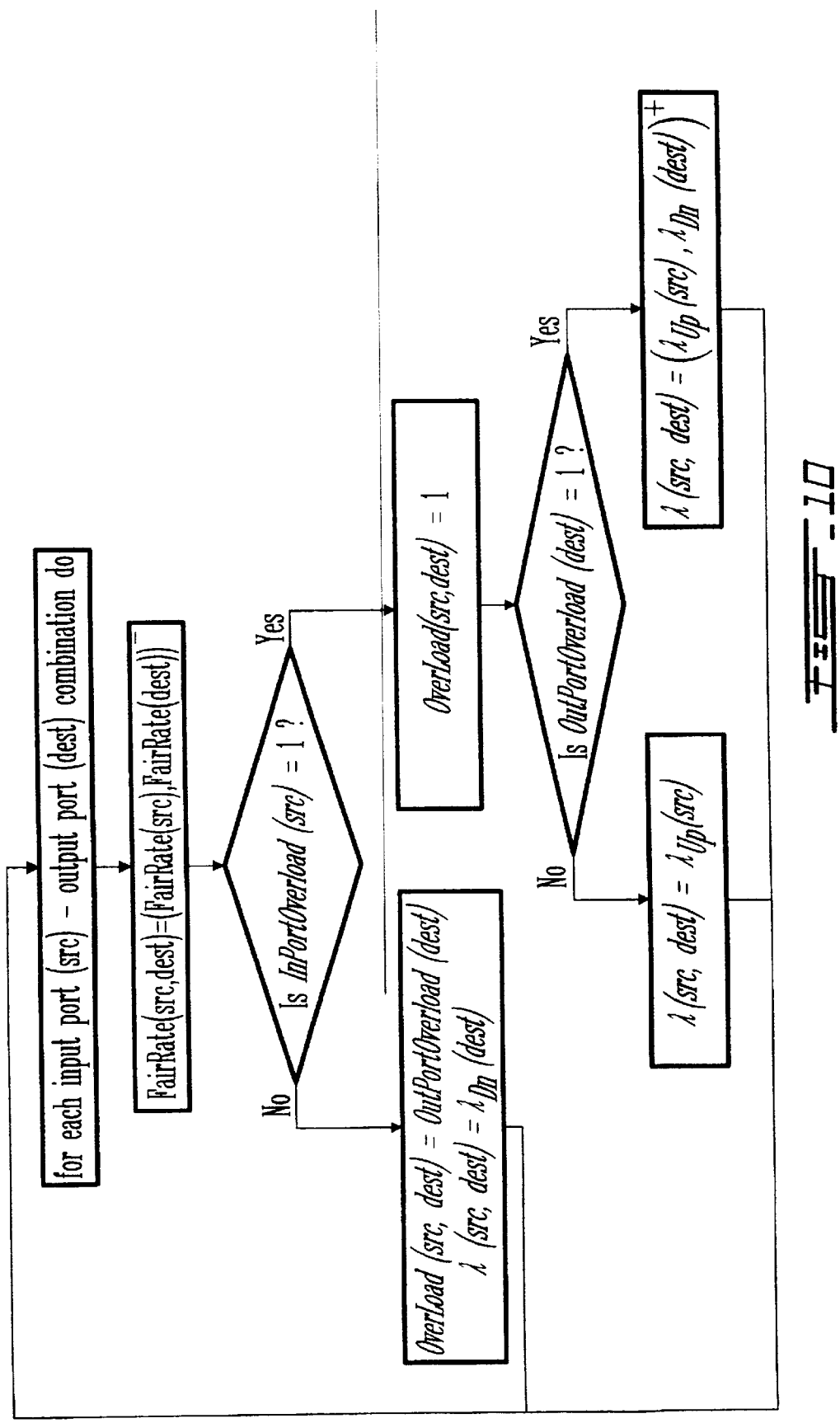
FIG. 10 illustrates in flow-chart form the OBNC algorithm for final selection of rate and rate adaptation for each uplink channel—downlink channel combination.

Once the fair rate and rate adaptation have been calculated for all input and output ports, the OBNC congestion control algorithm determines the final fair rate and the amount of rate adaptation for each input port—output port combination (or uplink-downlink combination). The fair rate for an uplink-downlink pair is taken as the minimum of the uplink and downlink fair rates. Next, the algorithm has to decide whether the ACRs of terminals in a certain UCG sending ABR traffic destined to a certain downlink carrier need to be increased or decreased, and then to calculate the amount of rate increase or decrease for that particular input port—down port combination. The actions taken by the OBNC algorithm for each input port—output port combination in order to make the final decision concerning rate adaptation follows the steps indicated in FIG. 10. If ACRs need to be decreased, either in the input port, the output port or both, then the amount of rate decrease is set to be the maximum of the calculated rate decrease in the input port and in the output port. An increase in ACRs is only allowed if the input port is not overloaded and if the output port is underloaded, and the amount of increase is equal to the amount of rate increase calculated in the output port.

It should be noted that limits have been set regarding the rate increase and decrease for both input and output ports. These limits are chosen such that the scheme is not overly sensitive to rapid changes in loading conditions. Limiting the amount of rate increase will help prevent excessive growth of on-board queue size (resulting from rather long response time of the control loop). Limiting the amount of rate decrease will help maintain high utilization of capacity on the downlink channels (and consequently high data throughput), by preventing too fast depletion of the buffers in the output ports of the switch. Thus, the net impact of limiting the rate increase/decrease is that of smoothing of the traffic seen in the output ports.

The final step in the OBNC congestion control algorithm is the preparation for broadcasting of control messages to user terminals. Control messages for a certain UCG contain fair rate and rate adaptation (increase, decrease or no change) information for terminals within that specific UCG, allowing them to adjust their ACRs to each of the satellite's downlink channels. These messages will pass through the switch before being placed in the head of the high priority queue (where CBR, rt-VBR and nrt-VBR traffic are also buffered) within the output port corresponding to that specific UCG, and finally broadcast.

The Terminal Algorithm

The terminal algorithm, as part of the overall BRCA algorithm, is responsible for processing a the congestion-related control messages sent by the satellite. It regulates how the terminal should adjust its allowable cell rate in response to control messages, how many time slots it may request in every frame and how it uses its capacity assignment to transmit the ABR traffic. The terminal congestion control algorithm therefore consists of three sub-algorithms, namely the terminal's ACR adjustment algorithm, the capacity request calculation algorithm and the ABR traffic transmission algorithm.

The Terminal Algorithm for ACR Adjustment

The terminal algorithm for ACR adjustment determines how a terminal should adjust the current ACR value of its ABR sources based on congestion control messages received from the satellite.

The BRCA algorithm relies on periodic broadcast of congestion control messages to user terminals. Control messages sent to terminals within a given UCG contain fair rate and rate No adaptation (increase, decrease or no change) information for all terminals within that UCG. All terminals within a UCG thus share the same broadcast messages. In contrast to ERICA scheme, where by using RM cells a switch has the capability to directly and selectively control each terminal's behavior (including the rate at which a terminal can send its traffic), in the BRCA scheme the terminals have to respond to a different set of rules in order to adjust their ACR, as they dispose of a different set of control messages (which are less specific). These rules are defined and explained in the following paragraphs, for on-board implementation (in OBNC) of the BRCA switch algorithm.

Rule 1: A terminal has to wait for the next congestion control message before it can make any request on behalf of its ABR source.

At connection establishment an unconstrained source (i.e. a source not subject to flow control) would normally initialize its ACR to the initial cell rate (ICR). For a source subjected to rate-based flow control as per the present invention, the source's ICR may be larger or smaller than the fair rate calculated by the OBNC algorithm for the terminal's UCG—downlink carrier combination. The source should therefore initialize its ACR to the minimum of its ICR and the sum of its MCR and the broadcast fair rate. The terminal has to wait (setting its ACR to zero) until it receives the immediate forthcoming congestion control message from satellite, before it can make any request for capacity.

Rule 2: A terminal should maintain its source's ACR as the minimum of the source's ICR and the sum of the source's MCR and the broadcast fair rate until it has sent traffic from its source (i.e. the first request has been granted).

The first request made by the terminal on behalf of a source will be received in the satellite one propagation delay after it was sent. The input port records this request in HPVBDCCount for the current frame, and eventually in TotalHPVBDCCount for the current measurement interval. Finally, the effect of this request on the fair rate will be reflected in the congestion control messages for the current measurement interval. The terminal will receive these messages one propagation delay after they are broadcast. Hence, it will not see the effect of its first request for at least one round-trip delay. During this time, the terminal should not start adapting (increase/decrease) the source's ACR, even though it receives a message that requests a rate increase/decrease. It should instead maintain the source's ACR as the minimum of the source's ICR and the sum of its MCR and the broadcast fair rate.

Moreover, this first request, once received by the satellite, may or may not be granted immediately. The request may not be immediately granted if the terminal is located far below the head of the terminal table held by the scheduler and if the uplink capacity is exceeded by the sum of total capacity guaranteed for all terminals in the list and the capacity requested by all terminals in the list located above the terminal under consideration. This situation may be viewed as congestion in the uplink. Even if no cells are lost in the satellite due to this congestion, the situation can create unfairness for some terminals, since capacity grants for their requests have to be delayed or even denied (in the case their requests' time-out values are exceeded). To reduce the probability of such situations the terminal should then maintain its source's ACR until the first request on behalf of its source has been granted.

Rule 3: A terminal may increase its source's ACR only after it has sent more traffic from its source.

The second rule in itself is not sufficient to reduce the possibility of uplink congestion or unfairness situation. The terminal may be located in the head of the terminal table, so that, unless the total guaranteed capacity for all terminals is equal to the uplink capacity, its first request will certainly be granted. The terminal's entry will then be moved to the bottom of the terminal table. Hence, if uplink congestion does exist, the processing of terminal's next request may be delayed for several frames. During this time, the terminal should not increase its ACR since such increase will aggravate the situation. Expressed in another words, the terminal should not further increase its source's ACR until it can send more traffic from its source (as a consequence of having past requests granted). The same requirement also applies in subsequent opportunities to increase the source's ACR.

Rule 4: On receiving a message that requests the terminal to increase its source's ACR, the terminal should calculate the source's new ACR as follows:

if $(ACR_{current} \leq MCR+\text{FairRate})$ then $$ACR_{new} = (ACR_{current} + RIF \cdot PCR, MCR + \text{FairRate} \cdot (1+\lambda))^{-}$$

else $$ACR_{new} = ACR_{current} + \lambda \cdot \text{FairRate}$$

where $\lambda$ is the amount of rate increase calculated by the OBNC algorithm for the output ports, and $(a,b)^{-}$ means the minimum of a and b.

The amount of rate increase is determined by the source's MCR and current ACR values, the broadcast fair rate, the terminal's rate increase factor (RIF) parameter (as defined by TM4.0) and the fraction of rate increase $\lambda$ calculated by the OBNC switch algorithm. Each source is entitled to request capacity at the broadcast fair rate, and correspondingly, send traffic at the sum of the source's MCR and the broadcast fair rate. Hence, on receiving a message that request a rate increase, i.e. a message that indicates an underload situation in the source's traffic downlink destination, the terminal should respond by increasing its source's ACR value. If the source's current ACR value is below the fair transmission rate (i.e., the sum of the source's MCR and the broadcast fair rate), the source may increase its ACR by RIF relative to the source's PCR, up to a value calculated as the sum of the source's MCR, the broadcast fair rate and a fraction of rate increase (relative to the broadcast fair rate). On the other hand, if the current ACR is above the fair transmission rate, the source may increase its ACR by the fraction of the rate relative to the broadcast fair rate. The result is that a source may quickly reach the fair transmission rate and further fine tune its transmission rate based on the loading condition in its traffic downlink destination.

Rule 5: On receiving a message that requires the terminal to decrease its source's ACR, the terminal should calculate the source's new ACR as follows:

if $(ACR_{current} \leq MCR + \text{FairRate})$ then $$ACR_{new} = ACR_{current}$$

else $$ACR_{new} = (ACR_{current} \cdot (1-\lambda), MCR + \text{FairRate})^{+}$$

where $\lambda$ is the amount of rate decrease calculated by the OBNC algorithm and $(a,b)^{+}$ means the maximum of a and b.

If a terminal receives a congestion control message requiring a rate decrease for its source (as calculated by the OBNC switch algorithm), the terminal should decrease the source's ACR by the fraction of rate decrease $\lambda$ indicated in the message. However, since each source should be entitled to transmit at the fair transmission rate, sources whose current ACR values are below the fair transmission rate will not be required to decrease their ACR. Instead, such sources should maintain their current ACR value. By contrast, sources whose current ACR values exceed the fair transmission rate are required to reduce their ACR values, but not below the fair transmission rate. Finally, the new ACR value will be upper bounded by the source's negotiated PCR value, that is:

$$ACR_{new}=(ACR_{new}, PCR)^-$$

Figure 11A:
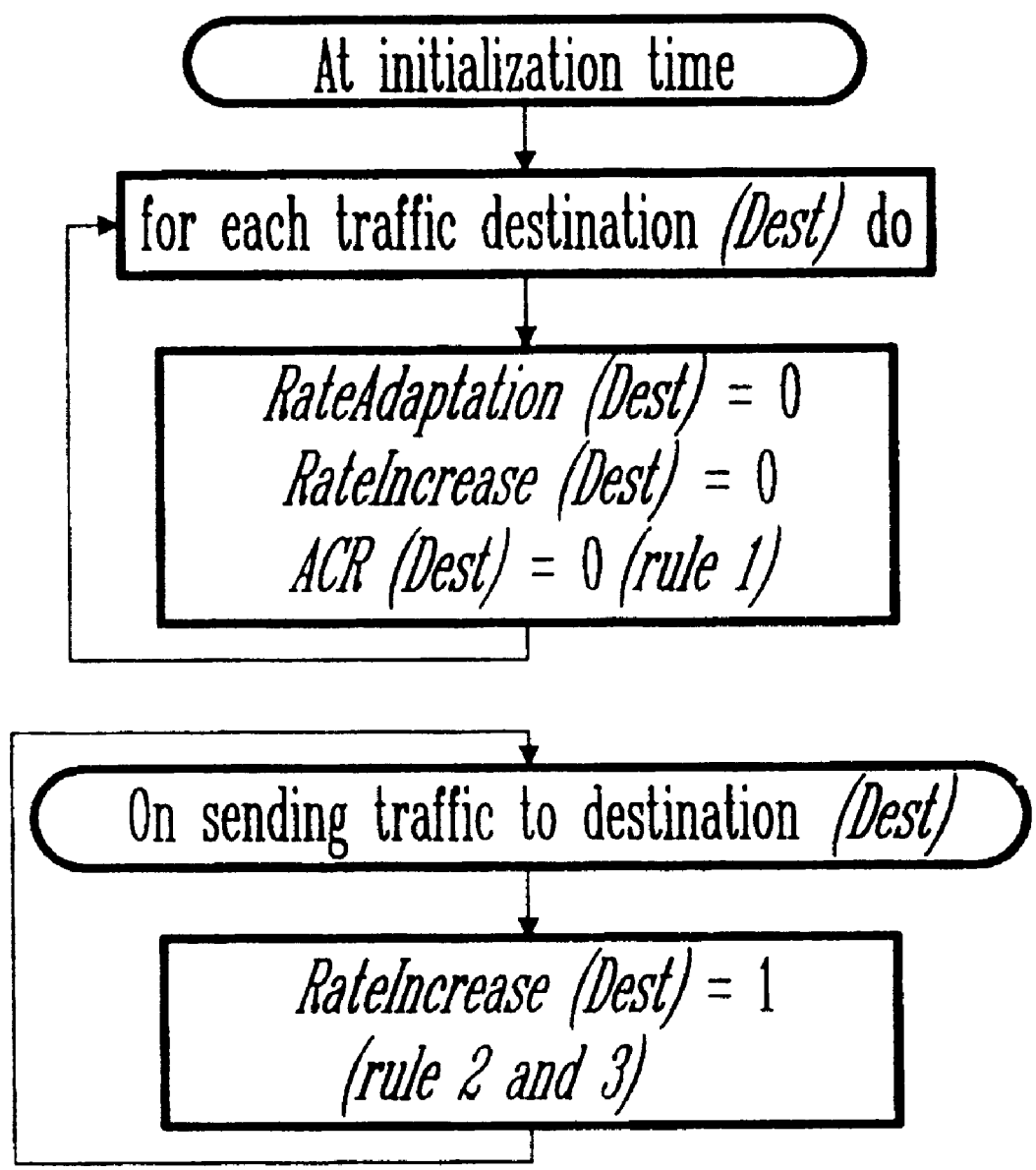
FIG. 11-$a$ illustrates the initialization segment of the terminal algorithm for the adjustment of the allowable cell rate.
Figure 11C:
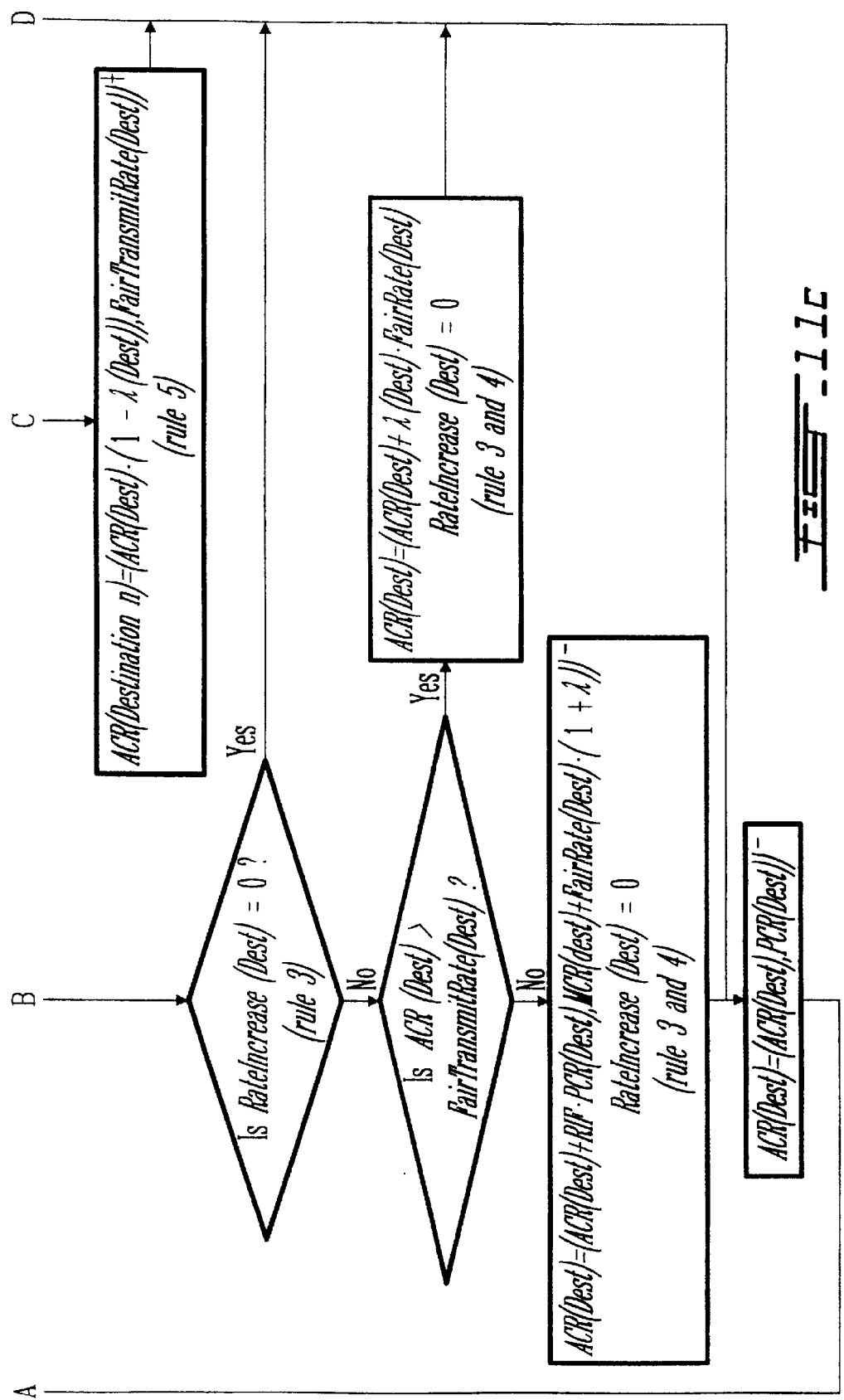

FIG. 11-a and FIG. 11-b summarize in flowchart form the terminal algorithm for ACR adjustment. The rule (or rules) corresponding to each action is given in parentheses below the action. In FIG. 11-a a number of flags (RateIncrease, RateAdaptation) are initialized, to be used in the main algorithm in FIG. 11-b. When RateAdaptation=0 (at the very beginning, before having sent traffic in at least two frames) no rate change is allowed (rule 2), regardless of the value of RateIncrease flag. When RateAdaptation=1, the ACR may be increased (if RateIncrease=1) according to rule 4, or it has to be decreased if the downlink channel is overloaded (i.e. Overload=1, where Overload is one of the control messages broadcast by the satellite) and ACR is smaller than the fair transmission rate (rule 5). After each rate increase the flag RateIncrease is reset, to prevent further rate increase before more traffic is sent, when it is set again (in compliance to rule 3). It should be noticed that FairRate(dest) in FIG. 11-b corresponds to FairRate(src,dest) as determined by the final rate adaptation algorithm in FIG. 10.

The Terminal Algorithm for Capacity Request Calculation

The capacity request calculation algorithm governs how many time slots a terminal may request for each of its traffic destination, and correspondingly, how many time slots it may request for its ABR traffic.

Earth terminals use their ACRs to request capacity for their ABR traffic. The maximum number of time slots, $n_{Max}$, a terminal may request in each frame for a given destination depends on terminal's ACR for the corresponding destination, and can be calculated as follows:

$$n_{Max}=\lfloor \eta+ACR \cdot T \rfloor$$

where T is the duration of a frame, $\lfloor x \rfloor$ an integer floor of x and Tj is a carry-over from previous frames reflecting the remainder of a real number after it was rounded down to produce an integer number. That is, in each frame, the new value of $\eta$, obtained after the above operation was performed, is given by:

$$\eta=(\eta+ACR \cdot T)-\lfloor \eta+ACR \cdot T \rfloor$$

The actual amount of uplink capacity to be requested is determined by the current queue size a and the amount of capacity that has been requested in previous frames. The goal is to ensure that no capacity is wasted by requesting more than is needed. The number of time slots which have been requested in previous frames for a certain destination and not yet granted, TotalRequestedCapacity, is increased every time a request is made or capacity is reserved/guaranteed, and decreased every time an ABR cell is sent to the destination. If a source has a non-zero MCR value, which means that the source has reserved/guaranteed capacity of $R=\lfloor MCR \cdot T \rfloor$ slots on the uplink, the terminal determines the number of the source's reserved time slots it may utilize by the following calculation:

ReservedCapacityToUtilize=(CurrentQueueSize−TotalRequestedCapacity, R, $n_{Max}$)⁻

TotalRequestedCapacity and $n_{Max}$ are then updated as follows:

Total RequestedCapacity=Total RequestedCapacity+ReservedCapacityToUtilize $n_{Max}=n_{Max}$−ReservedCapacityToUtilize It should be noted that since the source's ACR will be initially set to its Initial Cell Rate (ICR) and then lower-bounded by its MCR once the terminal receives the first congestion control message for the source, and since the source's reserved/guaranteed capacity is equal to the integer ceiling of its minimum cell rate per frame, the source can, in most cases, use all of its reserved capacity.

The terminal calculates next how many time slots it should request (with the HP-VBDC mechanism) on behalf of the source, by using the expression CapacityTo Request=(CurrentQueueSize−Total RequestedCapacity, $n_{Max}$)⁻ and similarly, the TotalRequestedCapacity and $n_{max}$ will be updated as follows:

Total RequestedCapacity=Total RequestedCapacity+CapacityTo Request $n_{Max}=n_{Max}$−CapacityTo Request At this point in the processing of capacity request the unused requested capacity (i.e. $n_{Max}$) will be lost. That is, the source cannot accumulate capacity which it does not use (due to insufficient traffic to send) to request uplink time slots. Finally, the total number of time slots to be requested using the HP-VBDC strategy is the sum of CapacityToRequest for all destinations the terminal has traffic to send to.

Figure 12:
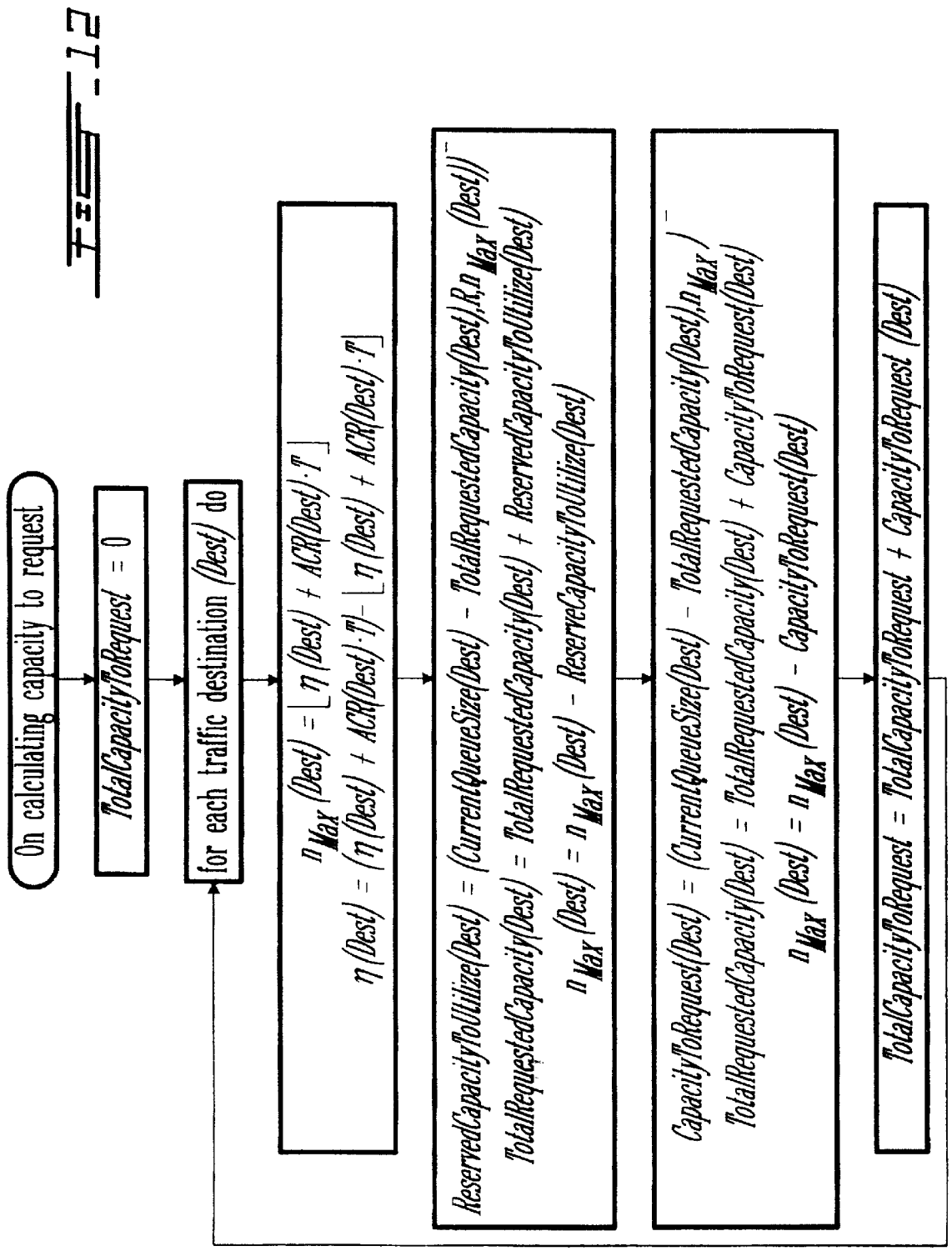
FIG. 12 illustrates in flow-chart form the terminal algorithm for the calculation of capacity requests for ABR traffic.

FIG. 12 summarizes the terminal algorithm for capacity request calculation in flow chart form.

The Terminal Algorithm for Transmission of ABR Traffic

The ABR traffic transmission algorithm controls how a terminal should calculate the number of time slots it may use for its ABR traffic, and how it should choose a destination to send traffic to.

A terminal may schedule its transmission upon receiving a capacity assignment message from the uplink scheduler. The assignment message does not specify the breakdown of the assigned time slots to various traffic classes. It is up to the terminal to determine the fraction of the capacity assignment that is used by its ABR traffic.

All terminals use the same method to determine how many time slots in a certain assignment message belong to a certain class of traffic. Each terminal puts a time-out counter on each ABR request (which is made using the HP-VBDC strategy) it has just sent and queued in the pending HP-VBDC queue. This counter will be decremented in subsequent frames. A pending request queue contains a copy of each request that has been sent and has not been granted, and whose time-out counter has not expired. Hence, by inspecting the counter value of the oldest request, the terminal can determine the number of time slots granted for ABR traffic. The oldest request, provided that its counter has been decremented by r (where r is the number of frames corresponding to one round trip delay), will be the ABR request corresponding to the current assignment message. The terminal will first satisfy requests made on behalf of its CBR, rt-VBR and nrt-VBR sources before allocating any remaining capacity or the capacity requested for ABR traffic, whichever is smaller, for its ABR traffic. Any remaining capacity at this point will be given to its UBR traffic.

Each terminal tries to distribute its ABR capacity assignment equally among all destinations it has ABR traffic to send to. To do this, a terminal chooses a destination in a rotating manner by arranging its traffic destinations in a circular linked-list and maintaining a record of the last chosen destination. The terminal then chooses the next destination in the linked-list whose TotalRequestedCapacity is non-zero (that is a destination for which the terminal has requested uplink capacity) as the destination to which it will send the ABR traffic.

Figure 13:
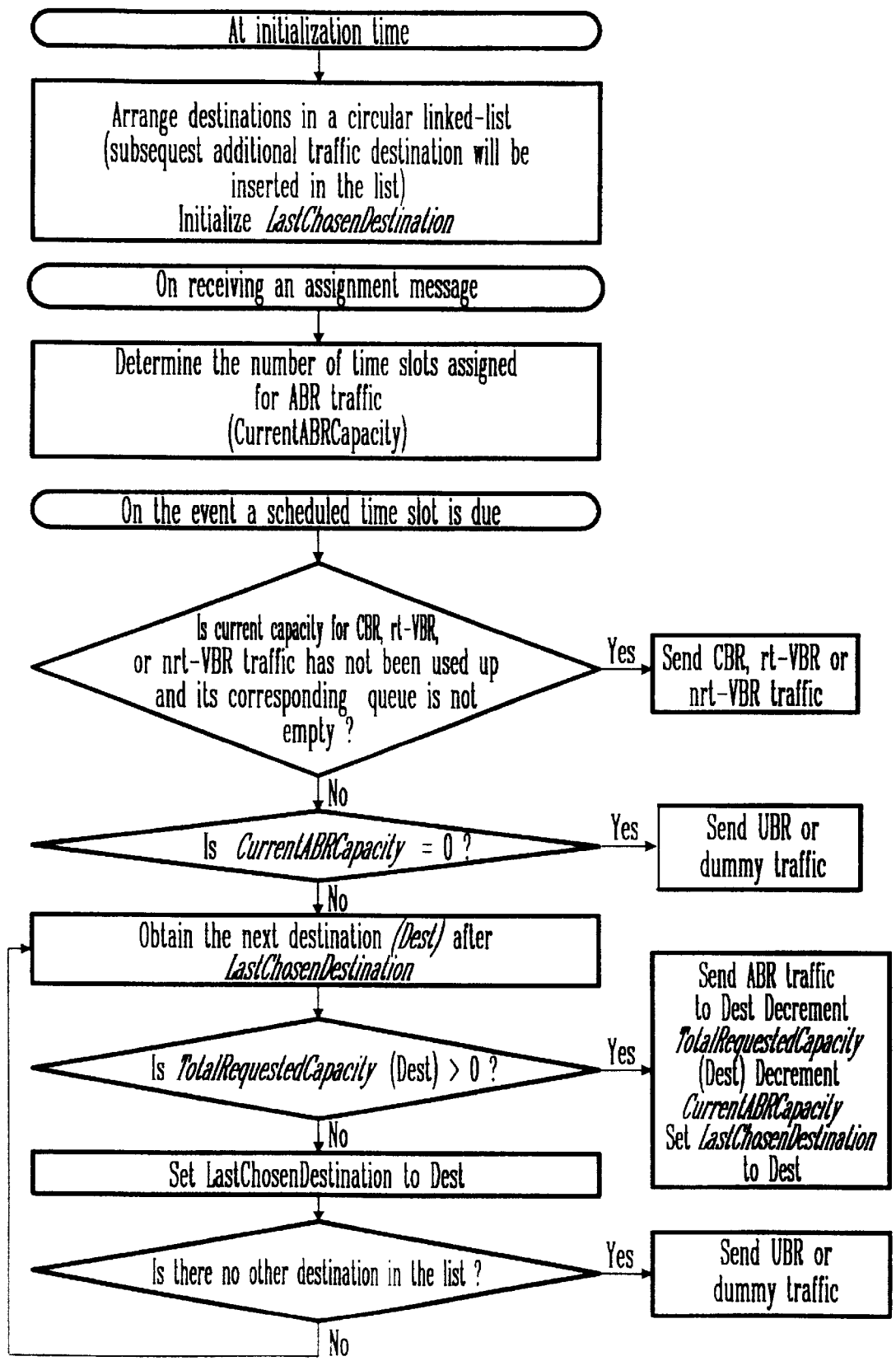
FIG. 13 illustrates in flow-chart form the terminal algorithm for the breakdown of the assigned capacity to various traffic classes and for the transmission of traffic cells.

FIG. 13 summarizes the terminal algorithm for transmission of ABR traffic in flow chart form.

Algorithm's Parameters

BRCA algorithm is characterized by a number of parameters which can be set by the network administrator in order to adapt the behavior of the congestion control scheme to the network's conditions, such as network loading, traffic characteristics etc. Each of these parameters will be briefly reviewed in the next paragraphs. Some of them, which have a lesser impact on performance, may be hard-wired into the algorithm.

Target Utilization

Target utilization determines the link utilization during steady-state conditions. Target utilization can be set independently for the uplink and for the downlink channels. Too high uplink target utilization can lead to excessive delay introduced by the uplink scheduler, while too high downlink target utilization can lead to both excessive queuing delay and cell loss.

Too low target utilization, on uplink and downlink channels, translates into link underutilization. Properly setting the target utilization is particularly important for GEO satellites, due to the long feedback delay of the control loop. Transient overloads can result in increased queue size, excessive delay and packet loss. Target utilization should not exceed the maximum value for which stable operation is maintained and performance is still met . Our simulations have shown that good and stable performance can be obtained with target utilization up to 90%, even in the condition of bursty traffic.

Measurement Interval

Measurement interval determines the accuracy of the measured parameters and therefore the accuracy of algorithm control messages. It also has impact on the responsiveness of the scheme. The parameters which are monitored are subject to important variations (from one measurement interval to another), which lead to high variance in the control messages. Increasing the measurement (averaging) interval helps smooth-out the variance, but at the same time the scheme becomes less responsive to changes in the loading conditions, as the rate of feedback is slowed down. Shorter averaging intervals may consistently lead to underestimation of the measured quantities, due to higher variance in the measurements. This can translate into a departure from optimum operation conditions or instability of the algorithm (excessive oscillations). A measurement interval of 2–4 frames has been used in all simulations as a trade-off between the contradictory requirements mentioned above.

Averaging Exponent (Rate)

As shown above, there are limitations in improving the measurement accuracy by increasing the measurement interval. Exponential averaging was suggested as a second method for further improving the measurement accuracy, by counteracting the effects of burstyness in traffic sources (presence of active and silent periods) and of instantaneous variations in the capacity available for ABR traffic. In exponential averaging the parameters for the current measurement interval are a combination of results of measurements in this interval and from past intervals, according to an exponential averaging formula, as already described. The parameter a in the formula determines the contribution of the current value to the average value, while $(1-\alpha)$ indicates the decaying of the contribution of the old average to the new average. The smaller the value of $\alpha$ the larger the contribution from past averaging intervals and the less sensitive the algorithm is to measurement errors. In the same time, however, the algorithm becomes less responsive to real changes in network conditions. The value of $\alpha$ should therefore be selected as a result of the general trade-off between the tolerated measurement errors and the desired responsivness of the algorithm, in combination with the choice of the measurement interval. In our simulations stable and consistent performance have been obtained with values of a between 0.1 and 0.2.

Maximum Queuing Delay

Queuing delay is one of the components of the total end-to-end delay. Even if the total delay is dominated by other fixed components (such as the propagation delay), the queuing delay, which is variable (function of downlink channels loading), should be controlled in order to keep the end-to-end delay within specified limits. In our simulations the maximum queuing delay was set equal to 2–4 frames (compared to 11 frames taken by one round-trip delay).

Queue Drain Factor Parameters

The drain factor indicates what fraction of the downlink channel capacity is used to drain the queue. It is calculated by using an exponential decaying function of the delay offset (with respect to the maximum delay). The rate parameter of this function $v$ (set in our simulations to 2.5) indicates how fast the drain factor reaches the maximum value $\beta$ (0.25 in our simulations) of the fraction of the downlink channel capacity set aside to drain the queue. The higher the drain factor the faster the queue will be drained, but the more ABR capacity will be reduced, thus leading to temporary intentional underload conditions on the downlink channels and decreased overall throughput.

Maximum Rate Increase/decrease

In underload/overload conditions a terminal is instructed by the OBNC algorithm to increase/decrease its allowable cell rate. Rate increase/decrease is upper bounded in order to prevent that the algorithm becomes overly sensitive to variations in traffic. In our simulations a value of 0.5 was considered for both maximum rate increase ($\lambda_{iMax}$) and decrease ($\lambda_{dMax}$).

Minimum Load Offset

Minimum load offset $\epsilon$ represents the offset from the optimum downlink load for which an underload condition is declared and the congestion control algorithm advises the user terminals that they may increase their ACRs. In our simulations $\epsilon$ was set to 0.05.

Some of the above parameters have a direct impact on BRCA congestion control algorithm behavior and performance, while others have an indirect impact, through the measurement errors. In this last categories enter the parameters related to averaging. More averaging a reduces the measurement errors but also affects the responsiveness of the scheme to variations in loading conditions. Due to the fact that the congestion control scheme includes a queue control function, the problem of measurement accuracy becomes less important. Inaccuracies in parameter estimation can translate into additional traffic buffering in the output port. With a careful selection of queue control parameters and in combination with realistic target utilization goals, the BRCA algorithm is capable of providing stable network operation and consistent performance in various loading conditions.

Performance

Performance of the BRCA algorithm has been evaluated by simulation, based on an event-driven simulation model implemented in OPNET environment.

According to one aspect of the present invention, the BRCA algorithm is integrated with the mechanisms of the uplink access protocol. This makes it rather difficult to evaluate strictly the performance of the congestion control scheme. In order to minimize any bias the uplink access protocol may introduce, very simple network configurations and loading scenarios have been used to illustrate the performance of the BRCA scheme. In addition, for some scenarios results will also be presented for cases with the congestion control de-activated, to be used as references when trying to demonstrate the effect of BRCA algorithm on traffic management.

Performance of the BRCA algorithm has been evaluated based on performance metrics defined with respect to the objectives formulated in the background section. Efficiency in capacity utilization is assessed in terms of uplink and downlink load (throughput). Delay performance is illustrated by measuring only the queuing delay (the other components of the end-to-end delay, most of them fixed, do not depend on the action of congestion control algorithm).

Fairness is assessed by examining the ACR of selected terminals. For a system with equally loaded terminals, fairness can be seen as the ability of the algorithm to allow each terminal to request a fair share of the available capacity (in pkts/sec). For N terminals and a total capacity of C, this corresponds to an ACR of C/N. For unequally loaded terminals, fairness is more difficult to quantify. Ideally, a terminal's ACR should reflect its load, provided that the network is not overloaded, which means that terminals generating more traffic should be allowed to increase their ACRs above the fair rate. However, this is difficult to achieve when the network is overloaded (on uplinks, downlinks or both). A terminal associated with an uplink-downlink pair will be allowed to adjust its ACR within the limits imposed by the loading conditions on the respective uplink and downlink. Another situation may arise when the network is unbalanced (i.e. when the uplinks and/or downlinks are not equally loaded). In such a situation equally loaded terminals might have different ACRs, if they send traffic to destinations which are not equally loaded.

Queue size management performed by BRCA algorithm is assessed in term of on-board (downlink) ABR queue size. In some cases the results are presented in the form of survival functions, which show the cumulative mass function of the on-board queue size. For this metric in particular the results will be compared with those obtained (for the same network architecture and loading scenario) with the congestion control de-activated, in order to demonstrate the gain obtained by controlling the queue size. This gain manifests itself in a reduction in the maximum on board queue size necessary to meet a target survival probability. Even if controlling terminal queue size is outside of the scope of this invention, terminal ABR queue size will also be monitored (for selected terminals), in order to illustrate the impact from unfairness created by unbalanced loading conditions.

Steady-state and transient response of the BRCA algorithm are assessed by monitoring selected parameters (e.g. ACR, on-board ABR queue size) under steady or changing instantaneous and average loading conditions. Of particular usefulness is the staggered activation of various traffic sources.

Figure 14:
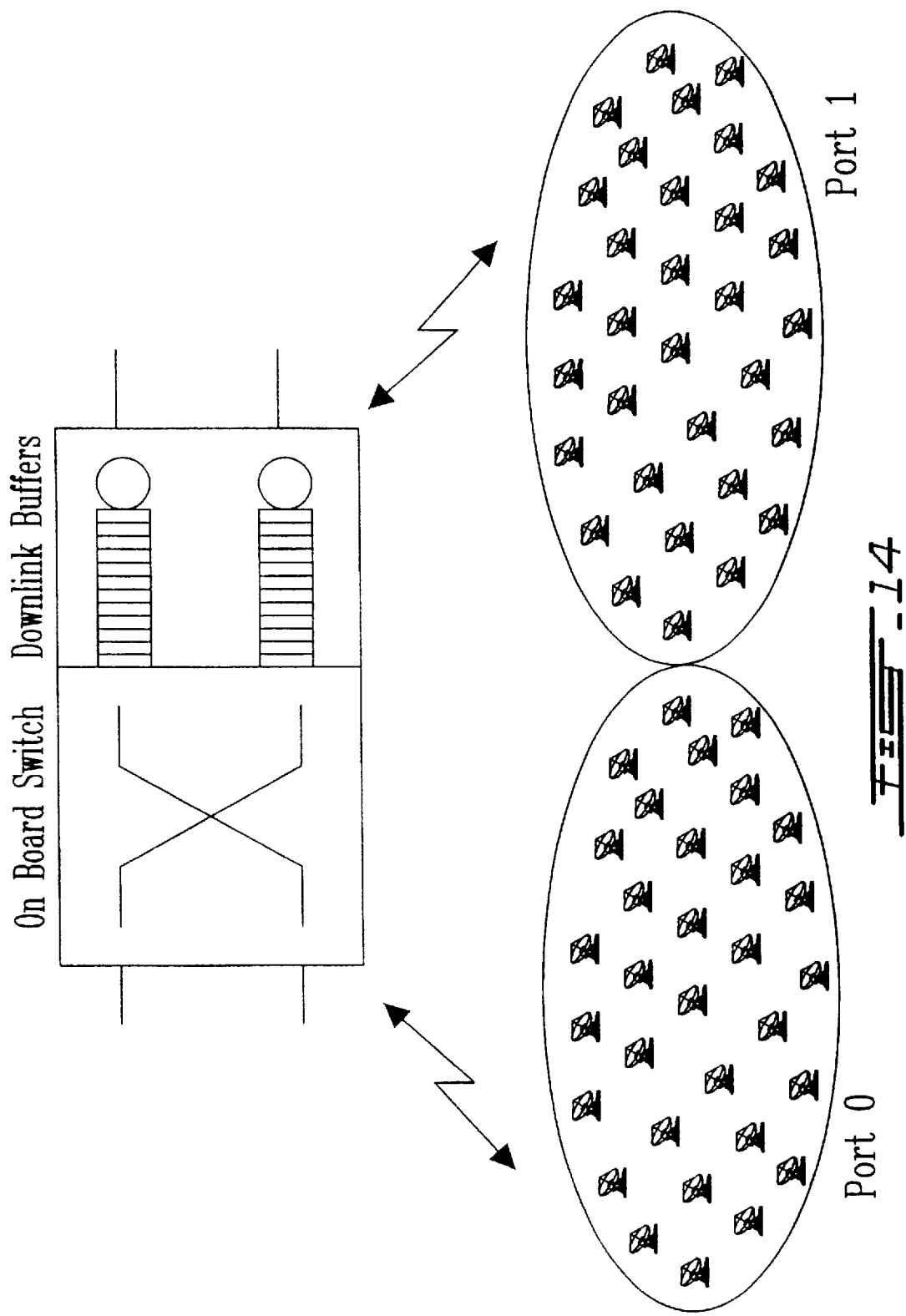
FIG. 14 gives the network configuration assumed in the simulation model.
Figure 18:
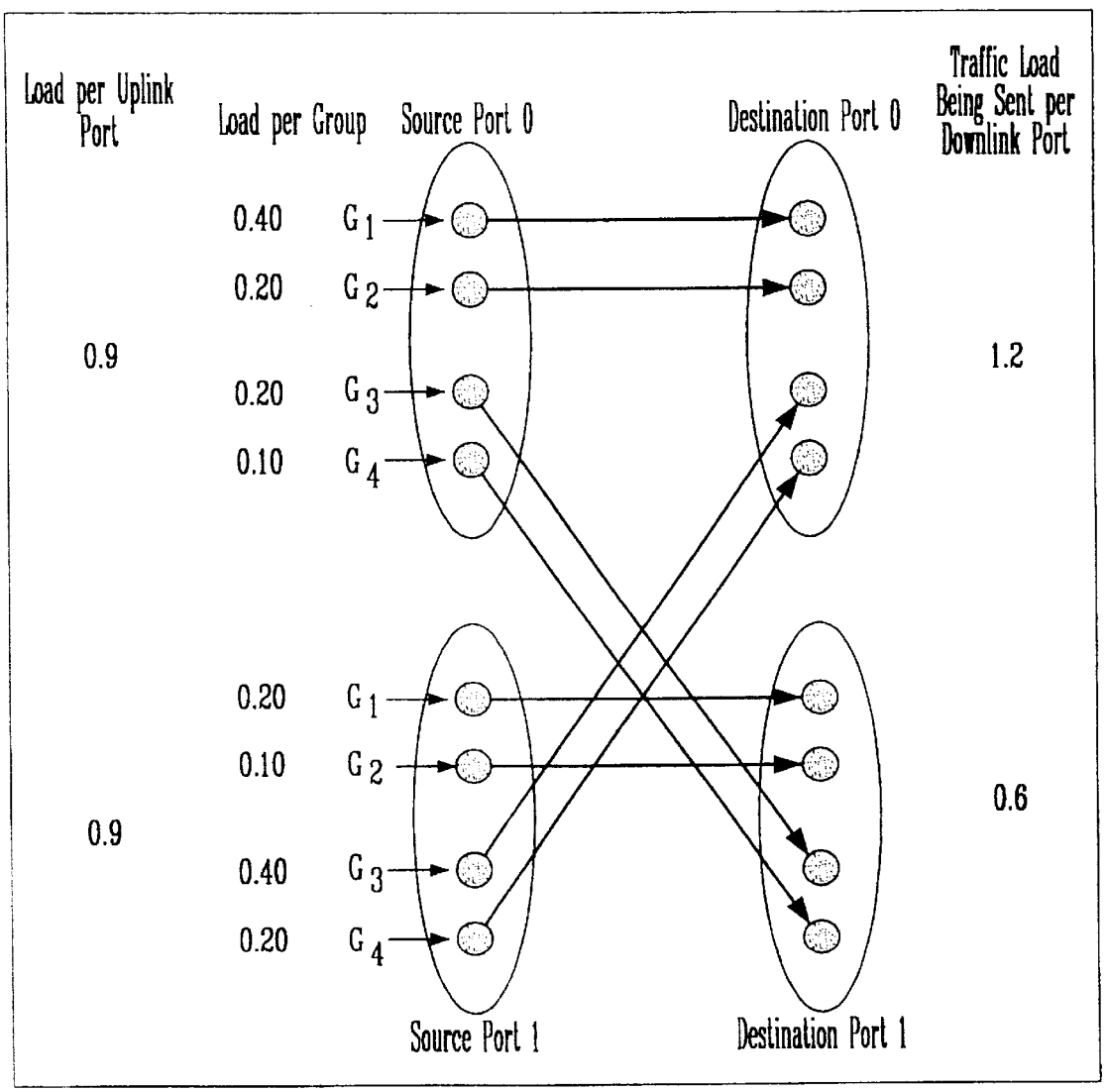
FIG. 18 illustrates the uplink load (on port 0 and port 1) for loading scenario 1.

To evaluate the above performance metrics, three loading scenarios have been considered, all based on the same network configuration (FIG. 14). The network has two uplink channels and two downlink channels. Assumption is made that an uplink channel corresponds to one input (source) port and a downlink channel corresponds to one output (destination) port in the on-board switch. Each port supports 32 active terminals, which are divided into four groups ($G_1$, $G_2$, $G_3$, and $G_4$), so that terminals 0–7 belong to $G_1$, terminals 8–15 to $G_2$, etc. group is a collection of equally loaded terminals, which send traffic to the same destination port. For the remainder of this section, the expression terminal load will actually refer to the traffic generation load normalized to the uplink capacity. For instance, a terminal load of 0.0325 implies that the terminal is generating traffic at a rate of 0.0325 C, where C denotes the uplink capacity. This load is not necessarily equal to actual amount of traffic sent on the uplink, as some traffic may be queued in terminals as a result of the action of congestion control algorithm in cases of on-board congestion.

This division of terminals into groups facilitates the definition of loading scenarios. A loading scenario represents a certain distribution of the total load among active terminals. Three loading scenarios have been considered in this invention for the purpose of performance evaluation—one balanced and two unbalanced. A balanced scenario is characterized by an equal split of traffic between the two downlink ports and is useful in the evaluation of throughput and on board queue size. In contrast, an unbalanced scenario is characterized by an unequal split of traffic between the two output ports. The output port load is also referenced to the traffic generation load. Therefore, an output load of 1.2 for example implies that the traffic sent to the output port exceed by 20% the downlink capacity.

The first loading scenario (LS1) considered is of unbalanced type, leading to a persistently congested destination port (port 0) and a persistently uncongested destination port (port 1), as shown in FIG. 15. The arrows in this figure indicate the destination port for the traffic from a particular terminal group. Notice that all terminals within a group send traffic to the same destination port. A port has only two types of terminals, i.e. high load terminals ($G_1$ and $G_2$) and low load terminals ($G_3$ and $G_4$). All traffic from high load terminals is destined to port 0, while all traffic from low load terminals is destined to port 1. The load for each high load and low load terminal is 0.0375 and 0.01875, respectively. Based on the above terminal load and traffic distribution, the load in each uplink is 0.9, and the traffic load to the downlink ports is 1.2 and 0.6, respectively. This implies that port 0 would receive traffic at a rate 20% above its downlink capacity, were the congestion control disabled.

The second loading scenario (LS2) is also unbalanced. However, unlinke LS1, there are 4 terminal types for each of the uplink ports (FIG. 16). Notice that the overall load per uplink and downlink port is as in LS1, the only difference being in the individual terminal loads. This scenario will be used mainly for testing algorithm's fairness.

Figure 17:
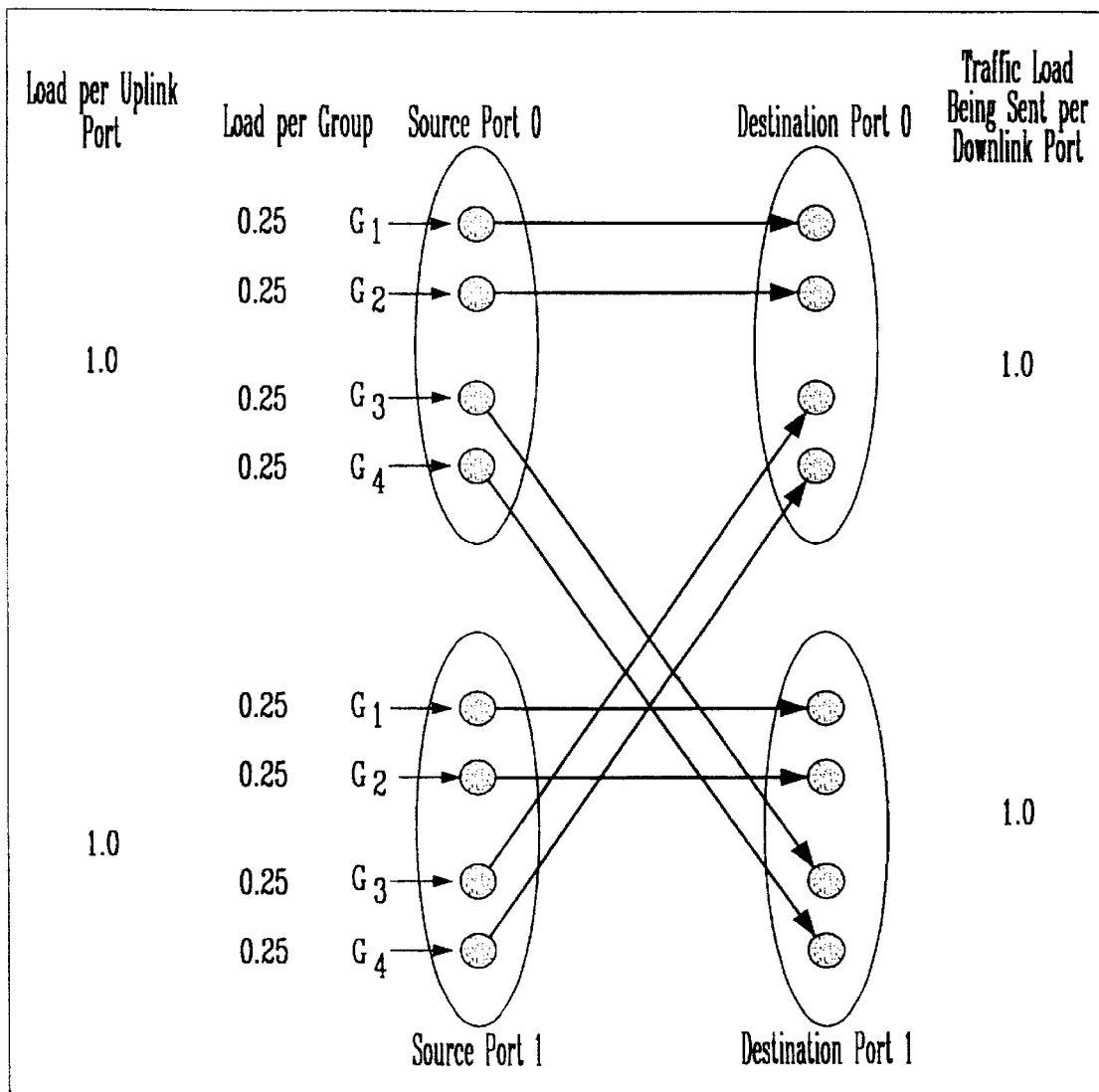
FIG. 17 defines the loading scenario 3 (LS3), for a balanced network configuration in which the total traffic is equally distributed between the two output ports.
Figure 18:
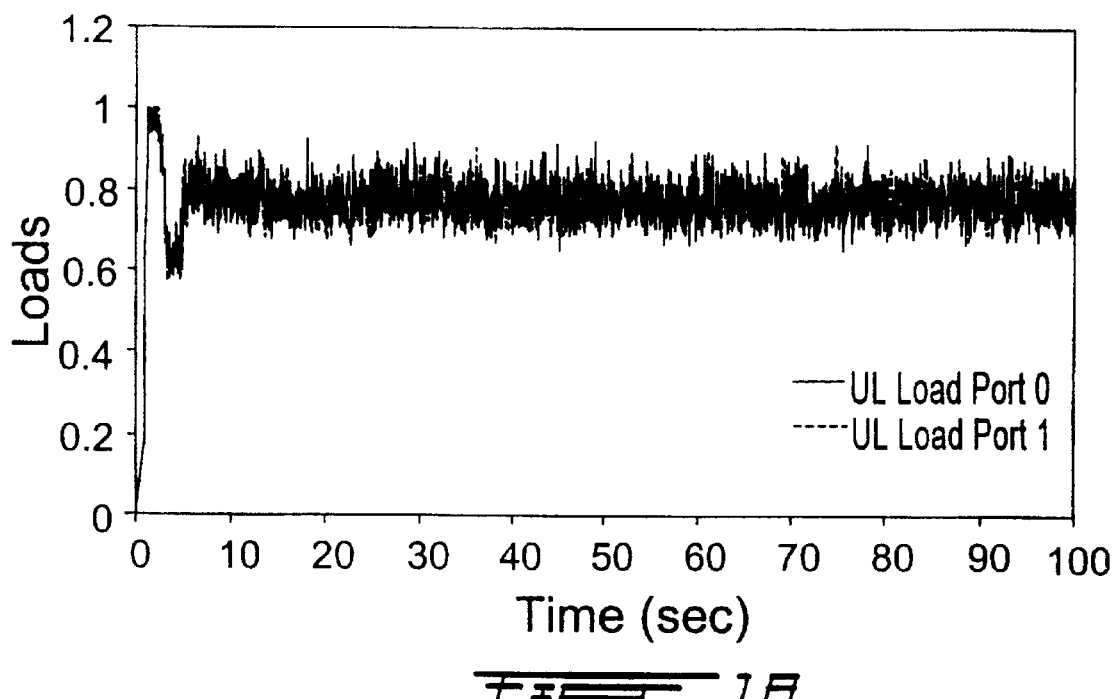
Figure 19:
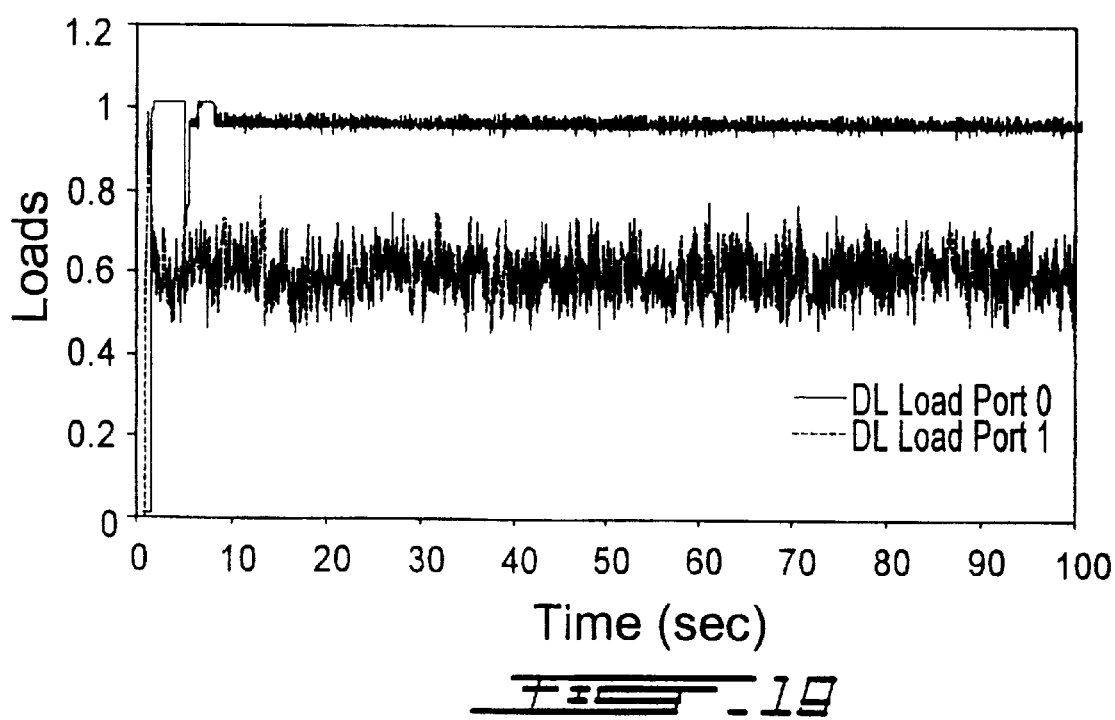
FIG. 19 illustrates the downlink load (on port 0 and port 1) for loading scenario 1.

The last loading scenario (LS3) considered is of balanced type (FIG. 17). The terminals in each group generate a load of 0.03125, so that the total uplink load per port is 1.0. The traffic is equally distributed between the two destination ports, so that the total downlink load per port is also 1.0.

In all results presented in this section a terminal is identified by a set of three numbers (x,y,z), indicating that terminal y in the uplink port x is sending traffic to the downlink port z.

For each loading scenario, results are presented in terms of uplink and downlink loads, maximum ABR queue size per frame in the downlink buffers of each port and allowed cell rate for selected (tagged) terminals. At least one terminal from each terminal group within each uplink port has been tagged in order to measure the ACR. Some additional terminals have been tagged for steady state performance evaluation, as it will be indicated later in this section. Where necessary, the queue sizes of some tagged terminals were also monitored. The survival function was only evaluated for a few special cases and only for the on-board queue.

The performance results in this section were obtained for a typical set of simulation input parameters, specifically selected to illustrate the innovative features of BRCA. It should be understood that BRCA scheme is in no way limited to scenarios of the type defined in this section, but it can handle more complex and elaborate network conditions, loading scenarios and traffic types. The basic assumptions made in the simulations are highlighted below:

The uplink and downlink port capacities are 10666.67 pkts/sec and 10833.33 pkts/sec, respectively. The downlink capacity is slightly higher than that of the uplink, in order to accommodate the signaling overhead associated with the uplink capacity assignment messages and with the congestion control messages.

The one-way propagation delay from terminal to satellite (and vice-versa) is of the order of 0.12 sec.

The traffic generated from each ABR terminal is variable, modeled by a Markov-Modulated Poison process (MMPP).

The BRCA parameters were selected as follows:

| Parameter | Value |
| --- | --- |
| m (averaging interval) | 0.048 sec (2 frames) |
| $\rho_u$ (uplink target utilization) | 0.95 |
| $\rho_d$ (downlink target utilization) | 0.95 |
| $\alpha$ (exponential averaging parameter) | 0.125 |
| $\beta$ (maximum portion of the downlink capacity set aside for queue draining) | 0.25 |
| $v$ (exponential function rate parameter) | 2.5 |
| $D_{Max}$ (maximum on-board queuing delay) | 0.048 sec (2 frames) |
| $\epsilon$ (minimum load offset) | 0.05 |
| $\lambda_{iMax}$ (maximum rate increase) | 0.5 |
| $\lambda_{dMax}$ (maximum rate decrease) | 0.5 |

Algorithm's Behavior

The results for loading scenario 1 are shown in FIG. 18 through FIG. 26. Notice that the downlink loads (FIG. 19) vary about 0.95 (port 0) and 0.6 (port 1). As port 1 is persistently uncongested, terminals are allowed to transmit all their traffic destined to this port, so that the downlink load matches the value specified in the loading scenario. By contrast, port 0 does not reach 100% utilization (as per the loading scenario) as the DL target utilization $\rho_d$ was set to 0.95.

Figure 20:
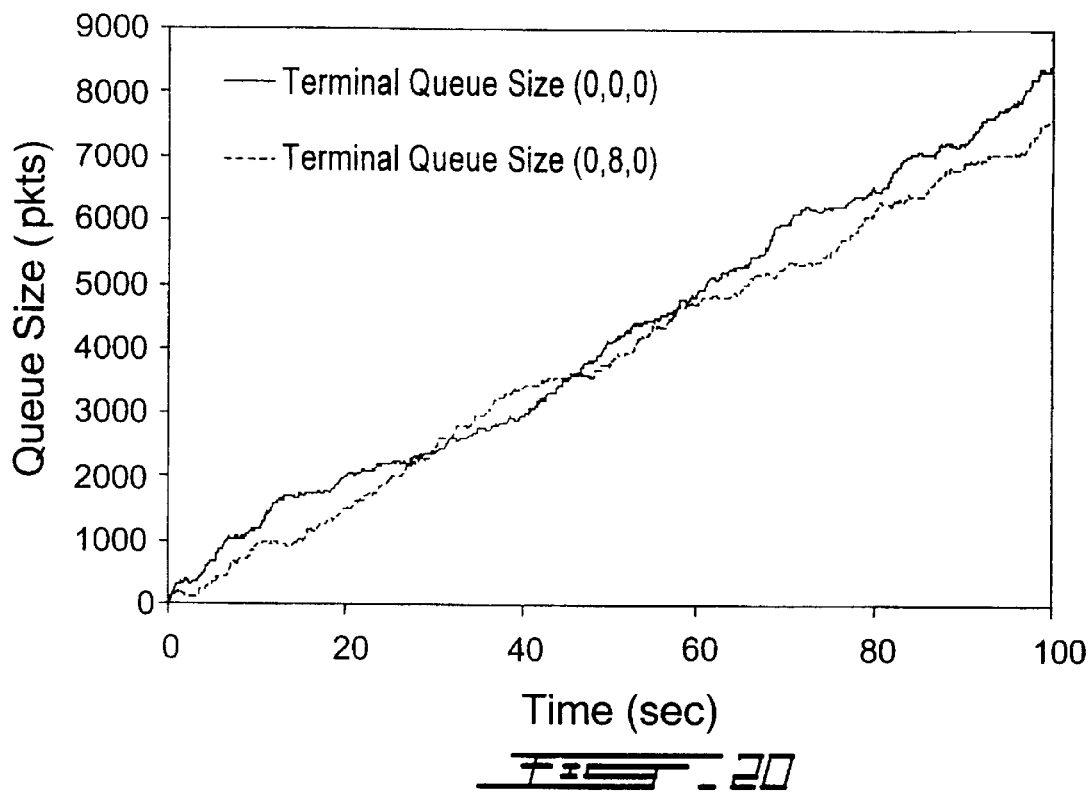
FIG. 20 illustrates the ABR queue size for terminals (0,0,0) and (0,8,0), for loading scenario 1.
Figure 21:
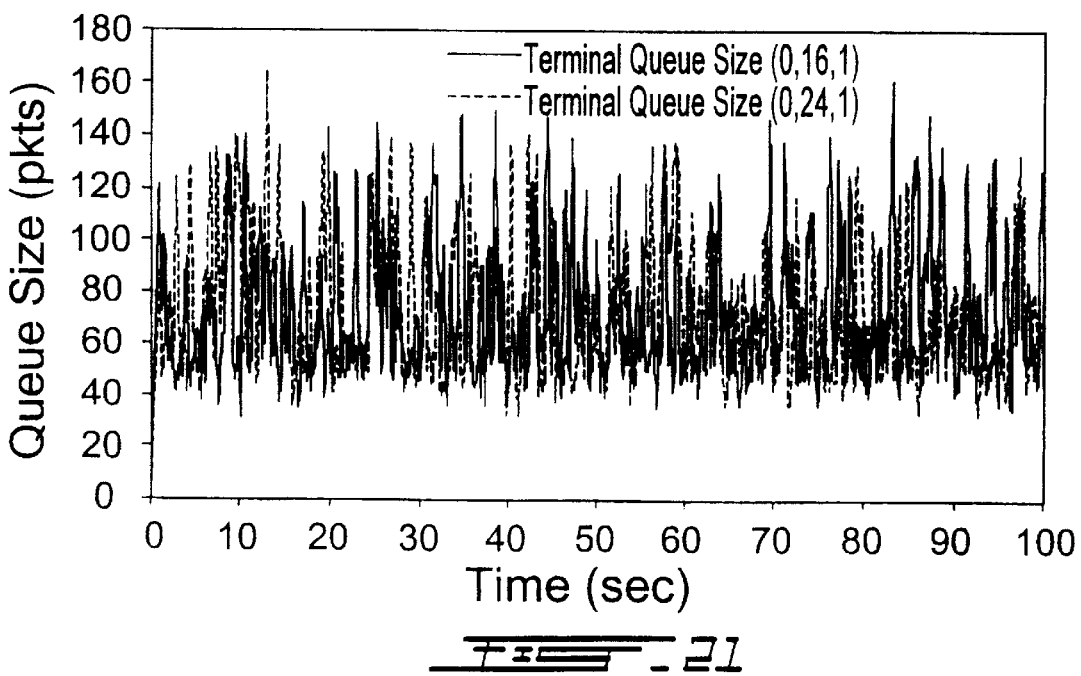
FIG. 21 illustrates the ABR queue size for terminals (0,16,1) and (0,24,1), for loading scenario 1.

With respect to the uplink channels, the load for each of the two ports is approximately 0.80 (and not 0.90, as per LS1). Due to congestion on port 0 and as a result of the action of congestion control algorithm, 10% of the traffic generated by the high load terminals within each input port (which is destined to port 0) is not transmitted, but is queued instead in terminals. This results in heavy queue build-up for these terminals, as can be seen in FIG. 20 for terminals (0,0,0) and (0,8,0). By contrast, there is no queue build-up for terminals (0,16,1) and (0,24,1), sending traffic to the uncongested port 1 (FIG. 21).

Figure 22:
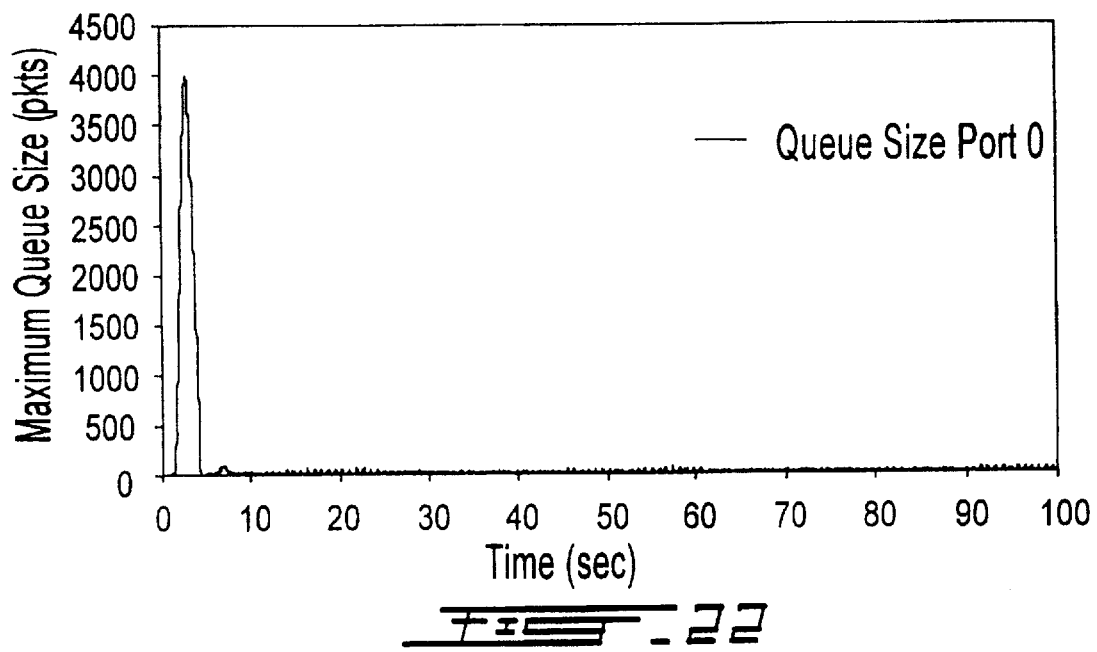
FIG. 22 illustrates the on-board ABR queue size for port 0, loading scenario 1.
Figure 23:
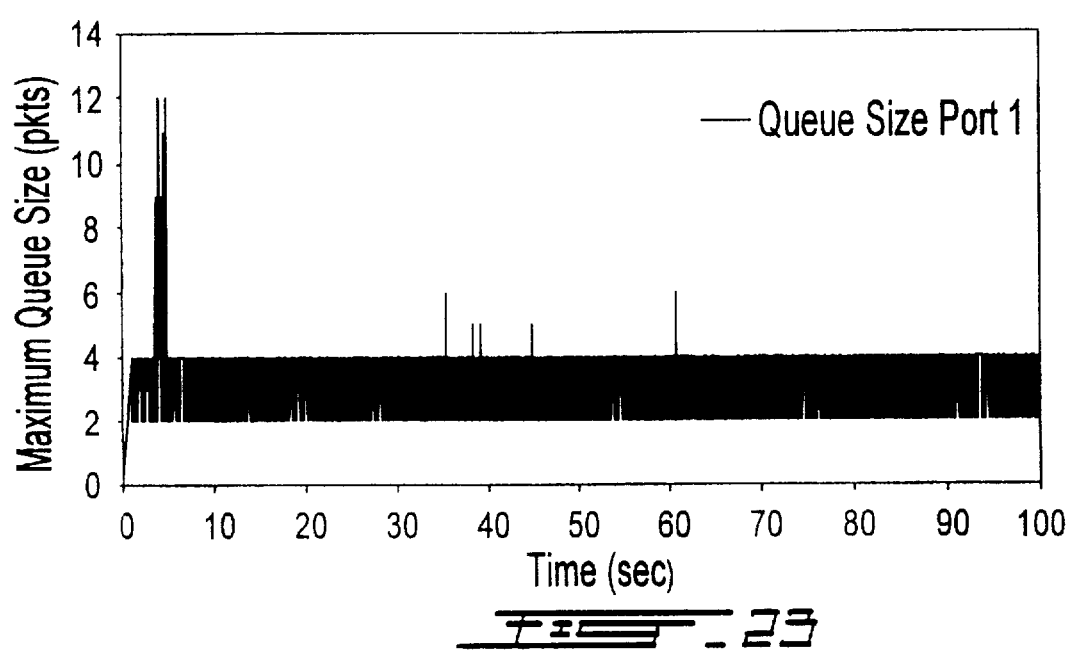
FIG. 23 illustrates the on-board ABR queue size for port 1, loading scenario 1.
Figure 24:
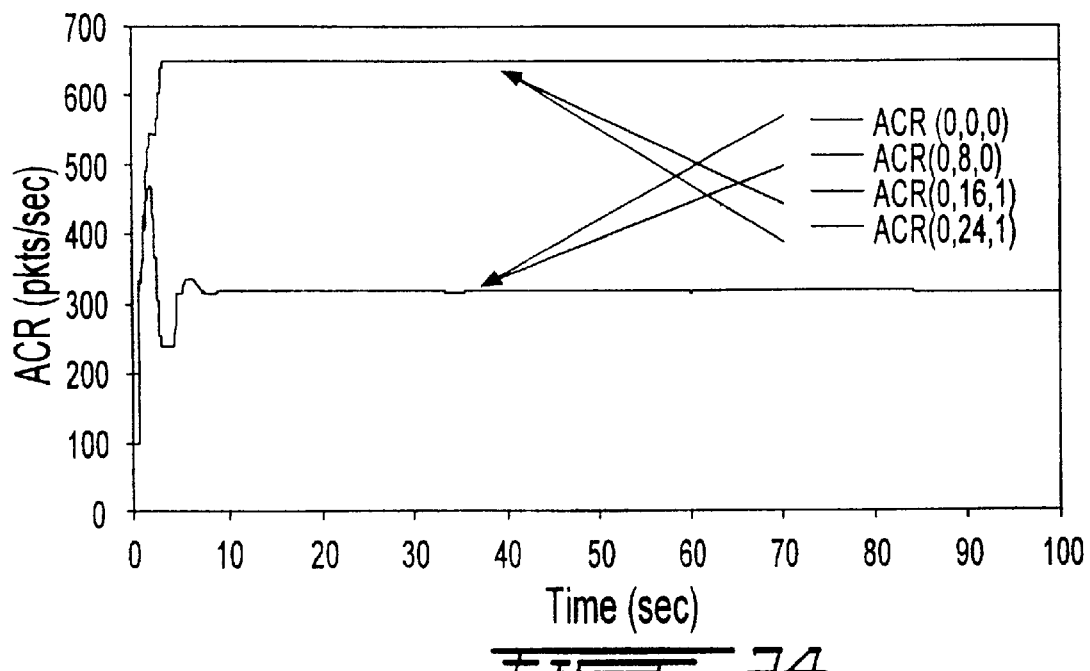
FIG. 24 illustrates the allowed cell rate for terminals (0,0,0), (0,8,0), (0,16,1) and (0,24,1), for loading scenario 1.
Figure 25:
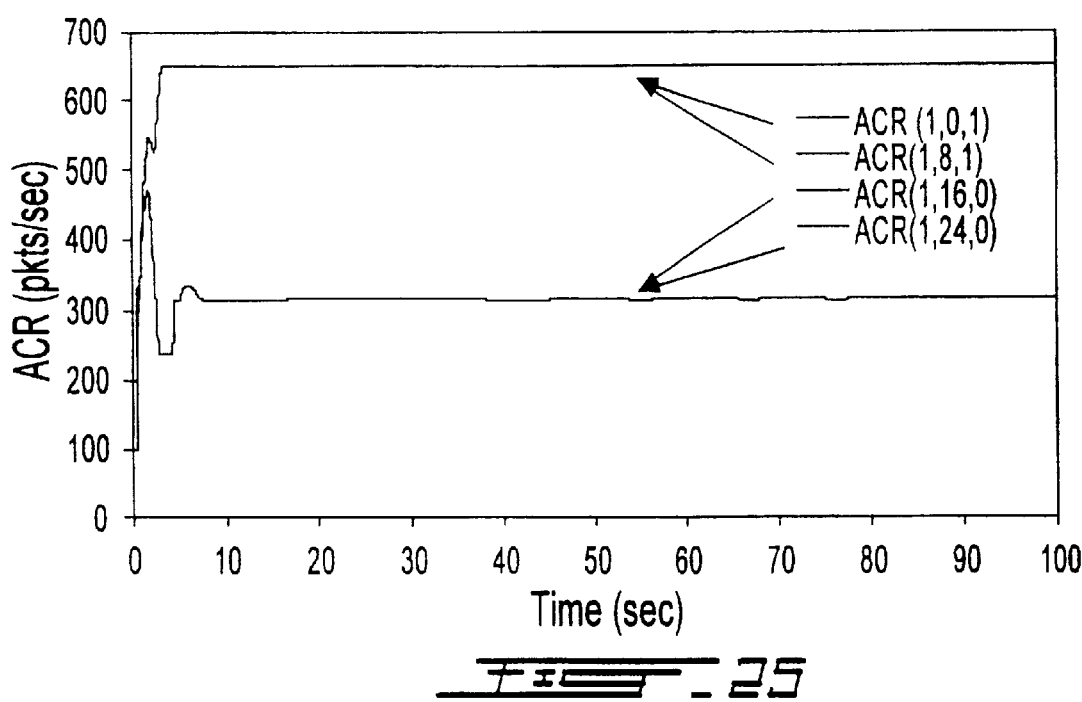
FIG. 25 illustrates the allowed cell rate for terminals (1,0,1), (1,8,1), (1,16,0) and (1,24,0), for loading scenario 1.
Figure 26:
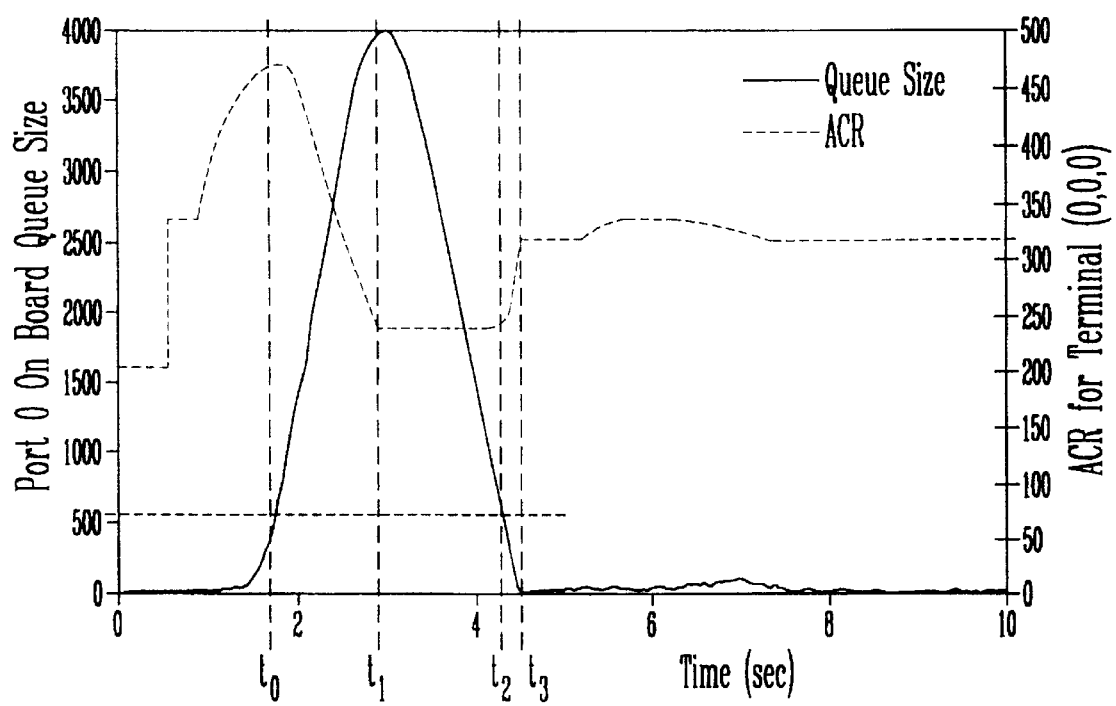
FIG. 26 illustrates the dynamic operation of the BRCA algorithm, by depicting the on-board ABR queue size for port 0 and the allowed cell rate for terminal (0,0,0), loading scenario 1.
Figure 27:
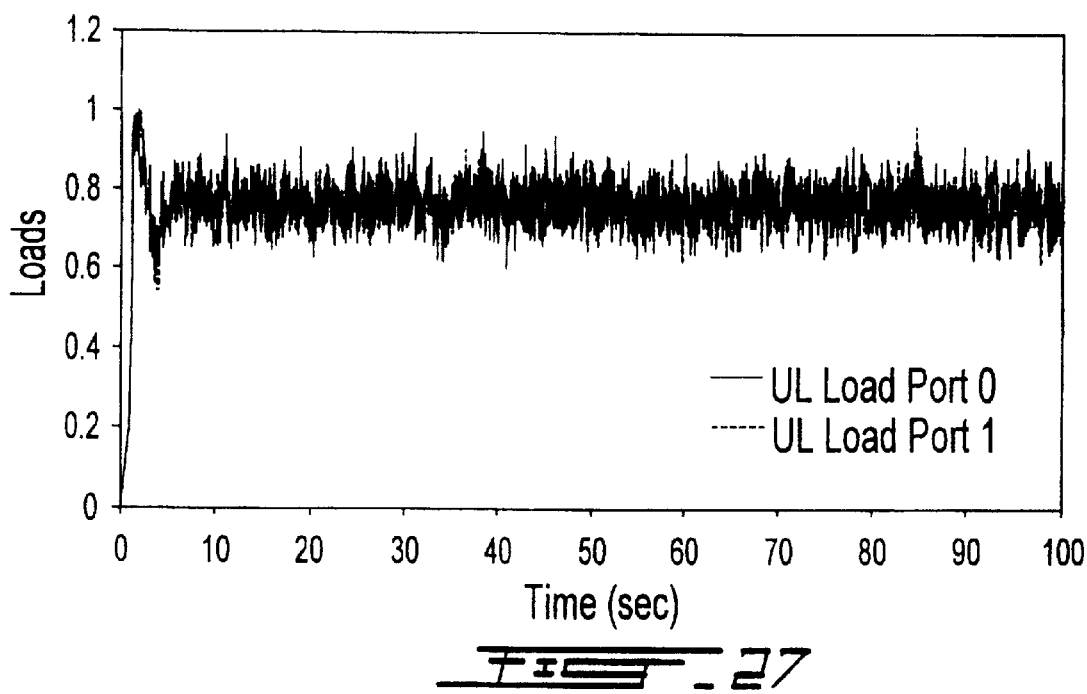
FIG. 27 illustrates the uplink load (on port 0 and port 1) for loading scenario 2.
Figure 28:
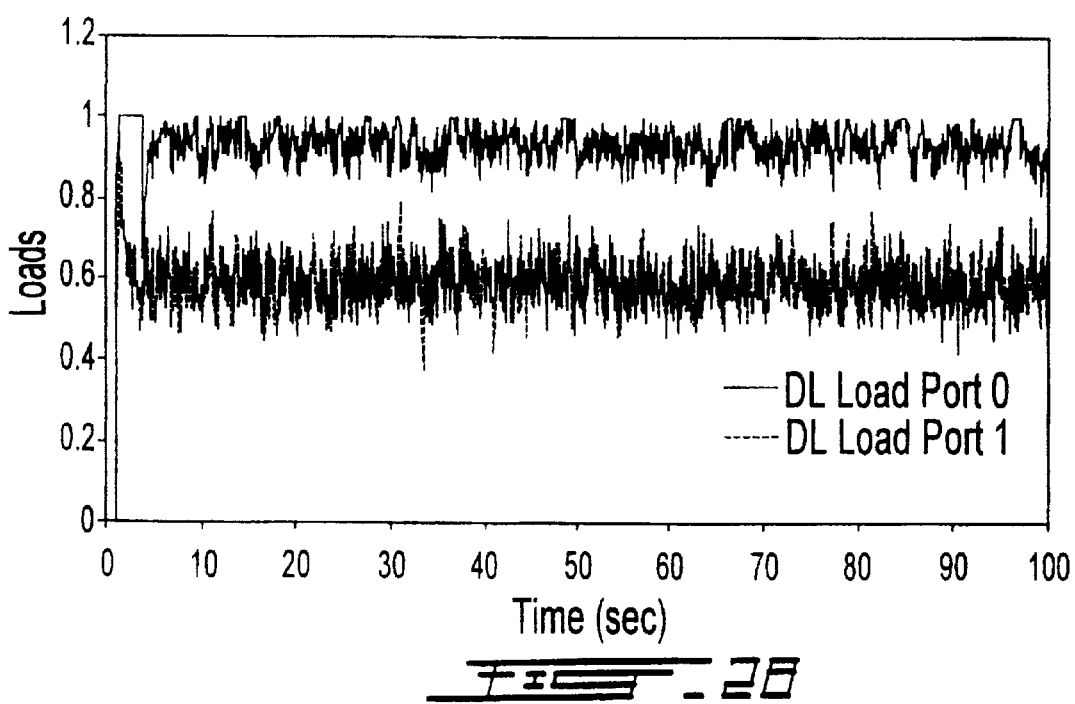
FIG. 28 illustrates the uplink load (on port 0 and port 1) for loading scenario 2.

The response of BRCA algorithm to congestion is apparent from the analysis of results in FIG. 22 and FIG. 23, where the on-board ABR queue sizes are plotted for the downlink ports 0 and 1, respectively. For port 0 (FIG. 22), after an initial queue increase (due to the fact that in this simulation scenario all terminals are activated simultaneously), BRCA algorithm is able to maintain the queue size to very low levels (less than 80 packets). For port 1 (FIG. 23), which is not congested, the queue control is never triggered as the queue size remains very small at all times (a few packets). The ACRs for the tagged terminals are shown in FIG. 24 and FIG. 25. Note that all terminals sending traffic to downlink port 0 are given the same steady state ACR (0.95*10666.67/32=316.67 pkts/sec), while those sending traffic to port 1 are given the fair rate of 666.67 pkts/sec. This latter level corresponds to the PCR of these terminals. As a result, in this scenario fairness is maintained across terminals within different uplink ports sending traffic to the same downlink destination, as seen by comparing the ACRs for term as (00,0) and (1,16,0) or for terminals (0,16,1) and (1,0,1), but it is not maintained across terminals within the same uplink port. Terminals such as (0,16,1) are allowed to transmit traffic at fair rate, while other terminals, such as (0,0,0), are required to reduce their rates below the fair rate, due the overload condition in output port 0. It is interesting to superimpose the results for the on-board queue size for port 0 and the ACR of terminal (0,0,0) (FIG. 26). Note that the two curves have been plotted on separate axis in order to magnify the individual changes. The dotted horizontal line denotes the target (maximum) value for the downlink queue size (0.048*10666.67=512 packets), corresponding to the maximum delay set as an input parameter of the algorithm (0.048 seconds). This queue size is reached at time $t_0$. For times below $t_0$ the terminal ACR is allowed to increase, as per Rules 1,2,3, and 4. For times above $t_0$ the queue size exceeds the target and the BRCA algorithm initiates the adaptation process, attempting to drain the congested queue by setting aside downlink capacity for draining. Consequently the ACR is reduced, as clearly indicated in FIG. 26. This decrease in ACR value is equivalent to intentionally bringing the system in underload condition. According to Rule 5, the decrease of ACR continues as long as the current value is greater than the transmission fair rate (time $t_1$ in FIG. 26). When the current ACR drops below the fair rate, no more decrease is allowed, as shown by the leveling of ACR curve in FIG. 26. As a result of this decrease in ACR, the congested queue will eventually drain. When the queue size decreases below the target value (at time $t_2$), ACR is allowed to rise again, until it reaches the steady state at a level close to the fair rate (at time $t_3$).

Figure 29:
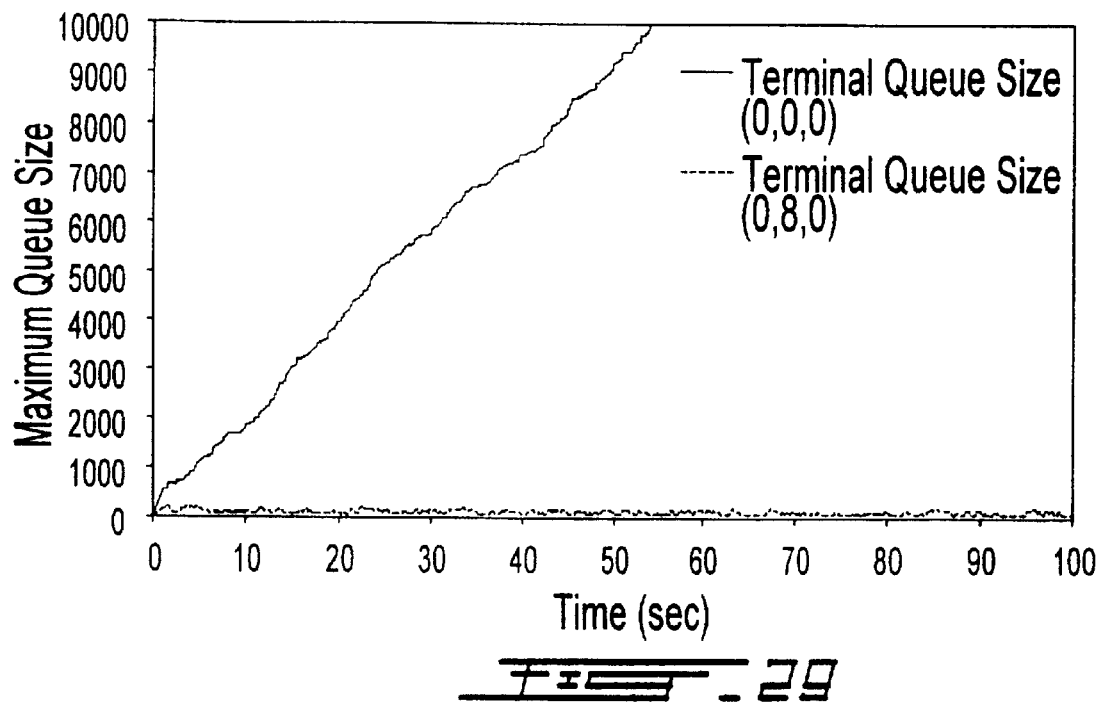
FIG. 29 illustrates the ABR queue size for terminals (0,0,0) and (0,8,0), for loading scenario 2.
Figure 30:
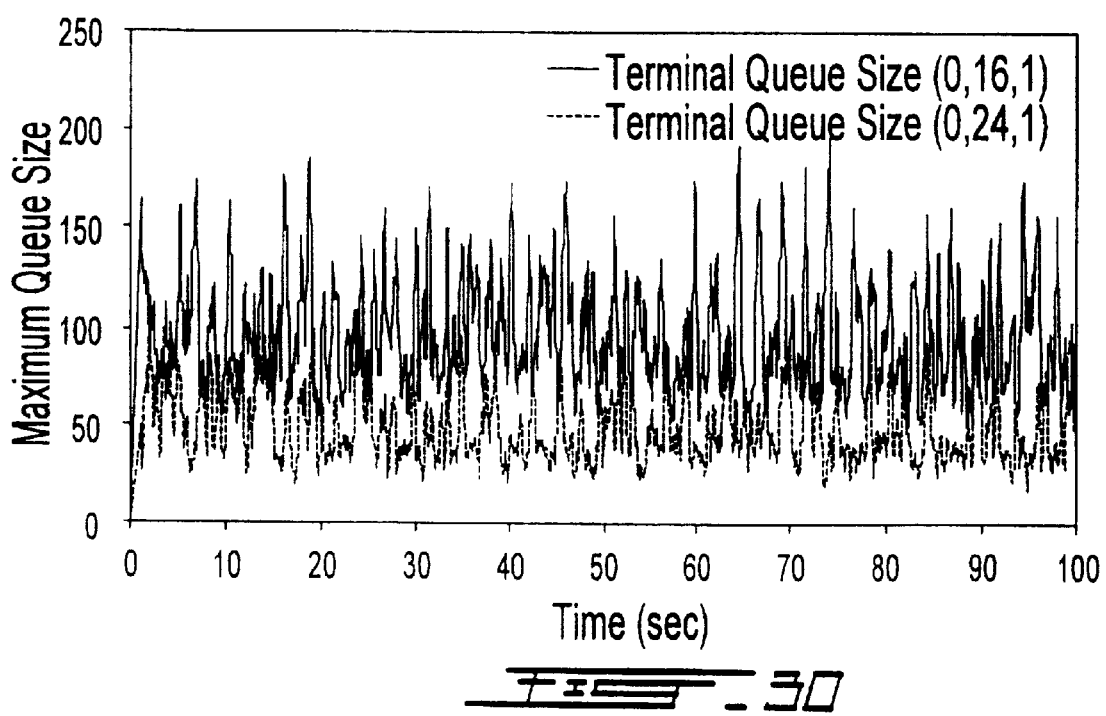
FIG. 30 illustrates the ABR queue size for terminals (0,0,0) and (0,8,0), for loading scenario 2.
Figure 31:
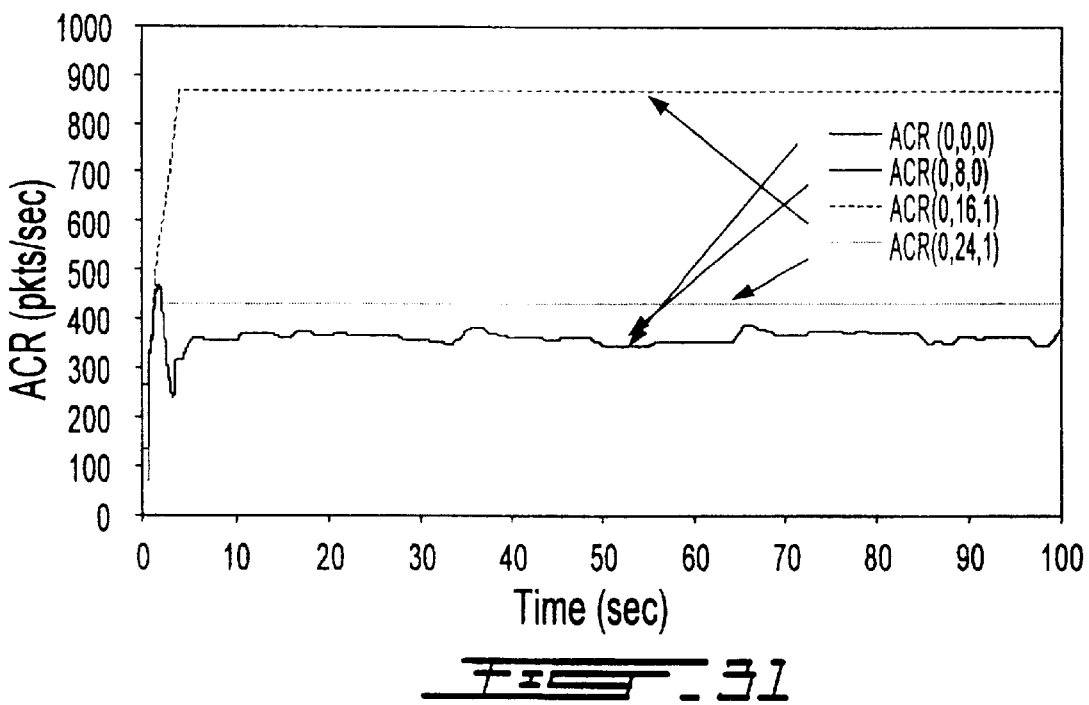
FIG. 31 illustrates the allowed cell rate for terminals (0,0,0), (0,8,0), (0,16,1) and (0,24,1), for loading scenario 2.
Figure 32:
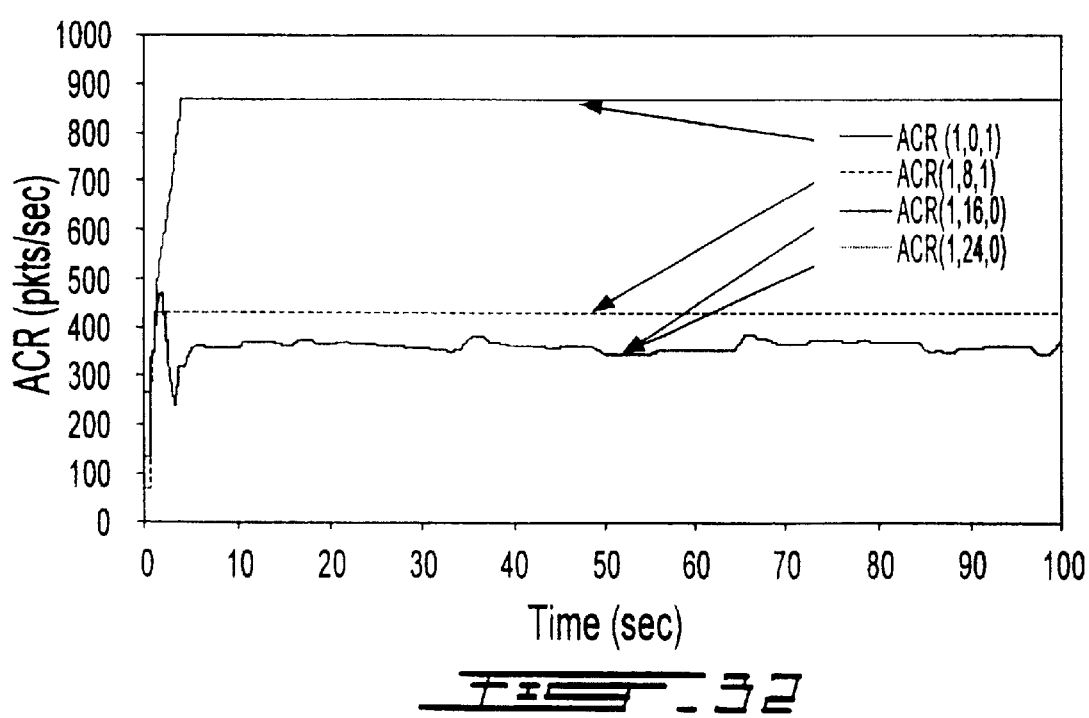
FIG. 32 illustrates the allowed cell rate for terminals (1,0,1), (1,8,1), (1,16,0) and (1,24,0), for loading scenario 2.

The results for loading scenario 2 are presented in FIG. 27 through FIG. 32. The only difference between this scenario and LS1, is that the terminals sending traffic to a specific downlink are not homogeneous (i.e. they are characterized by different loads). In terms of uplink and downlink loads, the results closely resemble those obtained for LS1. Differences can be seen in the ACR curves for the tagged terminals. Considering terminals (0,16,1) and (0,24,1) for example, it can be seen that despite the fact that they are receiving the same congestion control messages, their respective ACRs converge to different levels. In fact, the ACR for terminal (0,16,1) is twice the ACR for terminal (0,24,1), which follows the split of generated traffic among the terminals within an uplink channel. As these terminals are sending traffic to the uncongested destination port 1, their ACRs are allowed to increase until PCR value is reached. By contrast, for terminals sending traffic to the congested destination port 0, their ACRs (which is limited to the fair rate in output port 0) track each other at all time, except at the very beginning. This small discrepancy is caused by the fact that the terminals have different ICR values. One interesting aspect is shown in FIG. 29, which depicts the ABR queue length for terminals (0,0,0) and (0,8,0). The terminal (0,8,0) generates half (traffic load=0.2/8=0.025) of the traffic volume generated by the terminal (0,0,0) (traffic load=0.4/8=0.5). While the terminal (0,0,0) is allowed to transmit all its traffic, the traffic transmitted by terminal (0,8,0) is limited by the fair rate in the output port 0 (316.67 pkts/sec or 0.029, if normalized to downlink capacity). Terminal (0,8,0) queue size will therefore increase unbounded, while terminal (0,0,0) queue is very small.

Figure 33:
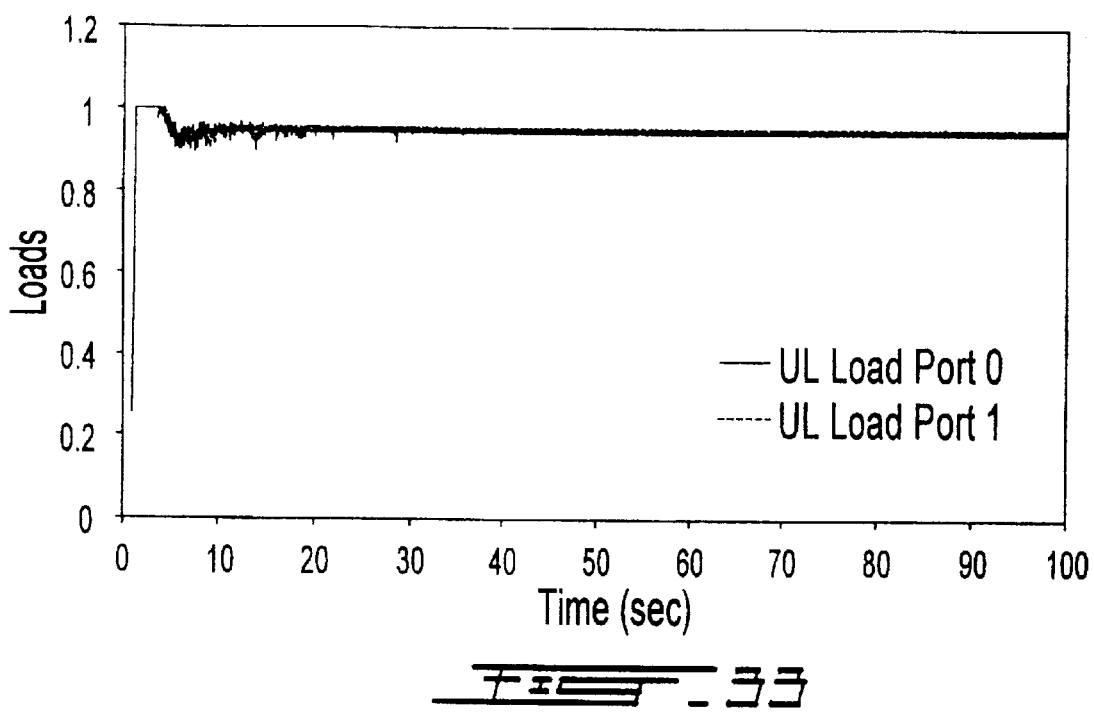
FIG. 33 illustrates the uplink load (on port 0 and port 1) for loading scenario 3.
Figure 34:
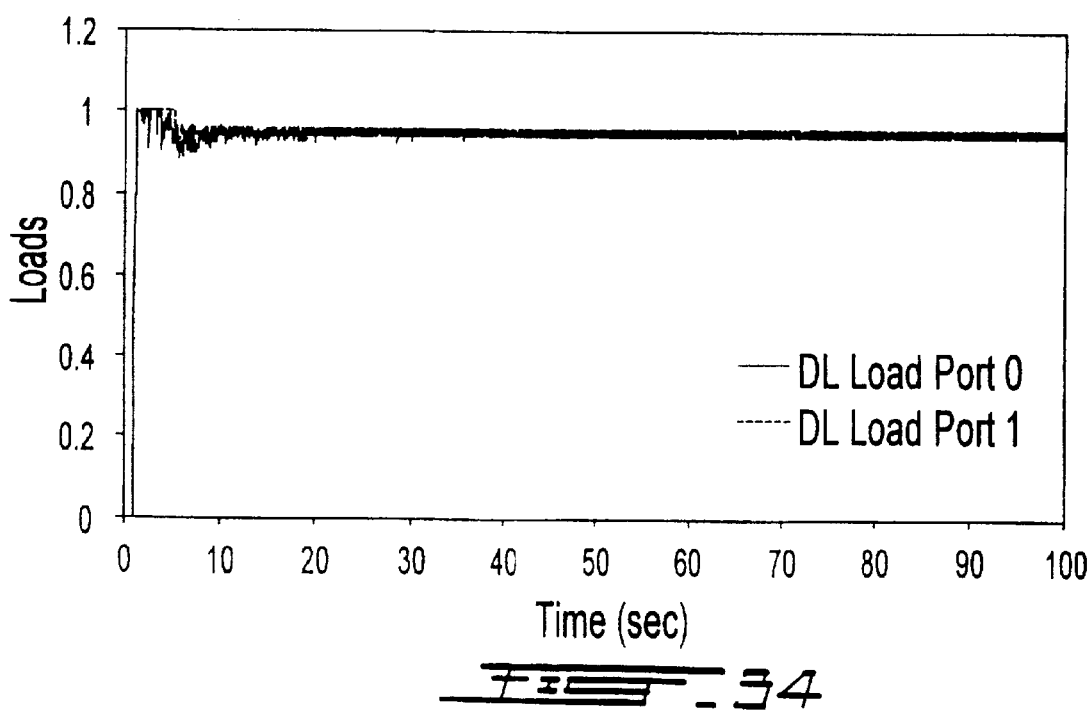
FIG. 34 illustrates the uplink load (on port 0 and port 1) for loading scenario 3.
Figure 35:
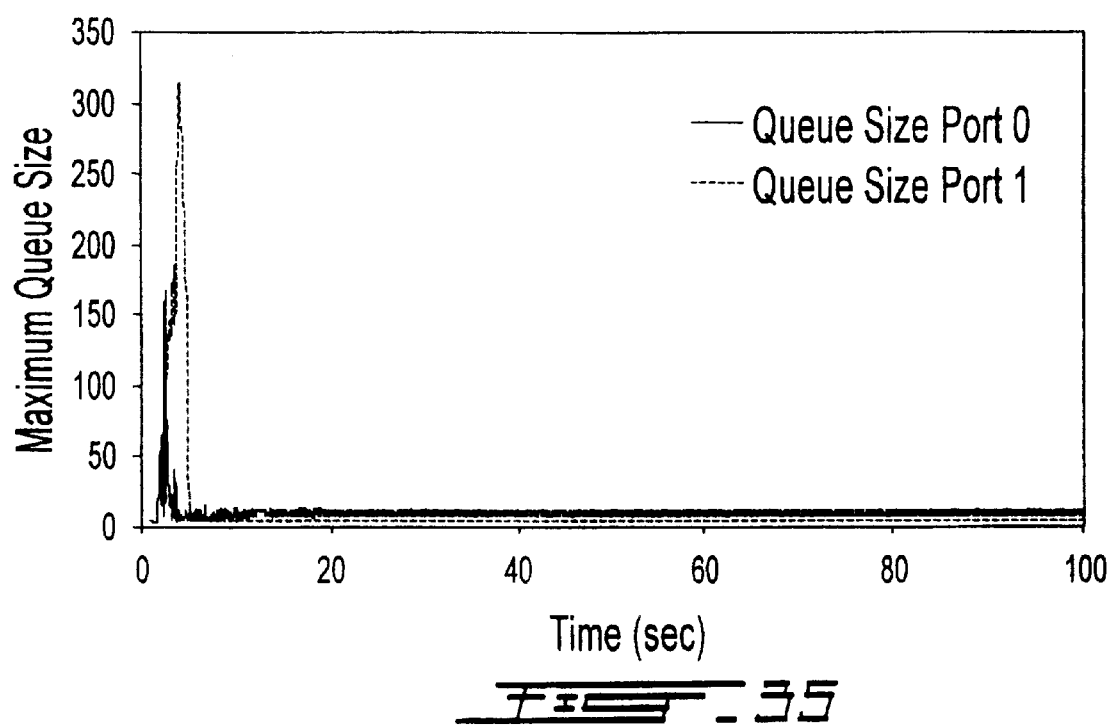
FIG. 35 illustrates the on-board ABR queue size for port 0 and port 1, loading scenario 3.
Figure 36:
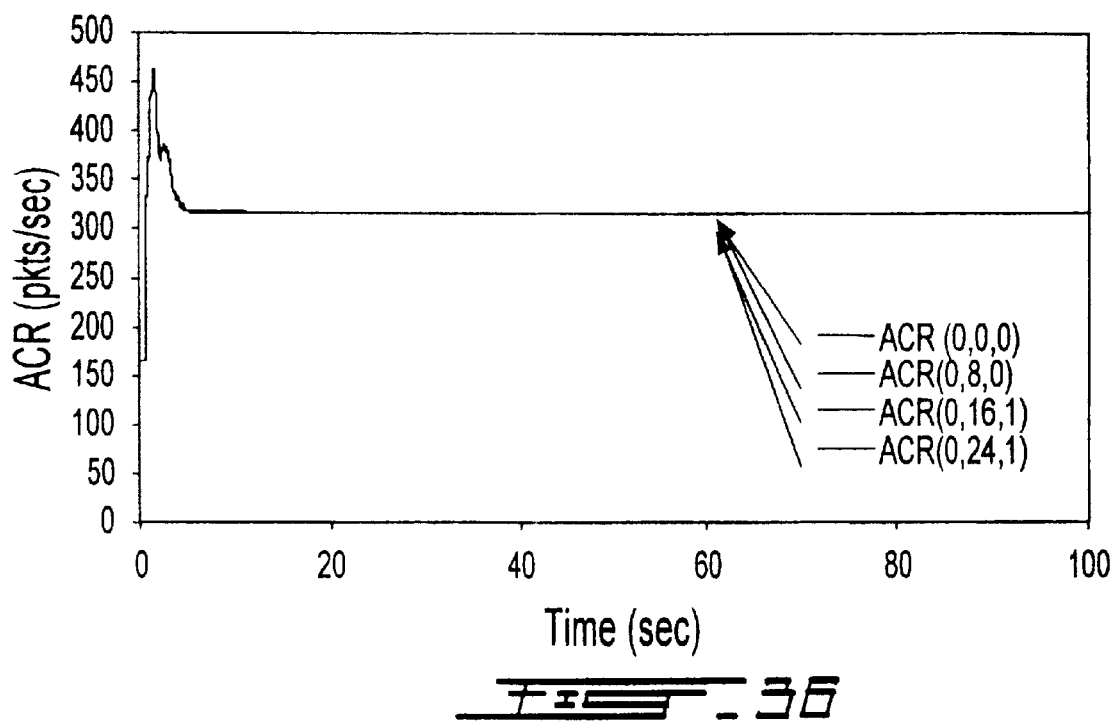
FIG. 36 illustrates the allowed cell rate for terminals (0,0,0), (0,8,0), (0,16,1) and (0,24,1), for loading scenario 1.
Figure 37:
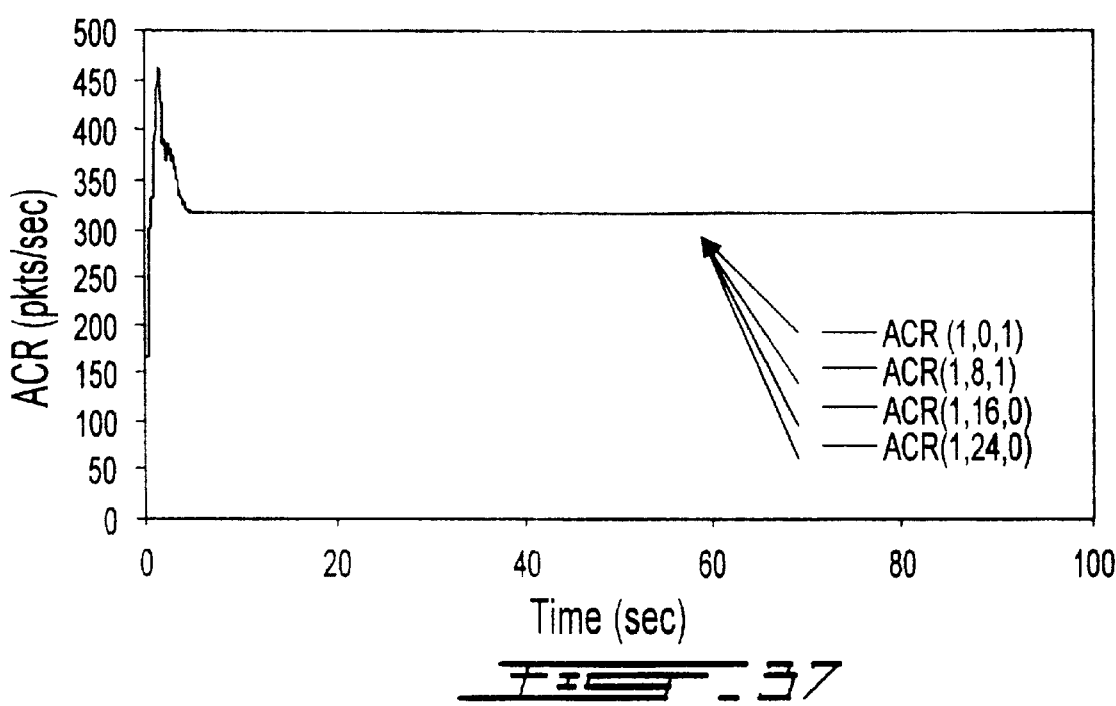
FIG. 37 illustrates the allowed cell rate for terminals (1,0,1), (1,8,1), (1,16,0) and (1,24,0), for loading scenario 3.

The results for loading scenario 3 show a typical simulation run at fall system utilization. The results for uplink and downlink loads are shown in FIG. 33 and FIG. 34, respectively. The utilization of both links reaches a maximum of about 95%, as specified by the target uplink and downlink utilization parameters. The ACR results are shown in FIG. 36 and FIG. 37 respectively. For this balanced system, the ACR reaches a fair value 316.67 pkts/sec, which corresponds to the total capacity shared equally by the 32 terminals. FIG. demonstrates that, after a very small initial queue build-up, the BRCA algorithm manages to keep the queue size very small, well below the target value.

Fairness Performance

The fairness performance has already been addressed in the discussions on BRCA algorithm behavior, to the extent allowed by the limitations introduced by the loading scenarios. In summary, it was shown that:

- For loading scenario 1, terminals in groups $G_1$ and $G_2$ in both uplik ports have the same ACR, as do terminals in groups $G_3$ and $G_4$. Furthermore, terminals in a given uplink port sending traffic to different downlink ports may have different ACRs (See FIG. 25).
- Terminals that are sending traffic to uncongested downlinks have their ACRs limited by terminal's PCR, which is established at call setup. Terminals sending traffic to a congested destination have their ACRs limited by the fair rate for that destination.
- For loading scenario 3, all terminals are homogeneous and have the same ACR (see FIG. 36), equivalent to the total capacity divided by the number of active terminals.

Efficiency/Throughput Performance

Efficiency or throughput performance, expressed in terms of uplink and downlink loads, have been addressed in the discussions on BRCA algorithm behavior. For all loading scenarios the BRCA algorithm allows for the maximization of capacity utilization (within the limits set by the target utilization parameters), in the conditions in which the target queuing delay in the output port buffers is not exceeded.

Transient Response/Steady State Performance

Steady state performance has been assessed based on loading scenario 3, with terminals having staggered starting times, as indicated in the table below:

| Terminal | Starting (second) time |
|---|---|
| (0,0,0) | 0 |
| (0,1,0)-(0,3,0) | 0.0 |
| (0,4,0)-(0,7,0) | 4.8 |
| (0,8,0) | 9.6 |
| (0,9,0)-(0,11,0) | 9.6 |
| (0,12,0)-(0,15,0) | 14.4 |
| (0,16,1)-(0,31,1) | 0.0 |
| (1,0,1)-(1,15,1) | 0.0 |
| (1,16,0) | 19.2 |
| (1,17,0)-(1,19,0) | 19.2 |
| (1,20,0)-(1,23,0) | 24.0 |
| (1,24,0) | 28.8 |
| (1,25,0) | 38.4 |
| (1,26,0) | 48.0 |
| (1,27,0) | 57.6 |
| (1,28,0) | 67.2 |
| (1,29,0) | 76.8 |
| (1,30,0) | 86.4 |
| (1,31,0) | 91.2 |

Figure 38:
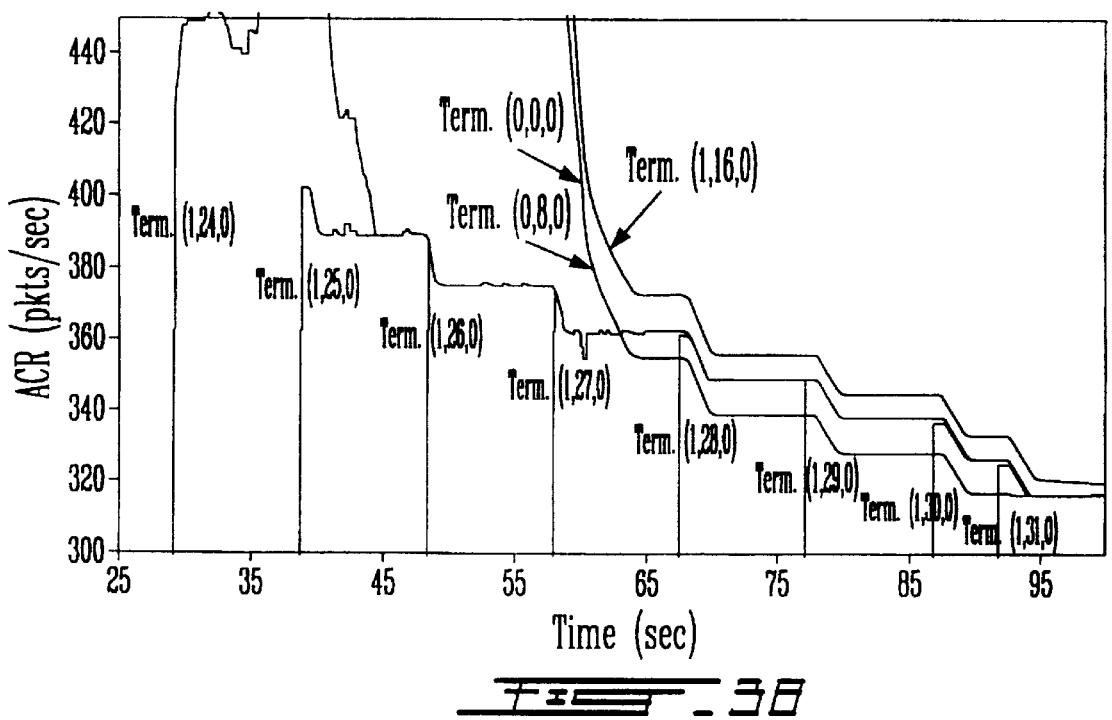
FIG. 38 illustrates the allowed cell rate for tagged terminals with staggered starting times, for loading scenario 1.

Shaded terminals are tagged, and their ACRs are monitored. The results are presented in FIG. 38, which indicate a rather rapid convergence of ACRs of all terminals towards a common value (as a result of balanced loading assumed in LS3). For times less than 38.4 sec, all uplink and downlink ports are underloaded. Consequently, the ACRs for the active terminals rise to levels determined by their respective PCRs. When terminal (1,25,0) is activated, at time 38.4 sec, the ACR of tagged terminals (0,0,0), (0,8,0) and (1,16,0) begins to decrease according to terminal Rule 5. The rate of decrease is slow, in order to prevent sudden variations in ACR, which could lead to oscillations and instability. As more and more terminals become active, their ACRs react quickly to the new load and congestion conditions, and the new steady state values of ACRs are quickly reached (in most instances within a few seconds). The final ACR value for all active terminals is close to 320 pkts/sec, which agrees with the original results presented for LS3, shown in FIG. 36 and FIG. 37.

On-Board Queue Size Performance

Figure 39:
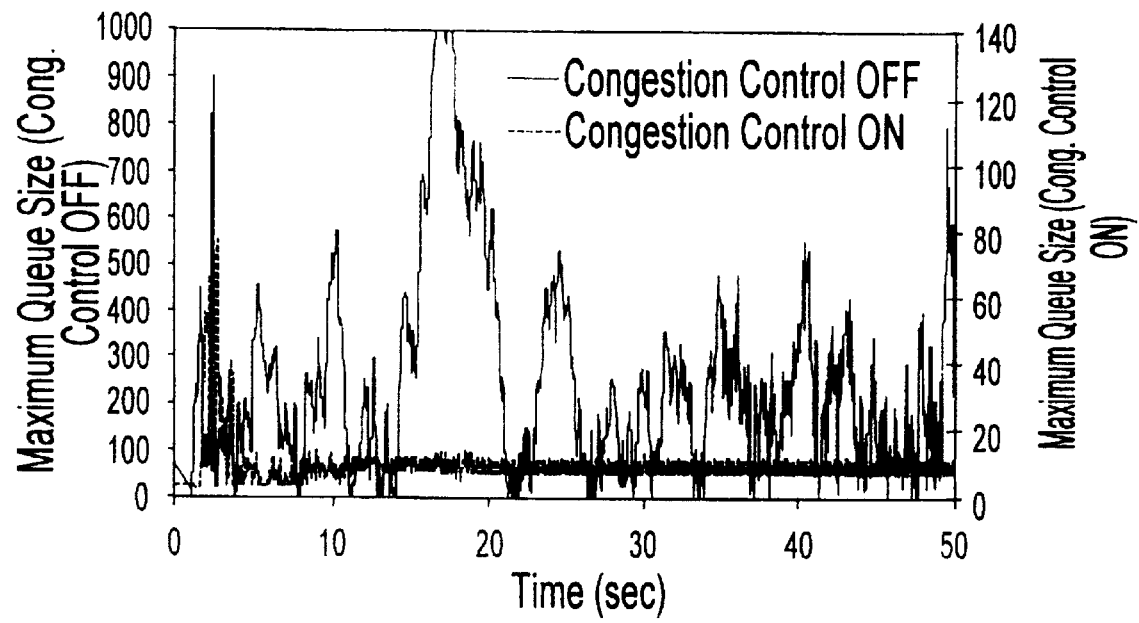
FIG. 39 illustrates the on-board ABR queue size for port 0, with/without the congestion control enabled, for loading scenario 3.
Figure 40:
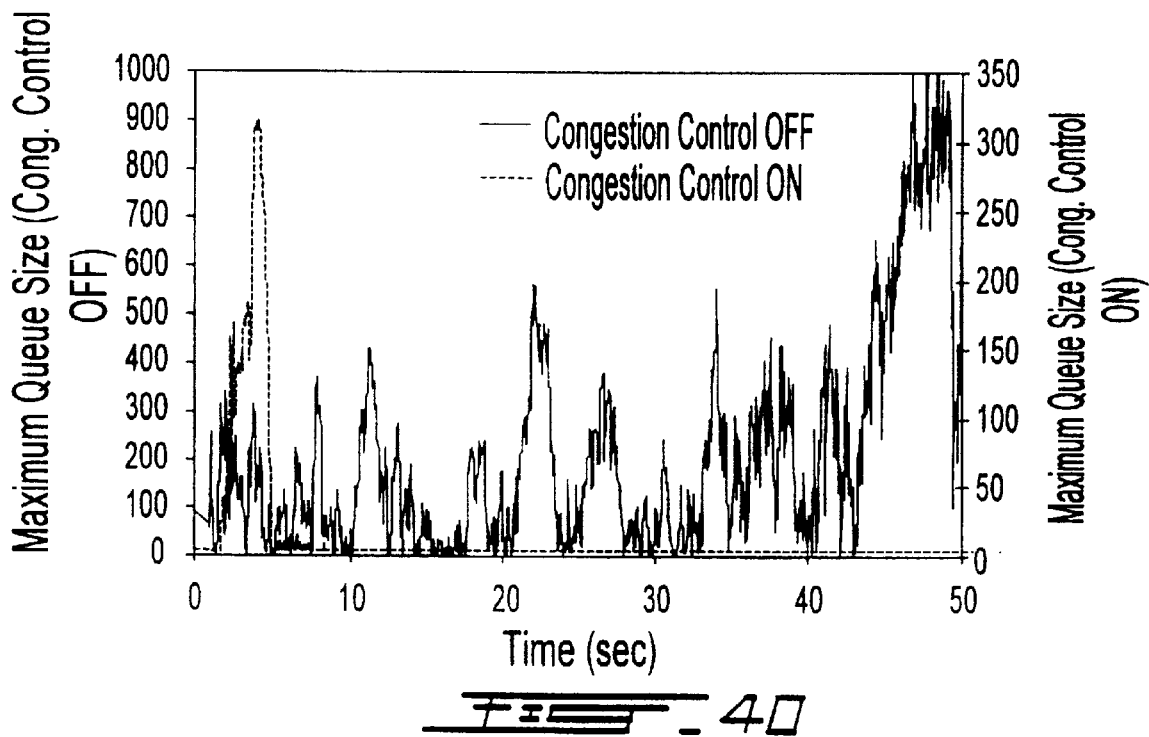
FIG. 40 illustrates the on-board ABR queue size for port 1, with/without the congestion control enabled, for loading scenario 3.
Figure 41:
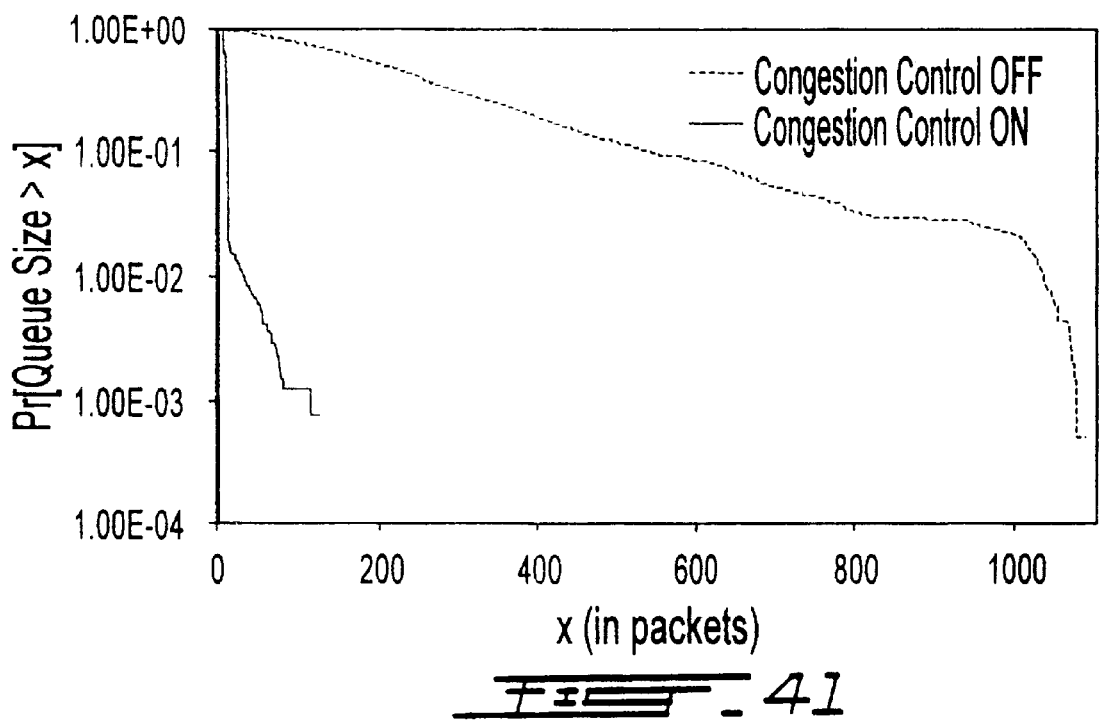
FIG. 41 illustrates the queue survival function for port 0, with/without the congestion control enabled, for loading scenario 3.
Figure 42:
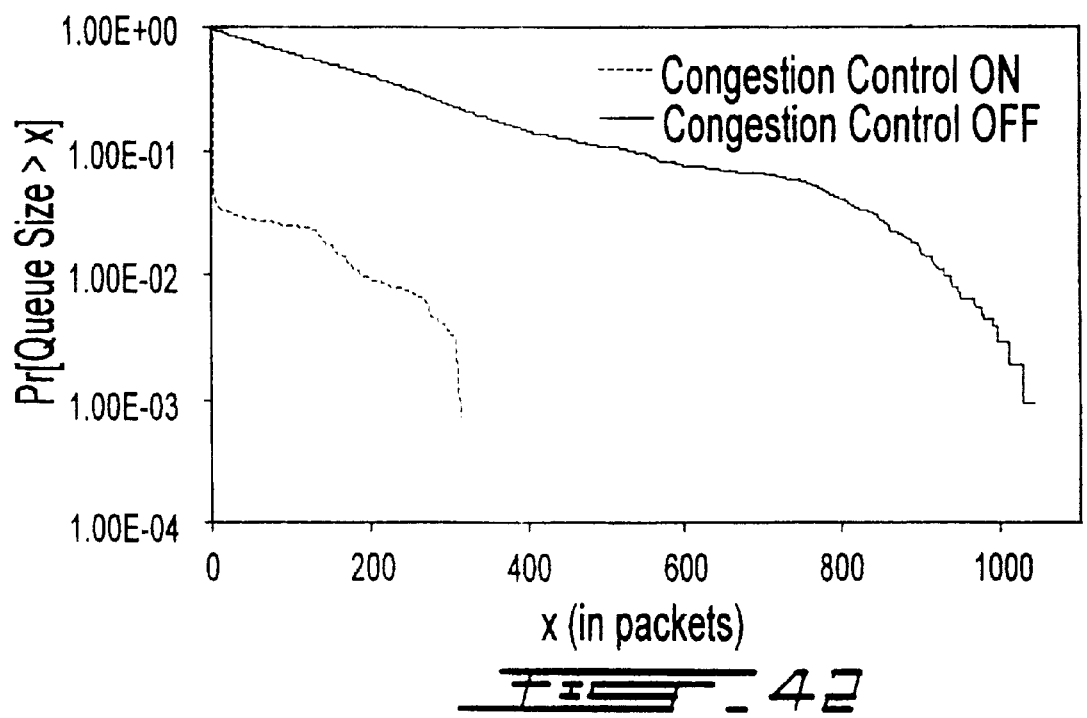
FIG. 42 illustrates the queue survival function for port 1, with/without the congestion control enabled, for loading scenario 3.

The queue size management performed by BRCA algorithm attempts to maintain the on-board queue size (and consequently the queuing delay) within limits compatible with system-specified cell loss ratio. For performance evaluation loading scenario 3 was used, and the on-board queue sizes for downlink ports 0 and 1 were monitored, with and without the congestion control enabled. The results are shown in FIG. 39 and FIG. 40 for port 0 and to port 1, respectively. The graphs are clearly showing that when congestion control is disabled the on board queue size exhibits much greater variability and much higher instantaneous maximum values. This conclusion is evidenced in a more concise and quantifiable form through the survival functions, which gives the probability that the queue size exceeds a certain threshold. The results for port 0 and port 1 are shown in FIG. 41 and FIG. 42, respectively. It can be observed that with the congestion control activated there is almost a tenfold reduction in buffer size requirements (for the same overflow probability), in the condition in which a MMPP traffic model was used. For burstier traffic sources an even greater improvement is expected.

It should be noticed that the above description merely provides a disclosure of a particular embodiment of the invention and that the invention is not limited to the above described embodiment. It is thus recognized that alternative embodiments, which fall within the scope of the invention, could be conceived.

What is claimed is:

1. In a satellite communication system carrying data traffic between a communication satellite and more than one user terminals, a method for congestion avoidance utilizing successive averaging intervals of fixed time duration in order to allocate bandwidth among the terminals sharing either an uplink channel, a downlink channel or both, each having a fair rate and loading conditions, the method comprising the steps of:
    measuring for each averaging interval, the arrival rates for ABR traffic and higher priority traffic, requests for capacity for ABR traffic and a number of active ABR sources;
    computing, at the end of each averaging interval, the fair rate and the loading conditions in each uplink and downlink channel, a rate adaptation for each uplink-downlink channel couple; the rate adaptation being one of a rate increase, a rate decrease or no rate change;
    broadcasting at each averaging interval, the congestion control messages to each of the more than one terminals, the congestion control messages comprising the fair rate and the rate adaptation for each uplink-downlink channel couple;
    computing within each of the more than one user terminals, in each averaging interval, an allowable cell rate at which a terminal can make requests for bandwidth.

2. The method as claimed in claim 1 wherein the arrival rates for ABR traffic and higher priority traffic and the request for capacity for ABR traffic and higher priority traffic are averaged prior to the computing of congestion control messages.

3. The method as claimed in claim 1, wherein a different target utilization may be set for the uplink channels and for the downlink channels.

4. The method as claimed in claim 1, wherein fairness is enforced in each uplink channel and each downlink channel.

5. The method as claimed in claim 1, wherein in each uplink channel, ABR capacity requests are used instead of the ABR traffic arrival rates in order to determine the loading conditions and the fair rate.

6. The method as claimed in claim 1, wherein the amount of rate decrease in each uplink channel is set such that the loading conditions in the uplink channel reaches the uplink target utilization in one round-trip delay.

7. The method as claimed in claim 1, wherein the amount of rate decrease in each downlink channel is set such that the downlink queue size is reduced below a threshold level and the loading conditions in the downlink channel reaches the downlink target utilization in two round-trip delays.

8. The method as claimed in claim 1, wherein the amount of rate increase in each downlink channel is set such that the loading conditions in the downlink channel reaches the downlink target utilization in two round-trip delays.

9. The method as claimed in claim 1, wherein if the allowable cell rate needs to be decreased, either in the uplink channel, or in the downlink channel or in both, the amount of rate decrease for the uplink-downlink channel couple is set to be the maximum of the calculated rate decrease in the uplink channel and in the downlink channel.

10. The method as claimed in claim 1, wherein the allowable cell rate can only be increased if the uplink channel is not overloaded and the downlink channel is underloaded wherein the amount of rate increase for the uplink-downlink channel couple is taken equal to the rate increase computed for the downlink channel.

11. In a satellite communication system supporting ABR services with a given cell loss tolerance, a method for managing queue size in the output ports of an on-board switch, the method comprising the steps of:
    providing a maximum queuing delay for ABR traffic;
    adapting an available capacity for the ABR traffic on downlink channels, by setting aside capacity for queue draining;
    computing a queue draining capacity by using a negative exponential function;
    providing an upper limit for the maximum draining capacity;
    attempting to always maintain the queuing delay below the provided upper limit.

12. The method as claimed in claim 1 and claim 11, wherein the actions taken by a terminal in response to congestion control messages comprise the steps of:
    adjusting an allowable cell rate at which user terminals can make their request for capacity, the adjusting being based on a fair rate and a rate adaptation information broadcast by the satellite;
    computing capacity requests for ABR traffic;
    breaking down assigned capacity between traffic classes;
    preparing and transmitting the ABR traffic and other classes traffic.

13. The method as claimed in claim 12, wherein the adjusting of the allowable cell rate is based on the following rules:
    Rule 1: a terminal has to wait for the next congestion control message before it can make any request on behalf of its ABR source;
    Rule 2: a terminal should maintain its source's ACR as the minimum of the source's ICR and the sum of the source's MCR and the broadcast fair rate, until it has sent traffic from its source, meaning that the first request has been granted, so that the terminal has capacity assigned to it;
    Rule 3: a terminal may increase its source's ACR only after it has sent more traffic from its source;
    Rule 4: on receiving a message that requests the terminal to increase its source's ACR, the terminal should calculate the source's new ACR as follows:

if $(ACR_{current} \leq MCR+\text{FairRate})$ then $ACR_{current} = (ACR_{current} + RIF \cdot PCR, MCR + \text{FairRate} \cdot (1+\lambda))^-$ else $ACR_{new} = ACR_{current} + \lambda \cdot \text{FairRate}$ where $\lambda$ is the amount of rate increase calculated by the OBNC algorithm for the output ports, and $(a,b)^-$ means the minimum of a and b.

Rule 5: on receiving a message that requires the terminal to decrease its source's ACR, the terminal should calculate the source's new ACR as follows:

if $(ACR_{current} \leq MCR+FairRate)$ then $ACR_{new}=ACR_{current}$ else $ACR_{new}=(ACR_{current} \cdot (1-\lambda) \cdot MCR+FairRate)^+$ where $\lambda$ is the amount of rate decrease calculated by the OBNC algorithm and $(a,b)^+$ means the maximum of a and b.

14. The method as claimed in claim 12, wherein the total ABR capacity requested by a terminal includes requests for all downlink destinations the terminal has traffic to send to.

15. The method as claimed in claim 12, wherein each terminal uses a circular-linked list and a memory for storing a last chosen downlink destination, in order to ensure fairness between all downlink destinations it has traffic to send to.

16. The method as claimed in claim 1, wherein the other classes traffic comprise CBR traffic or rt-VBR traffic or nrt-VBR traffic.

17. The method as claimed in claim 1, wherein the number of active ABR sources is measured using a network management database.

18. The method as claimed in claim 1, wherein the number of active ABR sources is measured using the header of each cell.

19. The method as claimed in claim 2, wherein the measured quantities are averaged using the exponential averaging formula:

$\overline{X}_{NEW}=(1-\alpha) \cdot \overline{X}_{OLD}+\alpha \cdot X$ wherein $\overline{X}_{NEW}$ and $\overline{X}_{OLD}$ are a new and an old average, X is a current value and $\alpha$ is a ponderation factor.

20. The method as claimed in claim 1, wherein the computing, at the end of each averaging interval, comprises the computing of the fair rate for each uplink-downlink channel couple, the fair rate for each uplink-downlink channel couple being computed by taking the minimum between the fair rate of the uplink of the uplink-downlink channel couple and the fair rate of the downlink of the uplink-downlink channel couple.

21. The method as claimed in claim 1, wherein the fair rate adaptation is limited between a predetermined range.

22. The method as claimed in claim 12, wherein the breaking down of the assigned capacity between traffic classes is performed by trying to assign an equal amount of traffic for each destination of the terminal having ABR traffic.

* * * * *